United States Patent
Li et al.

(10) Patent No.: US 11,099,359 B2
(45) Date of Patent: Aug. 24, 2021

(54) OPTICAL IMAGING LENS ASSEMBLY

(71) Applicant: Zhejiang Sunny Optical Co., Ltd, Zhejiang (CN)

(72) Inventors: Ming Li, Zhejiang (CN); Saifeng Lyu, Zhejiang (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 354 days.

(21) Appl. No.: 16/212,225

(22) Filed: Dec. 6, 2018

(65) Prior Publication Data

US 2019/0113715 A1    Apr. 18, 2019

Related U.S. Application Data

(63) Continuation of application No. PCT/CN2018/075906, filed on Feb. 9, 2018.

(30) Foreign Application Priority Data

Jul. 5, 2017 (CN) .......................... 201710543314.X
Jul. 5, 2017 (CN) .......................... 201720806436.9

(51) Int. Cl.
  *G02B 9/04*    (2006.01)
  *G02B 13/00*   (2006.01)
  *G02B 9/34*    (2006.01)
  *G02B 9/60*    (2006.01)
  *G02B 13/18*   (2006.01)

(52) U.S. Cl.
  CPC ........... *G02B 13/0045* (2013.01); *G02B 9/34* (2013.01); *G02B 9/60* (2013.01); *G02B 13/00* (2013.01); *G02B 13/004* (2013.01); *G02B 13/18* (2013.01)

(58) Field of Classification Search
  CPC .... G02B 13/0045; G02B 13/00; G02B 13/18; G02B 13/004; G02B 9/34; G02B 9/60; G02B 9/04; G02B 9/10; G02B 9/06; G02B 9/08
  See application file for complete search history.

(56) References Cited

U.S. PATENT DOCUMENTS 5,381,270 A      1/1995  Cho
2012/0218647 A1*  8/2012  Yonezawa .......... G02B 13/0045
                                          359/714

FOREIGN PATENT DOCUMENTS

| CN | 101470249 | * 7/2009 | ............ G02B 13/00 |
| CN | 102650727 | * 8/2012 | ............ G02B 13/18 |
| CN | 103135204 | * 6/2013 | ............ G02B 13/18 |
| CN | 106802474 | 6/2017 | |
| CN | 107121761 | 9/2017 | |

* cited by examiner

*Primary Examiner* — Joseph P Martinez
(74) *Attorney, Agent, or Firm* — Hauptman Ham, LLP

(57) ABSTRACT

The present disclosure discloses an optical imaging lens assembly. The optical imaging lens assembly sequentially includes, from an object side to an image side along an optical axis, a first lens group and a second lens group. The first lens group includes a first lens having a positive refractive power and a second lens having a negative refractive power. The second lens group includes at least one optical element and at least one lens having a refractive power, where an object-side surface and an image-side surface of the at least one optical element are aspheric surfaces. An effective focal length f1 of the first lens and a combined focal length f12 of the first lens and the second lens satisfy: f1/f12>0.65.

17 Claims, 26 Drawing Sheets

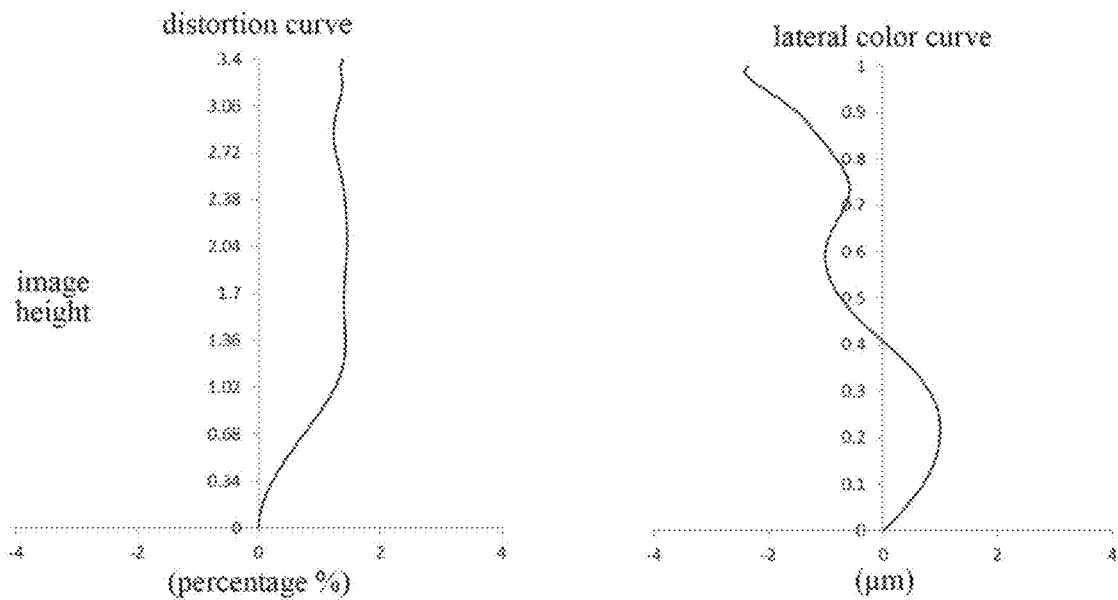
Fig. 6C
Fig. 6D
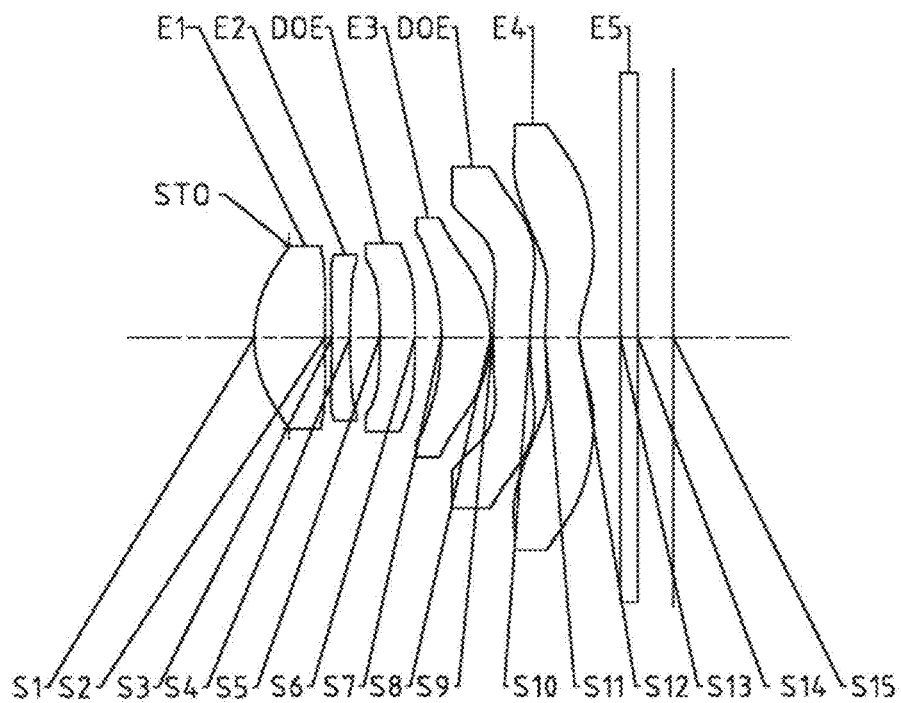
Fig. 7

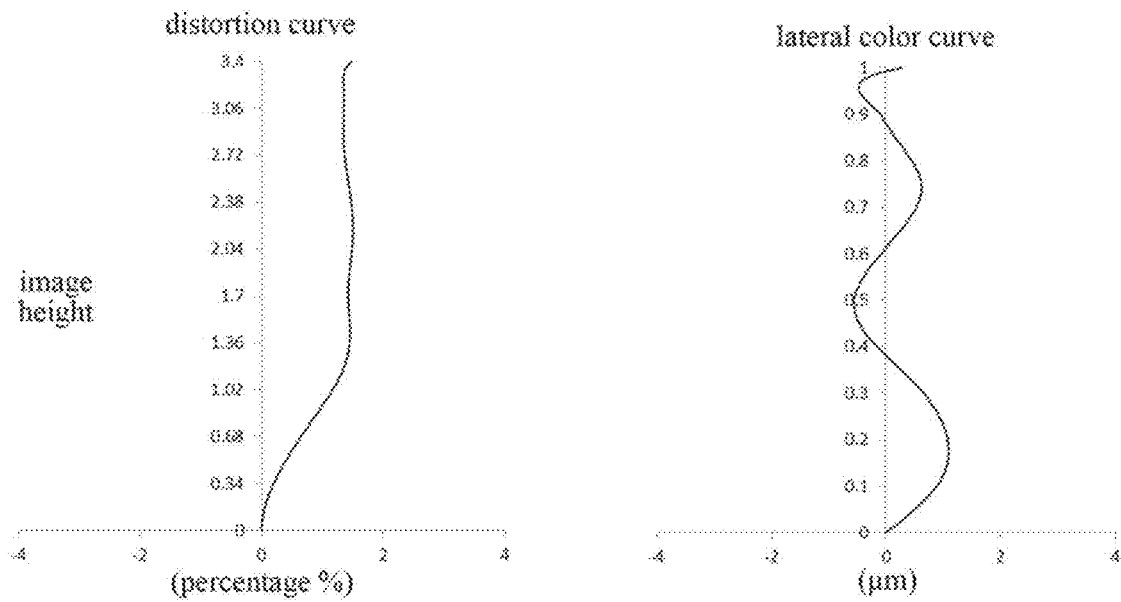
Fig. 22C
Fig. 22D
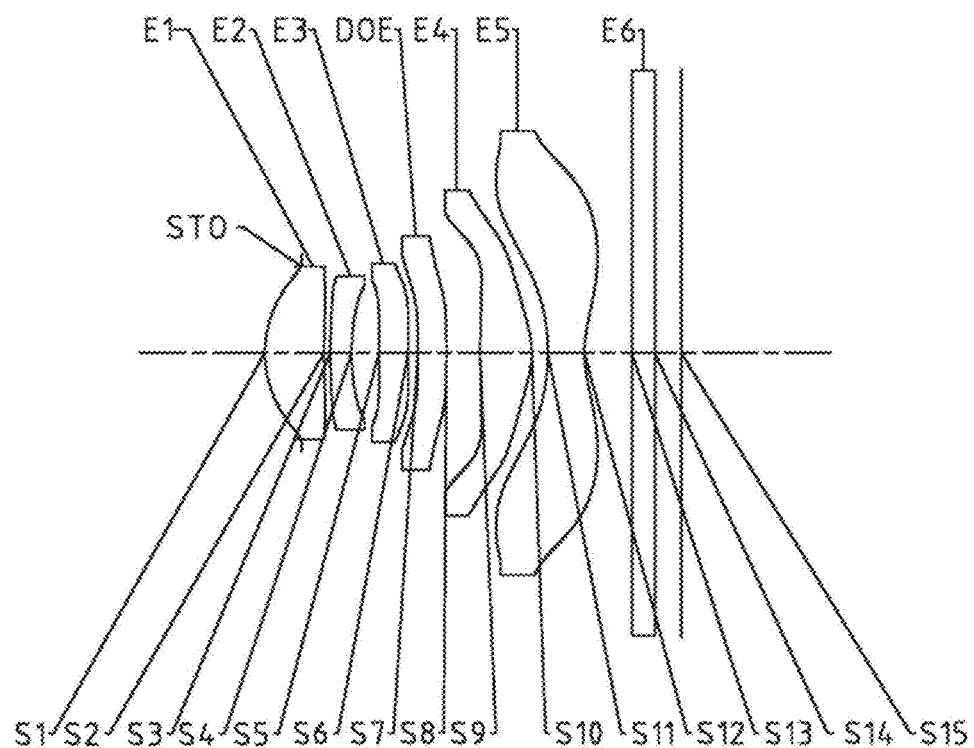
Fig. 23

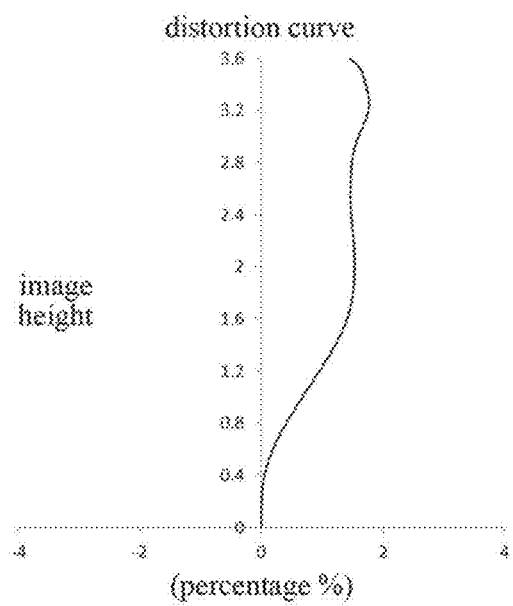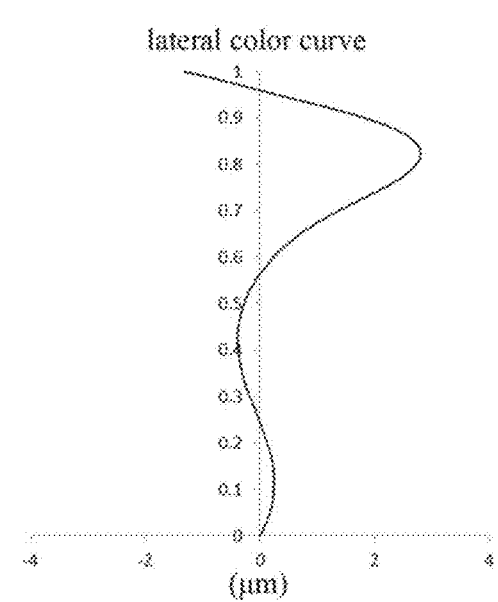
Fig. 34C
Fig. 34D

OPTICAL IMAGING LENS ASSEMBLY

CROSS-REFERENCE TO RELATED APPLICATION

This application is a continuation of International Application No. PCT/CN2018/075906, filed on Feb. 9, 2018, which claims priorities and rights to Chinese Patent Application No. 201710543314.X and Chinese Patent Application No. 201720806436.9, filed with the China National Intellectual Property Administration (CNIPA) on Jul. 5, 2017. All of the aforementioned applications are hereby incorporated by reference in their entireties.

TECHNICAL FIELD

The present disclosure relates to an optical imaging lens assembly, and more specifically to an optical imaging lens assembly including six lenses.

BACKGROUND

As the science and technology develop, the semiconductor technology is constantly improving. Accordingly, high-quality imaging lens assemblies have gradually become the leading trend in the market. With the rapid upgrading of portable electronic products such as mobile phones and tablet computers, the electronic products are becoming increasingly thinner and smaller. In particular, the 360-degree around view application currently having a growing market has raised higher requirements on performances of an optical imaging lens assembly such as high pixel, high resolution, miniaturization, lightweight, brightness, wide field-of-view, and image quality.

In order to satisfy the requirements of miniaturization and high quality, with the increasing development of the portable electronic products such as smart phones, higher requirements on the imaging lens assembly, especially in situations such as insufficient lighting (e.g., cloudy and rainy days, at dusk, night view, and a starry sky), have been raised. Accordingly, an F-number of 2.0 or above has been unable to meet higher-order imaging requirements. In order to acquire a greater amount of light admitted, the imaging lens assembly having a smaller F-number is required. In order to satisfy a higher image quality to provide a better imaging experience for a user, more lenses are needed, and thus the lens assembly having a plurality of lenses becomes a main product in the high-end market.

Therefore, the present disclosure proposes a miniaturized optical imaging lens assembly having a large aperture and a good image quality that can be applied to the portable electronic products.

SUMMARY

The technical solution provided by the present disclosure at least solves some of the above-mentioned technical problems.

According to an implementation, the present disclosure provides an optical imaging lens assembly. The optical imaging lens assembly sequentially includes, from an object side to an image side along an optical axis, a first lens group and a second lens group. The first lens group includes a first lens having a positive refractive power and a second lens having a negative refractive power. The second lens group includes at least one optical element and at least one lens having a refractive power. An object-side surface and an image-side surface of the at least one optical element are aspheric surfaces. A combined refractive power of the first lens and the second lens is a positive refractive power. An effective focal length f1 of the first lens and a combined focal length f12 of the first lens and the second lens may satisfy: f1/f12>0.65.

According to another implementation, the present disclosure provides an optical imaging lens assembly. The optical imaging lens assembly sequentially includes, from an object side to an image side along an optical axis, a first lens group and a second lens group. The first lens group includes a first lens having a positive refractive power and a second lens having a negative refractive power. The second lens group includes at least one optical element and at least one lens having a refractive power. An object-side surface and an image-side surface of the at least one optical element are aspheric surfaces. The optical imaging lens assembly satisfies: $0 \leq \Sigma CT/\Sigma AT \leq 3$, for example, $0.57 \leq \Sigma CT/\Sigma AT \leq 2.85$. $\Sigma CT$ is a sum of center thicknesses of lenses having refractive powers from the first lens to a lens closest to an image plane. $\Sigma AT$ is a sum of air spacings on the optical axis between any two adjacent lenses having refractive powers from the first lens to the lens closest to the image plane.

According to another implementation, the present disclosure provides an optical imaging lens assembly. The optical imaging lens assembly sequentially includes, from an object side to an image side along an optical axis, a first lens group and a second lens group. The first lens group includes a first lens having a positive refractive power and a second lens having a negative refractive power. A combined refractive power of the first lens and the second lens is a positive refractive power. The second lens group includes at least one optical element and a plurality of lenses having refractive powers. An object-side surface and an image-side surface of the at least one optical element are aspheric surfaces. One lens, in the plurality of lenses, closest to an image plane of the optical imaging lens assembly has a negative refractive power. The optical imaging lens assembly satisfies $-3 \leq f12/fL \leq -1$, f12 represents a combined focal length of the first lens and the second lens, and fL represents an effective refractive power of the one lens closest to the image plane in the second lens group.

In an implementation, a distance TTL on the optical axis from an object-side surface of the first lens to the image plane of the optical imaging lens assembly and half of a diagonal length ImgH of an effective pixel area on the image plane of the optical imaging lens assembly may satisfy: $TTL/ImgH \leq 1.5$.

In an implementation, the second lens group may include an optical element not having a refractive power and three lenses having refractive powers. One lens, in the three lenses having the refractive powers, closest to the image plane of the optical imaging lens assembly may have a negative refractive power.

In an implementation, the second lens group may include two optical elements not having a refractive power and two lenses having refractive powers. One lens, in the two lenses having the refractive powers, closest to the image plane of the optical imaging lens assembly may have a negative refractive power.

In an implementation, an effective focal length f1 of the first lens and the combined focal length f12 of the first lens and the second lens may satisfy: f1/f12>0.65.

In an implementation, the optical imaging lens assembly may satisfy: $0 \leq \Sigma CT/\Sigma AT \leq 3$, for example, $0.57 \leq \Sigma CT/\Sigma AT \leq 2.85$. $\Sigma CT$ is a sum of center thicknesses of lenses having refractive powers from the first lens to the lens closest to the image plane. ΣAT is a sum of air spacings on the optical axis between any two adjacent lenses having refractive powers from the first lens to the lens closest to the image plane.

In an implementation, a radius of curvature RL1 of an object-side surface of the lens closest to the image plane and a radius of curvature RL2 of an image-side surface of the lens closest to the image plane may satisfy: |RL1+RL2|/ |RL1−RL2|≤3, for example, |RL1+RL2|/|RL1−RL2|≤2.3.

In an implementation, the combined refractive power of the first lens and the second lens is the positive refractive power.

In an implementation, an abbe number V1 of the first lens and an abbe number Vne of the optical element not having the refractive power may satisfy: |Vne−V1|≤40, for example, |Vne−V1|≤33.74.

In an implementation, the sum ΣAT of the air spacings on the optical axis between any two adjacent lenses having the refractive powers from the first lens to the lens closest to the image plane and an effective focal length f of the optical imaging lens assembly may satisfy: 0≤ΣAT/f≤1.1, for example, 0.20≤ΣAT/f≤1.05.

According to another implementation, the present disclosure further provides an optical imaging lens assembly. The optical imaging lens assembly sequentially includes, from an object side to an image side along an optical axis, a first lens group and a second lens group. The first lens group includes a first lens having a positive refractive power and a second lens having a negative refractive power. The second lens group includes at least one optical element and at least one lens having a refractive power. An object-side surface and an image-side surface of the at least one optical element are aspheric surfaces. Half of a diagonal length ImgH of an effective pixel area on an image plane of the optical imaging lens assembly and an effective focal length f of the optical imaging lens assembly may satisfy: ImgH/ f≥0.85.

According to another implementation, the present disclosure further provides an optical imaging lens assembly. The optical imaging lens assembly sequentially includes, from an object side to an image side along an optical axis, a first lens group and a second lens group. The first lens group includes a first lens having a positive refractive power and a second lens having a negative refractive power. The second lens group includes at least one optical element and at least one lens having a refractive power. An object-side surface and an image-side surface of the at least one optical element are aspheric surfaces. A combined focal length f12 of the first lens and the second lens and an effective refractive power fL of a lens closest to an image plane may satisfy: −3≤f12/fL≤−1.

According to another implementation, the present disclosure further provides an optical imaging lens assembly. The optical imaging lens assembly sequentially includes, from an object side to an image side along an optical axis, a first lens group and a second lens group. The first lens group includes a first lens having a positive refractive power and a second lens having a negative refractive power. The second lens group includes at least one optical element and at least one lens having a refractive power. An object-side surface and an image-side surface of the at least one optical element are aspheric surfaces. A radius of curvature R3 of an object-side surface of the second lens and a radius of curvature R4 of an image-side surface of the second lens may satisfy: |R3−R4|/|R3+R4|≤3.

According to another implementation, the present disclosure further provides an optical imaging lens assembly. The optical imaging lens assembly sequentially includes, from an object side to an image side along an optical axis, a first lens group and a second lens group. The first lens group includes a first lens having a positive refractive power and a second lens having a negative refractive power. The second lens group includes at least one optical element and at least one lens having a refractive power. An object-side surface and an image-side surface of the at least one optical element are aspheric surfaces. A radius of curvature R1 of an object-side surface of the first lens and a radius of curvature R4 of an image-side surface of the second lens may satisfy: 0≤R1/R4≤1.

According to another implementation, the present disclosure further provides an optical imaging lens assembly. The optical imaging lens assembly sequentially includes, from an object side to an image side along an optical axis, a first lens group and a second lens group. The first lens group includes a first lens having a positive refractive power and a second lens having a negative refractive power. The second lens group includes at least one optical element and at least one lens having a refractive power. An object-side surface and an image-side surface of the at least one optical element are aspheric surfaces. An effective focal length f of the optical imaging lens assembly and an entrance pupil diameter EPD of the optical imaging lens assembly may satisfy: f/EPD≤2.0.

The optical imaging lens assembly with the above configuration may further have at least one of the beneficial effects of large aperture, miniaturization, high image quality, low sensitivity, balanced aberration and the like.

BRIEF DESCRIPTION OF THE DRAWINGS

The above and other advantages of implementations of the present disclosure will become apparent from the detailed description given with reference to the accompanying drawings, which are intended to illustrate the exemplary implementations of the present disclosure rather than limit them. In the accompanying drawings:

FIGS. 6A-6D respectively illustrate a longitudinal aberration curve, an astigmatic curve, a distortion curve, and a lateral color curve of the optical imaging lens assembly according to Embodiment 3;

FIG. 7 is a schematic structural diagram illustrating an optical imaging lens assembly according to Embodiment 4 of the present disclosure;

FIGS. 22A-22D respectively illustrate a longitudinal aberration curve, an astigmatic curve, a distortion curve, and a lateral color curve of the optical imaging lens assembly according to Embodiment 11;

FIG. 23 is a schematic structural diagram illustrating an optical imaging lens assembly according to Embodiment 12 of the present disclosure;

FIGS. 34A-34D respectively illustrate a longitudinal aberration curve, an astigmatic curve, a distortion curve, and a lateral color curve of the optical imaging lens assembly according to Embodiment 17.

DETAILED DESCRIPTION OF EMBODIMENTS

Figure 1:
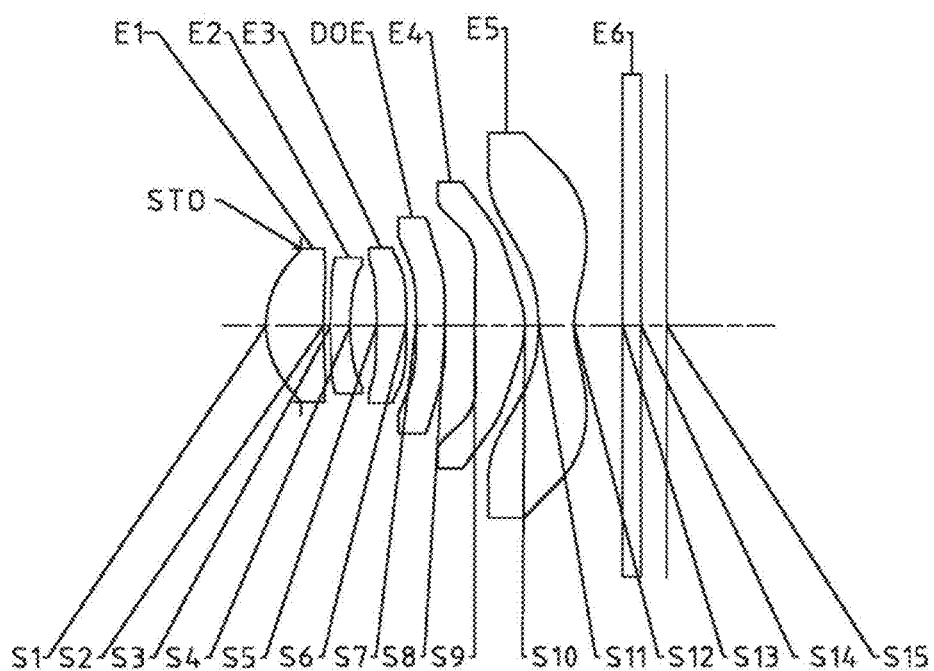
FIG. 1 is a schematic structural diagram illustrating an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration of the exemplary implementations of the present disclosure rather than a limitation on the scope of the present disclosure in any way. Throughout the specification, the same reference numerals designate the same elements. The expression "and/or" includes any and all combinations of one or more of the associated listed items.

It should be noted that in the specification, the expressions, such as "first," and "second" are only used to distinguish one feature from another, rather than represent any limitations to the features. Thus, the first lens discussed below may also be referred to as the second lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

It should be further understood that the terms "comprising," "including," "having" and variants thereof, when used in the specification, specify the presence of stated features, entireties, steps, operations, elements and/or components, but do not exclude the presence or addition of one or more other features, entireties, steps, operations, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

As used herein, the terms "substantially," "about" and similar terms are used to indicate an approximation rather than a degree, and are intended to be illustrative of the inherent deviations of measured or calculated values as recognized by those of ordinary skill in the art.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the paraxial area refers to an area near the optical axis. The first lens is the lens closest to the object and the fourth lens or the fifth lens is the lens closest to the photosensitive element. In this text, the surface closest to the object in each lens is referred to as the object-side surface, and the surface closest to the image plane in each lens is referred to as the image-side surface.

It should also be noted that the embodiments in the present disclosure and the features in the embodiments may be combined with each other on a non-conflict basis. The present disclosure will be described below in detail with reference to the accompanying drawings and in combination with the embodiments.

The present disclosure is further described below with reference to the specific embodiments.

The optical imaging lens assembly according to exemplary implementations of the present disclosure has, for example, two lens groups, i.e., a first lens group and a second lens group. The two lens groups are arranged in sequence from an object side to an image side along an optical axis.

In an exemplary implementation, the first lens group may include a first lens and a second lens. The second lens group may include at least one optical element and at least one lens having a refractive power, where an object-side surface and an image-side surface of the at least one optical element are aspheric surfaces. The first lens may have a positive refractive power, the second lens may have a negative refractive power, and the optical element does not have a refractive power. Through a reasonable configuration, in the situation where it is ensured that the refractive power of the entire system and the refractive power of each lens are basically not changed, aberrations in the peripheral field are well corrected using a double-sided aspheric. Accordingly, not only low-order aberrations of the control system may be effectively balanced, which makes the optical imaging lens assembly obtain a good imaging quality, but also an aperture may be enlarged and miniaturization of the lens assembly is ensured at the same time.

In an exemplary implementation, the second lens group may include one optical element not having a refractive power and three lenses having refractive powers. In the three lenses having the refractive powers, one lens closest to an image plane of the optical imaging lens assembly may have a negative refractive power.

In another exemplary implementation, the second lens group may include two optical elements not having a refractive power and two lenses having refractive powers. In the two lenses having the refractive powers, one lens closest to the image plane of the optical imaging lens assembly may have a negative refractive power.

In an exemplary implementation, an effective focal length f1 of the first lens and a combined focal length f12 of the first lens and the second lens may satisfy: $f1/f12>0.65$, and more specifically, may further satisfy: $f1/f12 \geq 0.68$. By reasonably configuring the combined focal length of the first lens and the second lens, it may help to reduce the field curvature of the optical imaging lens assembly system and reduce longitudinal spherical aberrations.

In an exemplary implementation, a distance TTL on the optical axis from an object-side surface of the first lens to the image plane of the optical imaging lens assembly and half of a diagonal length ImgH of an effective pixel area on the image plane of the optical imaging lens assembly may satisfy: $TTL/ImgH \leq 1.5$, and more specifically, may further satisfy: $TTL/ImgH \leq 1.47$. Through this configuration, aberrations in the edge field may be reduced, and the size of the optical imaging lens assembly system may be effectively compressed, thereby ensuring the demand of miniaturization of the lens assembly.

In an exemplary implementation, the half of the diagonal length ImgH of the effective pixel area on the image plane of the optical imaging lens assembly and an effective focal length f of the optical imaging lens assembly may satisfy: $ImgH/f \geq 0.85$, and more specifically, may further satisfy: $ImgH/f \geq 0.86$. By reasonably selecting the ratio of ImgH to f, the field of view of the lens assembly of the system can be enhanced, thereby ensuring a large field-of-view characteristic of the system lens assembly.

In an exemplary implementation, the combined focal length f12 of the first lens and the second lens and an effective refractive power fL of the lens closest to the image plane may satisfy: $-3 \leq f12/fL \leq -1$, and more specifically, may further satisfy: $-2.94 \leq f12/fL \leq -1.14$. By reasonably configuring f12 and fL, the overall refractive power of the system may basically be determined, and aberrations such as longitudinal chromatic aberrations, high-order astigmatism or distortions are simultaneously improved.

In an exemplary implementation, a radius of curvature R3 of an object-side surface of the second lens and a radius of curvature R4 of an image-side surface of the second lens may satisfy: $|R3-R4|/|R3+R4| \leq 3$, and more specifically, may further satisfy: $|R3-R4|/|R3+R4| \leq 2.64$. When the aperture of the lens assembly is enlarged, high-order spherical aberrations may be effectively improved by changing the configuration of the radii of curvature.

In an exemplary implementation, a radius of curvature R1 of an object-side surface of the first lens and the radius of curvature R4 of the image-side surface of the second lens may satisfy: $0 \leq R1/R4 \leq 1$, and more specifically, may further satisfy: $0.14 \leq R1/R4 \leq 0.57$. Through the mutual compensation of the radius of curvature of the object-side surface of the first lens and the radius of curvature of the image-side surface of the second lens, the spherical aberrations may be effectively improved. Meanwhile, it is conducive to determining the shapes of the object-side surface of the first lens and the image-side surface of the second lens, which ensures the processability.

In an exemplary implementation, the effective focal length f of the optical imaging lens assembly and an entrance pupil diameter EPD of the optical imaging lens assembly may satisfy: $f/EPD \leq 2.0$, and more specifically, may further satisfy: $f/EPD \leq 1.99$. Through this configuration, it may be conducive to increasing the amount of light admitted, so that the system has a large-aperture advantage, thereby enhancing the imaging effect in a dark environment.

In an exemplary implementation, the optical imaging lens assembly satisfies $0 \leq \Sigma CT/\Sigma AT \leq 3$, and more specifically, may further satisfy: 0.57≤ΣCT/ΣAT≤2.85. ΣCT is a sum of center thicknesses of lenses having refractive powers from the first lens to the lens closest to the image plane, and ΣAT is a sum of air spacings on the optical axis between any two adjacent lenses having refractive powers from the first lens to the lens closest to the image plane. Through this configuration, the optical imaging lens assembly may have a good image quality, and the miniaturization of the lens assembly is ensured at the same time.

In an exemplary implementation, a radius of curvature RL1 of an object-side surface of the lens closest to the image plane and a radius of curvature RL2 of an image-side surface of the lens closest to the image plane may satisfy: |RL1+RL2|/|RL1−RL2|≤3, and more specifically, may further satisfy: |RL1+RL2|/|RL1−RL2|≤2.3. This configuration may help matching the incident angle of the chief ray angle for a chip, which improves the relative brightness and corrects the astigmatism at the same time.

In an exemplary implementation, an abbe number V1 of the first lens and an abbe number Vne of the optical element not having the refractive power may satisfy: |Vne−V1|≤40, and more specifically, may further satisfy: |Vne−V1|≤33.74. Through the interactions between abbe numbers of different materials, the aberrations may be corrected.

In an exemplary implementation, the sum ΣAT of the air spacings on the optical axis between any two adjacent lenses having the refractive powers from the first lens to the lens closest to the image plane and the effective focal length f of the optical imaging lens assembly may satisfy: 0≤ΣAT/f≤1.1, and more specifically, may further satisfy: 0.20≤ΣAT/f≤1.05. Through this configuration, the miniaturization of the lens assembly may be ensured. By changing the spacing distances on the axis, the deflection of light may tend to be mitigated, which reduces the generation of corresponding aberrations and reduces the sensitivity.

In an exemplary implementation, the optical imaging lens assembly may also include an aperture STO for limiting light beams to adjust the amount of light admitted and improve the image quality. The optical imaging lens assembly according to the above implementations of the present disclosure may include multiple lenses, for example, six lenses as described above. By reasonably allocating the refractive power, the surface type of each lens, the center thickness of each lens, the spacing distances on the axis between the lenses, etc., it is possible to effectively enlarge the aperture of the optical imaging lens assembly, reduce the system sensitivity, ensure the miniaturization of the lens assembly and improve the image quality, thus making the optical imaging lens assembly more conducive to the production and processing and applicable to portable electronic products. In the implementations of the present disclosure, at least one of the surfaces of the each lens is an aspheric surface. The aspheric lens is characterized in that its curvature continuously changes from the center of the lens to the periphery. In contrast to a spherical lens having a constant curvature from the center of the lens to the periphery, the aspheric lens has a better radius-of-curvature characteristic, and has advantages of improving a distortion aberration and an astigmatic aberration, which can make the visual field larger and more realistic. The use of the aspheric lens can eliminate as much as possible the aberrations that occur during the imaging, thereby improving the image quality. In addition, the use of the aspheric lens may also effectively reduce the number of lenses in the optical system.

However, it should be understood by those skilled in the art that the various results and advantages described in the present specification may be obtained by changing the number of the lenses constituting the lens assembly without departing from the technical solution claimed by the present disclosure. For example, although six optical elements are described as an example in the implementations, the optical imaging lens assembly is not limited to include six optical elements. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D.

FIG. 1 is a schematic structural diagram illustrating the optical imaging lens assembly according to Embodiment 1 of the present disclosure. As shown in FIG. 1, the optical imaging lens assembly includes, along the optical axis from the object side to the image side, two lens group arranged in sequence. The first lens group includes a first lens E1 and a second lens E2. The second lens group includes a third lens E3, an optical element DOE, a fourth lens E4, and a fifth lens E5 closest to the image plane. The first lens E1 has an object-side surface S1 and an image-side surface S2. The second lens E2 has an object-side surface S3 and an image-side surface S4. The third lens E3 has an object-side surface S5 and an image-side surface S6. The optical element DOE has an object-side surface S7 and an image-side surface S8. The fourth lens E4 has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The third lens E3 has a negative refractive power. The object-side surface and the image-side surface of the optical element DOE are aspheric surfaces, and the optical element DOE does not have a refractive power. The fourth lens E4 has a positive refractive power. The fifth lens E5 closest to the image plane has a negative refractive power.

The optical imaging lens assembly in this embodiment further includes an aperture STO for limiting light beams. The optical imaging lens assembly according to Embodiment 1 may include an optical filter E6 having an object-side surface S13 and an image-side surface S14. The optical filter E6 may be used to correct color deviations. Light from an object sequentially passes through the surfaces S1-S14 and finally forms an image on the image plane S15.

Table 1 shows the surface type, the radius of curvature, the thickness, the material and the conic coefficient of each lens of the optical imaging lens assembly in Embodiment 1.

TABLE 1

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3970 | | | |
| S1 | aspheric | 1.4604 | 0.6570 | 1.546 | 54.11 | −2.2306 |
| S2 | aspheric | 6.6742 | 0.0820 | | | −4.5489 |
| S3 | aspheric | 7.3483 | 0.2300 | 1.666 | 20.37 | −2.2629 |
| S4 | aspheric | 3.3613 | 0.3023 | | | 0.3122 |
| S5 | aspheric | −113.8785 | 0.3382 | 1.546 | 54.11 | −68.9000 |
| S6 | aspheric | 142.7573 | 0.1124 | | | 2.0000 |
| S7 | aspheric | infinite | 0.3300 | 1.645 | 23.53 | 1.9996 |
| S8 | aspheric | infinite | 0.3385 | | | 1.9997 |
| S9 | aspheric | 25.0474 | 0.5733 | 1.546 | 54.11 | −68.9000 |
| S10 | aspheric | −1.1889 | 0.1594 | | | −7.2419 |
| S11 | aspheric | −2.8211 | 0.4000 | 1.536 | 55.87 | −1.7061 |
| S12 | aspheric | 1.3471 | 0.5645 | | | −11.1092 |
| S13 | spherical | infinite | 0.2100 | 1.517 | 64.17 | |
| S14 | spherical | infinite | 0.2924 | | | |
| S15 | spherical | infinite | 0.0000 | | | |

As shown in Table 1, the radius of curvature R3 of the object-side surface of the second lens and the radius of curvature R4 of the image-side surface of the second lens satisfy: |R3−R4|/|R3+R4|=0.37. The radius of curvature R1 of the object-side surface of the first lens and the radius of curvature R4 of the image-side surface of the second lens satisfy: R1/R4=0.43. The sum of the center thicknesses of the lenses having the refractive powers from the first lens to the lens closest to the image plane, and the sum ΣAT of the air spacings on the optical axis between any two adjacent lenses having the refractive powers from the first lens to the lens closest to the image plane satisfy: ΣCT/ΣAT=1.66. The radius of curvature RL1 of the object-side surface of the lens closest to the image plane and the radius of curvature RL2 of the image-side surface of the lens closest to the image plane satisfy: |RL1+RL2|/|RL1−RL2|=0.35.

In this embodiment, an optical imaging lens assembly having six optical elements is used as an example. By reasonably allocating the focal lengths and the surface types of the lenses, the aperture of the lens assembly is effectively enlarged, and the total track length of the lens assembly is shortened, thereby ensuring the large aperture and the miniaturization of the lens assembly. Meanwhile, various types of aberrations are corrected, which improves the resolution and the imaging quality of the lens assembly. The surface type x of each aspheric surface is defined by the following formula:

$$x = \frac{ch^2}{1+\sqrt{1-(k+1)c^2h^2}} + \sum A_i h^i. \quad (1)$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in the above Table 1); and $A_i$ is the $i^{th}$ order correction coefficient of the aspheric surface. Table 2 below shows the high-order coefficients $A_4$, $A_6$, $A_8$, $A_{10}$, $A_{12}$, $A_{14}$, and $A_{16}$ applicable to the surfaces S1-S12 in Embodiment 1.

TABLE 2

| Surface number | A4 | A6 | A8 | A10 | A12 | A14 | A16 |
|---|---|---|---|---|---|---|---|
| S1 | 8.5314E−02 | 4.4961E−03 | −2.9094E−02 | 5.1225E−02 | −6.1562E−02 | 3.4631E−02 | −1.4056E−02 |
| S2 | −1.1206E−01 | 1.1736E−01 | −4.7056E−03 | −3.0192E−01 | 5.0758E−01 | −3.7559E−01 | 1.0379E−01 |
| S3 | −1.4857E−01 | 3.2858E−01 | −3.1003E−01 | 2.0958E−01 | −5.0749E−01 | 0.0000E+00 | 0.0000E+00 |
| S4 | −6.0413E−02 | 2.7784E−01 | −3.3743E−01 | 6.1028E−01 | −7.7804E−01 | 5.3028E−01 | 0.0000E+00 |
| S5 | −1.0612E−01 | −2.6570E−01 | 1.4256E+00 | −4.7017E+00 | 8.5829E+00 | −8.3052E+00 | 3.3923E+00 |
| S6 | −1.4781E−01 | −6.1877E−02 | −7.5279E−03 | 1.1611E−01 | −1.5226E−02 | −1.2101E−01 | 8.8306E−02 |
| S7 | −1.7235E−01 | 7.4691E−02 | −4.2489E−01 | 9.9643E−01 | −9.3451E−01 | 3.9510E−01 | −6.2293E−02 |
| S8 | −1.2968E−01 | 5.8657E−02 | −2.1700E−01 | 3.9052E−01 | −2.8361E−01 | 9.4327E−02 | −1.2116E−02 |
| S9 | 1.8492E−02 | 1.8529E−01 | −1.0838E−01 | 7.5774E−02 | −3.4927E−02 | 1.1121E−02 | −1.4795E−03 |
| S10 | −2.5036E−02 | 1.9424E−01 | −2.1297E−01 | 9.3711E−02 | −1.9417E−02 | 1.7451E−03 | −4.0307E−05 |
| S11 | −6.9717E−02 | 2.7390E−02 | 1.2130E−03 | −1.4547E−03 | 1.2255E−04 | 1.4933E−05 | −1.9066E−06 |
| S12 | −1.0563E−01 | 5.8639E−02 | −2.6657E−02 | 7.9612E−03 | −1.4633E−03 | 1.4673E−04 | −6.0272E−06 |

Table 3 below shows the effective focal lengths f1-f5 of the lenses in Embodiment 1, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly.

TABLE 3

| f1(mm) | 3.27 | f(mm) | 3.91 |
|---|---|---|---|
| f2(mm) | −9.49 | TTL(mm) | 4.59 |
| f3(mm) | −115.86 | ImgH(mm) | 3.40 |
| f4(mm) | 2.09 | | |
| f5(mm) | −1.64 | | |

According to Table 1 and Table 3, the half of the diagonal length ImgH of the effective pixel area on the image plane of the optical imaging lens assembly and the effective focal length f of the optical imaging lens assembly satisfy: ImgH/f=0.87. The distance TTL on the optical axis from the object-side surface of the first lens to the image plane of the optical imaging lens assembly and the half of the diagonal length ImgH of the effective pixel area on the image plane of the optical imaging lens assembly satisfy: TTL/ImgH=1.35. The sum ΣAT of the air spacings on the optical axis between any two adjacent lenses having the refractive powers from the first lens to the lens closest to the image plane and the effective focal length f of the optical imaging lens assembly satisfy: ΣAT/f=0.34.

In this embodiment, the effective focal length f1 of the first lens and the combined focal length f12 of the first lens and the second lens satisfy: f1/f12=0.75. The combined focal length f12 of the first lens and the second lens and the effective refractive power fL of the lens closest to the image plane satisfy: f12/fL=−2.67. The effective focal length f of the optical imaging lens assembly and the entrance pupil diameter EPD of the optical imaging lens assembly satisfy: f/EPD=1.88. The abbe number V1 of the first lens and the abbe number Vne of the optical element not having the refractive power satisfy: |Vne−V1|=30.6.

Figures 2A, 2B:
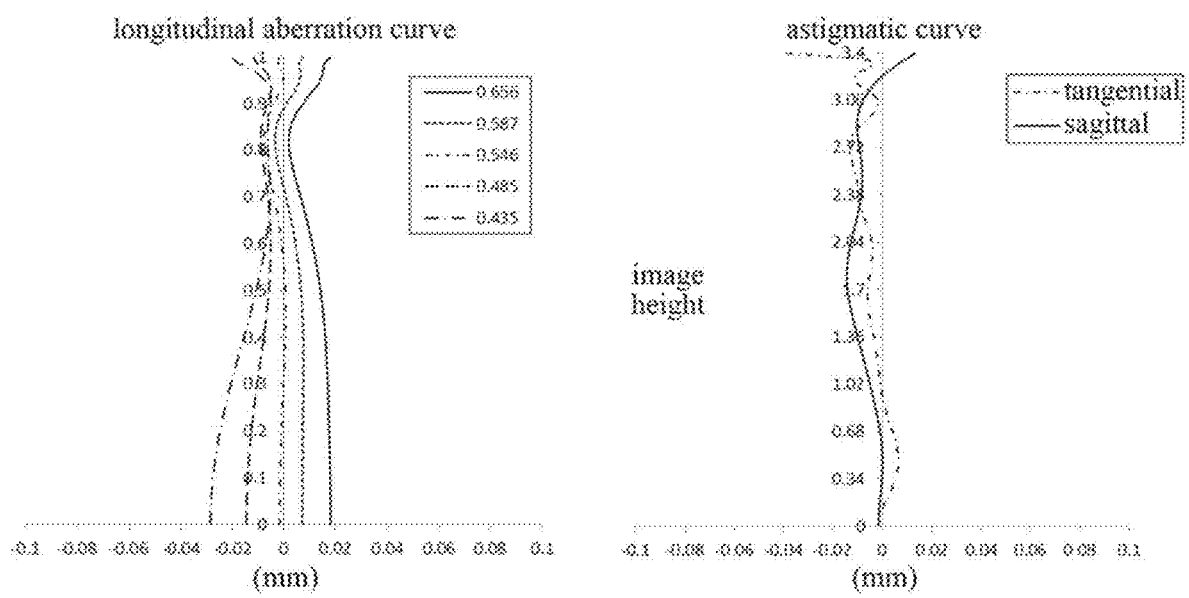
FIGS. 2A-2D respectively illustrate a longitudinal aberration curve, an astigmatic curve, a distortion curve, and a lateral color curve of the optical imaging lens assembly according to Embodiment 1.
Figures 2C, 2D:
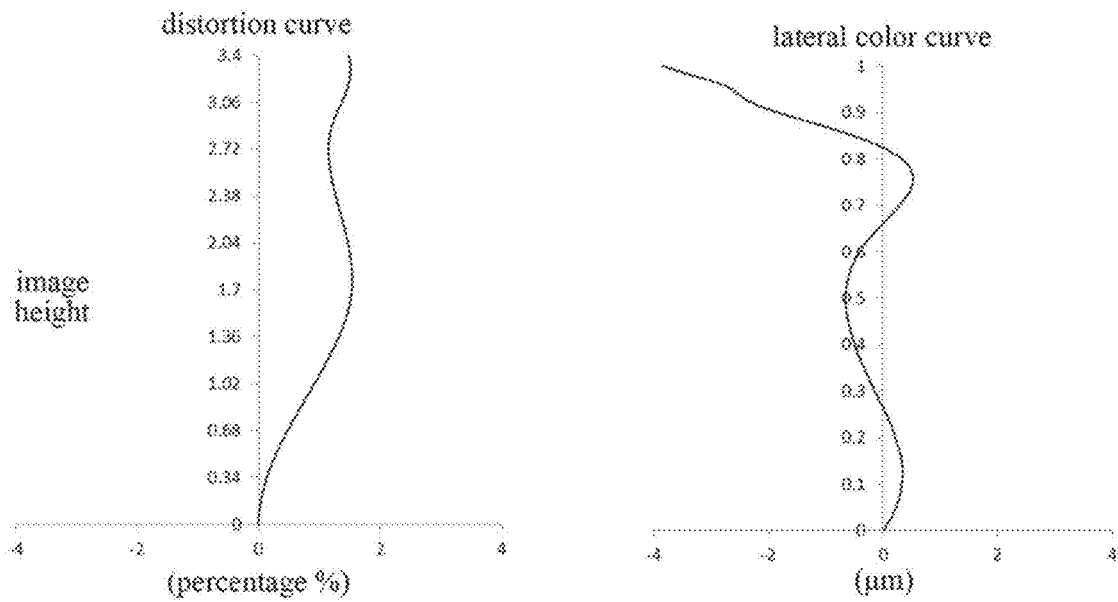

FIG. 2A illustrates the longitudinal aberration curve of the optical imaging lens assembly according to Embodiment 1, representing deviations of focal points of light of different wavelengths converged after passing through the optical imaging lens assembly. FIG. 2B illustrates the astigmatic curve of the optical imaging lens assembly according to Embodiment 1, representing a curvature of the tangential image plane and a curvature of the sagittal image plane. FIG. 2C illustrates the distortion curve of the optical imaging lens assembly according to Embodiment 1, representing amounts of distortion at different viewing angles. FIG. 2D illustrates the lateral color curve of the optical imaging lens assembly according to Embodiment 1, representing deviations of different image heights on an image plane after light passes through the optical imaging lens assembly. It can be seen from FIGS. 2A-2D that the optical imaging lens assembly according to Embodiment 1 can achieve a good imaging quality.

Embodiment 2

An optical imaging lens assembly according to Embodiment 2 of the present disclosure is described below with reference to FIGS. 3-4D. In addition to the parameters of the lenses in the optical imaging lens assembly, for example, in addition to the radius of curvature, the thickness, the conic coefficient, and the effective focal length of each lens, the spacing distances on the axis between the lenses, the high-order coefficients of each surface, etc., the optical imaging lens assemblies described in Embodiment 2 and the following embodiments are in the same arrangement and structure as the optical imaging lens assembly described in Embodiment 1. For the purpose of brevity, the description of parts similar to those in Embodiment 1 will be omitted.

Figure 3:
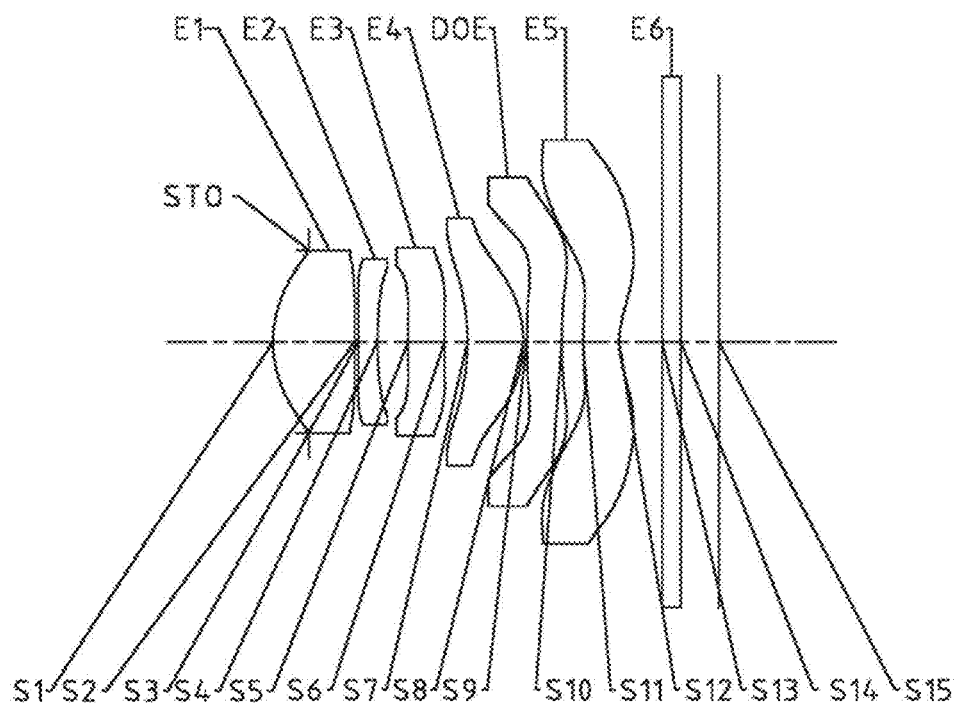
FIG. 3 is a schematic structural diagram illustrating an optical imaging lens assembly according to Embodiment 2 of the present disclosure.

FIG. 3 is a schematic structural diagram illustrating the optical imaging lens assembly according to Embodiment 2 of the present disclosure. As shown in FIG. 3, the optical imaging lens assembly according to Embodiment 2 includes two lens groups arranged in sequence from the object side to the image side. The first lens group includes a first lens E1 and a second lens E2. The second lens group includes a third lens E3, a fourth lens E4, an optical element DOE, and a fifth lens E5 closest to an image plane. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has object-side surface S7 and an image-side surface S8. The optical element DOE has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The third lens E3 has a positive refractive power. The fourth lens E4 has a positive refractive power. The object-side surface and the image-side surface of the optical element DOE are aspheric surfaces, and the optical element DOE does not have a refractive power. The fifth lens E5 closest to the image plane has a negative refractive power.

Table 4 below shows the surface type, the radius of curvature, the thickness, the material and the conic coefficient of each lens of the optical imaging lens assembly in Embodiment 2. Table 5 shows the high-order coefficients of the aspheric surfaces in Embodiment 2. Table 6 shows the effective focal lengths f1-f5 of the lenses in Embodiment 2, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 4

| | | | | material | | |
| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.3845 | | | |
| S1 | aspheric | 1.7199 | 0.9166 | 1.546 | 54.11 | −0.9880 |
| S2 | aspheric | 18.4734 | 0.0416 | | | −0.6000 |
| S3 | aspheric | 92.0487 | 0.2120 | 1.666 | 20.37 | −0.6000 |
| S4 | aspheric | 5.9214 | 0.3439 | | | −4.1856 |
| S5 | aspheric | 12.1178 | 0.4076 | 1.666 | 20.37 | −5.9821 |
| S6 | aspheric | 12.1737 | 0.2574 | | | −0.6015 |

TABLE 4-continued

| surface number | surface type | radius of curvature | thickness | material refractive index | abbe number | conic coefficient |
|---|---|---|---|---|---|---|
| S7 | aspheric | −3.8247 | 0.6285 | 1.546 | 54.11 | −2.5385 |
| S8 | aspheric | −1.5596 | 0.0358 | | | −0.9969 |
| S9 | aspheric | infinite | 0.3910 | 1.666 | 20.37 | −6.0000 |
| S10 | aspheric | infinite | 0.2377 | | | −6.0000 |
| S11 | aspheric | 3.3933 | 0.4020 | 1.546 | 54.11 | −1.0702 |
| S12 | aspheric | 1.1681 | 0.4816 | | | −5.4350 |
| S13 | spherical | infinite | 0.2100 | 1.517 | 64.17 | |
| S14 | spherical | infinite | 0.4244 | | | |
| S15 | spherical | infinite | 0.0000 | | | |

TABLE 5

| surface number | A4 | A6 | A8 | A10 | A12 |
|---|---|---|---|---|---|
| S1 | 4.0012E−03 | 8.5738E−02 | −2.4106E−01 | 3.8760E−01 | −3.7515E−01 |
| S2 | −1.2650E−01 | −2.3802E−03 | 7.2335E−01 | −1.8228E+00 | 2.1473E+00 |
| S3 | −1.2734E−01 | 2.0646E−01 | 3.5885E−01 | −1.3137E+00 | 1.5957E+00 |
| S4 | −2.8717E−02 | 4.9121E−02 | 6.0541E−01 | −2.2175E+00 | 3.8457E+00 |
| S5 | −1.5677E−01 | 1.5709E−01 | −6.8885E−01 | 1.3615E+00 | −1.5674E+00 |
| S6 | −1.2834E−01 | 1.9532E−01 | −5.4192E−01 | 7.9198E−01 | −7.4063E−01 |
| S7 | −1.0256E−01 | 2.8334E−01 | −3.5519E−01 | 7.4839E−02 | 2.1725E−01 |
| S8 | 9.8183E−02 | −3.6090E−01 | 6.6918E−01 | −7.4089E−01 | 4.8826E−01 |
| S9 | 3.3802E−01 | −8.1036E−01 | 1.0379E+00 | −9.4798E−01 | 6.0679E−01 |
| S10 | 3.7647E−01 | −7.2619E−01 | 7.2577E−01 | −4.8299E−01 | 2.1570E−01 |
| S11 | −2.5639E−01 | 4.2016E−02 | 8.6130E−03 | 1.9853E−02 | −1.9198E−02 |
| S12 | −1.9045E−01 | 1.1769E−01 | −6.5288E−02 | 3.0625E−02 | −1.0126E−02 |

| surface number | A14 | A16 | A18 | A20 |
|---|---|---|---|---|
| S1 | 2.0884E−01 | −6.3267E−02 | 7.8722E−03 | 0.0000E+00 |
| S2 | −1.3760E+00 | 4.6250E−01 | −6.3889E−02 | 0.0000E+00 |
| S3 | −8.9817E−01 | 2.0158E−01 | 0.0000E+00 | 0.0000E+00 |
| S4 | −3.7099E+00 | 1.9080E+00 | −4.0238E−01 | 0.0000E+00 |
| S5 | 9.3289E−01 | −2.2023E−01 | 0.0000E+00 | 0.0000E+00 |
| S6 | 4.6208E−01 | −1.7303E−01 | 2.9997E−02 | 0.0000E+00 |
| S7 | −1.9344E−01 | 6.1938E−02 | −6.9382E−03 | 0.0000E+00 |
| S8 | −1.7844E−01 | 3.2730E−02 | −2.3012E−03 | 0.0000E+00 |
| S9 | −2.6836E−01 | 7.7856E−02 | −1.3091E−02 | 9.5028E−04 |
| S10 | −6.3067E−03 | 1.1510E−02 | −1.1840E−03 | 5.2209E−05 |
| S11 | 6.8402E−03 | −1.2341E−03 | 1.1352E−04 | −4.2506E−06 |
| S12 | 2.1567E−03 | −2.8060E−04 | 2.0280E−05 | −6.2318E−07 |

TABLE 6

| f1(mm) | 3.41 | f(mm) | 3.96 |
|---|---|---|---|
| f2(mm) | −9.52 | TTL(mm) | 4.36 |
| f3(mm) | 1012.95 | ImgH(mm) | 3.40 |
| f4(mm) | 4.39 | | |
| f5(mm) | −3.49 | | |

Figure 4A:
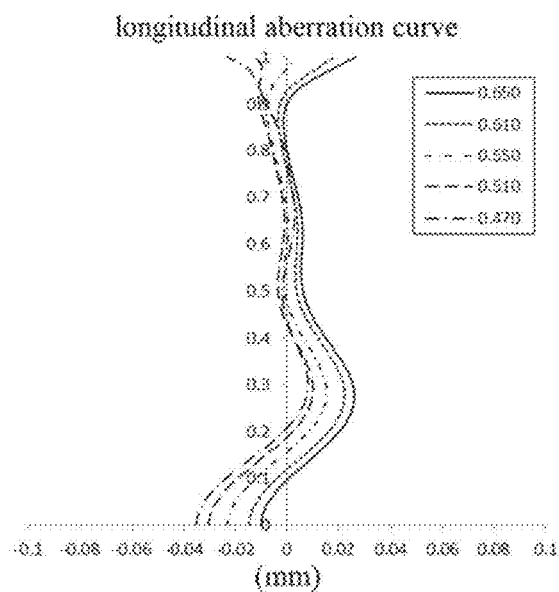
FIGS. 4A-4D respectively illustrate a longitudinal aberration curve, an astigmatic curve, a distortion curve, and a lateral color curve of the optical imaging lens assembly according to Embodiment 2.
Figure 4B:
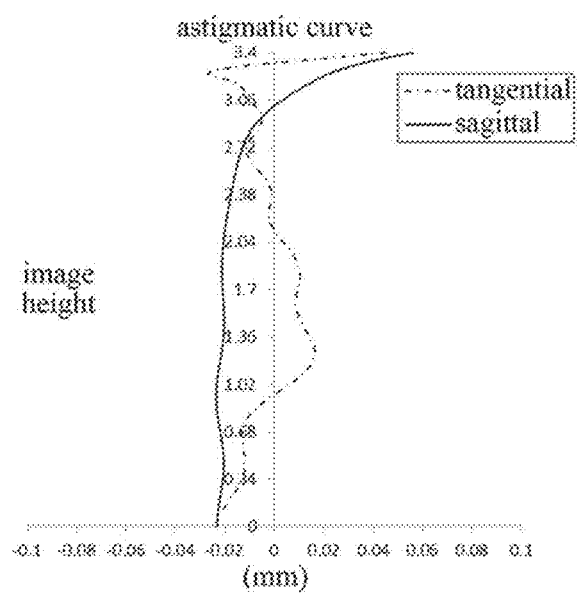
Figure 4C:
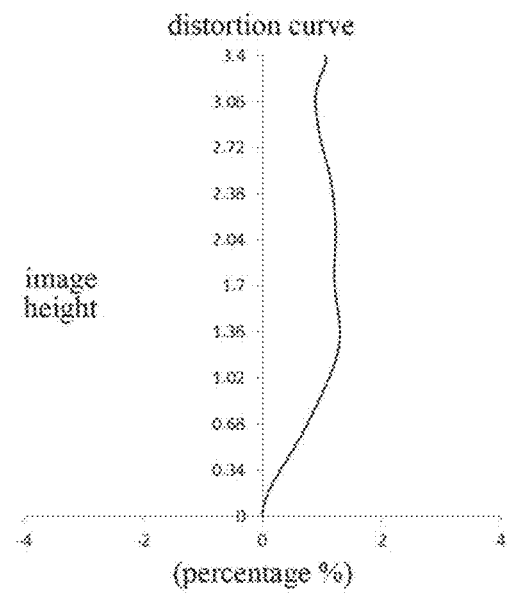
Figure 4D:
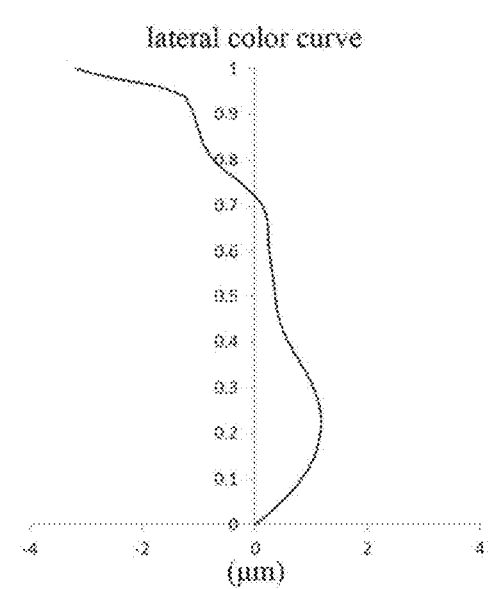

FIG. 4A illustrates the longitudinal aberration curve of the optical imaging lens assembly according to Embodiment 2, representing deviations of focal points of light of different wavelengths converged after passing through the optical imaging lens assembly. FIG. 4B illustrates the astigmatic curve of the optical imaging lens assembly according to Embodiment 2, representing a curvature of the tangential image plane and a curvature of the sagittal image plane. FIG. 4C illustrates the distortion curve of the optical imaging lens assembly according to Embodiment 2, representing amounts of distortion at different viewing angles. FIG. 4D illustrates the lateral color curve of the optical imaging lens assembly according to Embodiment 2, representing deviations of different image heights on an image plane after light passes through the optical imaging lens assembly. It can be seen from FIGS. 4A-4D that the optical imaging lens assembly according to Embodiment 2 can achieve a good imaging quality.

Embodiment 3

An optical imaging lens assembly according to Embodiment 3 of the present disclosure is described below with reference to FIGS. 5-6D.

Figure 5:
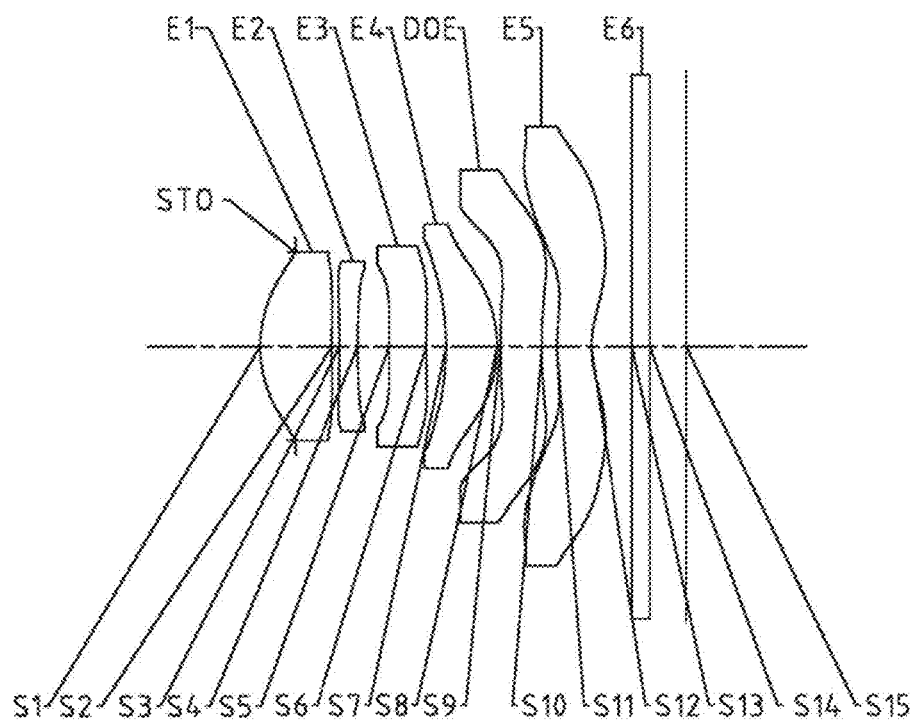
FIG. 5 is a schematic structural diagram illustrating an optical imaging lens assembly according to Embodiment 3 of the present disclosure.

FIG. 5 is a schematic structural diagram illustrating the optical imaging lens assembly according to Embodiment 3 of the present disclosure. As shown in FIG. 5, the optical imaging lens assembly according to Embodiment 3 includes two lens groups arranged in sequence from the object side to the image side. The first lens group includes a first lens E1 and a second lens E2. The second lens group includes a third lens E3, a fourth lens E4, an optical element DOE, and a fifth lens E5 closest to an image plane. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has object-side surface S7 and an image-side surface S8. The optical element DOE has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The third lens E3 has a negative refractive power. The fourth lens E4 has a positive refractive power. The object-side surface and the image-side surface of the optical element DOE are aspheric surfaces, and the optical element DOE does not have a refractive power. The fifth lens E5 closest to the image plane has a negative refractive power.

Table 7 below shows the surface type, the radius of curvature, the thickness, the material and the conic coefficient of each lens of the optical imaging lens assembly in Embodiment 3. Table 8 shows the high-order coefficients of the aspheric surfaces in Embodiment 3. Table 9 shows the effective focal lengths f1-f5 of the lenses in Embodiment 3, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 7

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.4067 | | | |
| S1 | aspheric | 1.6904 | 0.8448 | 1.546 | 54.11 | −0.8940 |
| S2 | aspheric | 12.4234 | 0.0898 | | | −0.6000 |
| S3 | aspheric | −26.7544 | 0.2127 | 1.666 | 20.37 | −0.6000 |
| S4 | aspheric | 12.0681 | 0.3663 | | | −59.3928 |
| S5 | aspheric | 11.7109 | 0.4330 | 1.666 | 20.37 | 21.7994 |
| S6 | aspheric | 7.1554 | 0.2343 | | | −14.7928 |
| S7 | aspheric | −4.0825 | 0.5974 | 1.546 | 54.11 | 0.3334 |
| S8 | aspheric | −1.5683 | 0.0371 | | | −0.9510 |
| S9 | aspheric | infinite | 0.4833 | 1.666 | 20.37 | −6.0000 |
| S10 | aspheric | infinite | 0.1748 | | | −6.0000 |
| S11 | aspheric | 3.0788 | 0.4000 | 1.546 | 54.11 | −1.2436 |
| S12 | aspheric | 1.1838 | 0.4819 | | | −5.8173 |
| S13 | spherical | infinite | 0.2100 | 1.517 | 64.17 | |
| S14 | spherical | infinite | 0.4244 | | | |
| S15 | spherical | infinite | 0.0000 | | | |

TABLE 8

| surface number | A4 | A6 | A8 | A10 | A12 |
|---|---|---|---|---|---|
| S1 | 1.6346E−02 | 1.0936E−02 | −1.5020E−02 | −5.1233E−03 | 2.4521E−02 |
| S2 | −9.3266E−02 | 7.5490E−02 | −6.4383E−02 | 8.7997E−02 | −1.7008E−01 |
| S3 | −1.1759E−01 | 2.6300E−01 | −2.1556E−01 | 1.3156E−01 | −9.9050E−02 |
| S4 | −5.8646E−02 | 9.2662E−02 | 6.7675E−01 | −2.8974E+00 | 5.8946E+00 |
| S5 | −1.9773E−01 | 3.5125E−01 | −1.4727E+00 | 3.3766E+00 | −4.3698E+00 |
| S6 | −1.3907E−01 | 2.0925E−01 | −5.6360E−01 | 8.3674E−01 | −7.1912E−01 |
| S7 | −8.0005E−02 | 2.5711E−01 | −3.9426E−01 | 1.0540E−01 | 3.6545E−01 |
| S8 | 1.3571E−01 | −3.7883E−01 | 5.1402E−01 | −4.4602E−01 | 2.5502E−01 |
| S9 | 2.9741E−01 | −6.7661E−01 | 7.5803E−01 | −6.1388E−01 | 3.6084E−01 |
| S10 | 3.2059E−01 | −5.7244E−01 | 5.0860E−01 | −3.0016E−01 | 1.1982E−01 |
| S11 | −2.1557E−01 | −4.3063E−02 | 1.1888E−01 | −6.2362E−02 | 1.6770E−02 |
| S12 | −1.5822E−01 | 6.2805E−02 | −1.5821E−02 | 4.6721E−03 | −1.6648E−03 |

| surface number | A14 | A16 | A18 | A20 |
|---|---|---|---|---|
| S1 | −2.3140E−02 | 5.2838E−03 | 2.3918E−04 | 0.0000E+00 |
| S2 | 1.6954E−01 | −7.6728E−02 | 1.2447E−02 | 0.0000E+00 |
| S3 | 8.6391E−02 | −2.8384E−02 | 0.0000E+00 | 0.0000E+00 |
| S4 | −6.6935E+00 | 4.0574E+00 | −1.0161E+00 | 0.0000E+00 |
| S5 | 2.9537E+00 | −8.0921E−01 | 0.0000E+00 | 0.0000E+00 |
| S6 | 3.6134E−01 | −9.5300E−02 | 9.7475E−03 | 0.0000E+00 |
| S7 | −4.3533E−01 | 1.9754E−01 | −3.3748E−02 | 0.0000E+00 |
| S8 | −8.3808E−02 | 1.3254E−02 | −6.7707E−04 | 0.0000E+00 |
| S9 | −1.5172E−01 | 4.2569E−02 | −6.8859E−03 | 4.7227E−04 |
| S10 | −3.1546E−02 | 5.2028E−03 | −4.8331E−04 | 1.9167E−05 |
| S11 | −2.5984E−03 | 2.3019E−04 | −1.0493E−05 | 1.7660E−07 |
| S12 | 4.1227E−04 | −5.9205E−05 | 4.5086E−06 | −1.4147E−07 |

TABLE 9

| | | | |
|---|---|---|---|
| f1(mm) | 3.49 | f(mm) | 3.96 |
| f2(mm) | −12.45 | TTL(mm) | 4.36 |
| f3(mm) | −28.69 | ImgH(mm) | 3.40 |
| f4(mm) | 4.30 | | |
| f5(mm) | −3.81 | | |

Figures 6A, 6B:
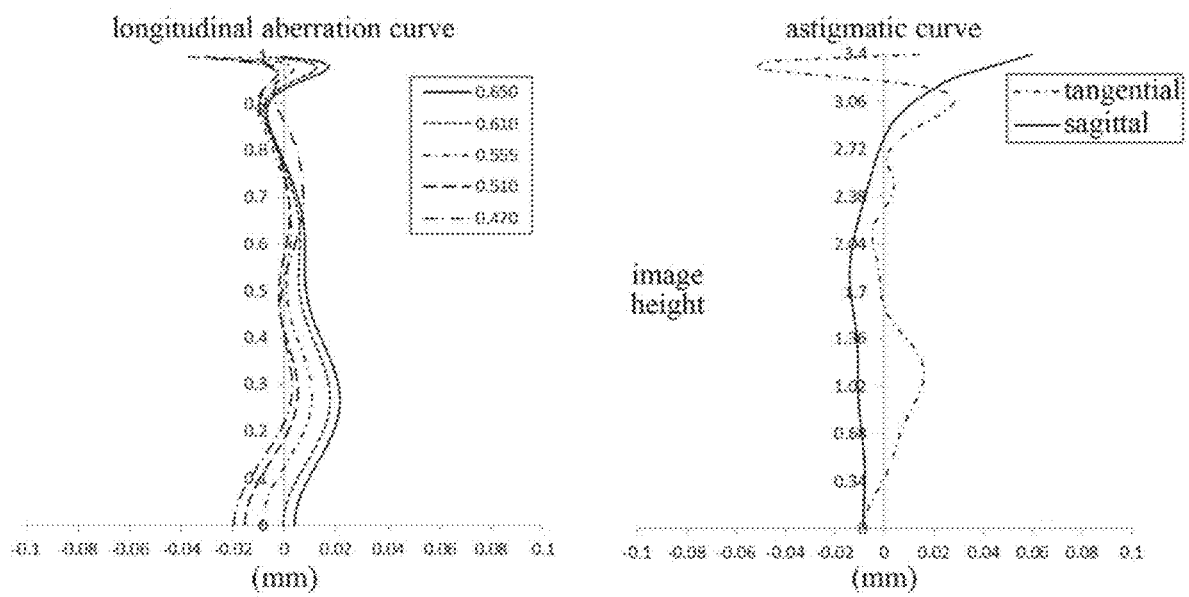

FIG. 6A illustrates the longitudinal aberration curve of the optical imaging lens assembly according to Embodiment 3, representing deviations of focal points of light of different wavelengths converged after passing through the optical imaging lens assembly. FIG. 6B illustrates the astigmatic curve of the optical imaging lens assembly according to Embodiment 3, representing a curvature of the tangential image plane and a curvature of the sagittal image plane. FIG. 6C illustrates the distortion curve of the optical imaging lens assembly according to Embodiment 3, representing amounts of distortion at different viewing angles. FIG. 6D illustrates the lateral color curve of the optical imaging lens assembly according to Embodiment 3, representing deviations of different image heights on an image plane after light passes through the optical imaging lens assembly. It can be seen from FIGS. 6A-6D that the optical imaging lens assembly according to Embodiment 3 can achieve a good imaging quality.

Embodiment 4

An optical imaging lens assembly according to Embodiment 4 of the present disclosure is described below with reference to FIGS. 7-8D.

FIG. 7 is a schematic structural diagram illustrating the optical imaging lens assembly according to Embodiment 4 of the present disclosure. As shown in FIG. 7, the optical imaging lens assembly according to Embodiment 4 includes two lens groups arranged in sequence from the object side to the image side. The first lens group includes a first lens E1 and a second lens E2. The second lens group includes a first optical element DOE, a third lens E3, a second optical element DOE, and a fourth lens E4 closest to an image plane. The first lens E1 has an object-side surface S1 and an image-side surface S2. The second lens E2 has an object-side surface S3 and an image-side surface S4. The first optical element DOE has an object-side surface S5 and an image-side surface S6. The third lens E3 has object-side surface S7 and an image-side surface S8. The second optical element DOE has an object-side surface S9 and an image-side surface S10. The fourth lens E4 closest to the image plane has an object-side surface S11 and an image-side surface S12.

In this embodiment, the first lens E1 has a positive refractive power. The second lens E2 has a negative refractive power. The object-side surface and the image-side surface of the first optical element DOE are aspheric surfaces, and the first optical element DOE does not have a refractive power. The third lens E3 has a positive refractive power. The object-side surface and the image-side surface of the second optical element DOE are aspheric surfaces, and the second optical element DOE does not have a refractive power. The fourth lens E4 closest to the image plane has a negative refractive power.

Table 10 below shows the surface type, the radius of curvature, the thickness, the material and the conic coefficient of each lens of the optical imaging lens assembly in Embodiment 4. Table 11 shows the high-order coefficients of the aspheric mirror surfaces in Embodiment 4. Table 12 shows the effective focal lengths f1-f4 of the lenses in Embodiment 4, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 10

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.4049 | | | |
| S1 | aspheric | 1.7000 | 0.8398 | 1.546 | 54.11 | −0.9004 |
| S2 | aspheric | 13.0971 | 0.0878 | | | −0.6000 |
| S3 | aspheric | −27.0701 | 0.2120 | 1.666 | 20.37 | −0.6000 |
| S4 | aspheric | 11.4445 | 0.3538 | | | −72.0317 |
| S5 | aspheric | infinite | 0.4208 | 1.666 | 20.37 | 21.7973 |
| S6 | aspheric | infinite | 0.3148 | | | −14.7928 |
| S7 | aspheric | −3.6831 | 0.5845 | 1.546 | 54.11 | 0.4312 |
| S8 | aspheric | −1.5615 | 0.0307 | | | −0.9772 |
| S9 | aspheric | infinite | 0.4398 | 1.666 | 20.37 | −6.0000 |
| S10 | aspheric | infinite | 0.1775 | | | −6.0000 |
| S11 | aspheric | 3.0688 | 0.4005 | 1.546 | 54.11 | −1.2084 |
| S12 | aspheric | 1.1080 | 0.4935 | | | −5.6853 |
| S13 | spherical | infinite | 0.2100 | 1.517 | 64.17 | |
| S14 | spherical | infinite | 0.4244 | | | |
| S15 | spherical | infinite | 0.0000 | | | |

TABLE 11

| surface number | A4 | A6 | A8 | A10 | A12 |
|---|---|---|---|---|---|
| S1 | 7.4427E−03 | 7.3480E−02 | −2.4423E−01 | 4.8564E−01 | −6.0088E−01 |
| S2 | −9.3077E−02 | 7.4054E−02 | −2.7183E−02 | 1.1355E−02 | −1.3793E−01 |
| S3 | −1.2425E−01 | 2.8505E−01 | −2.1185E−01 | 6.7725E−03 | 1.1704E−01 |
| S4 | −5.7168E−02 | 7.7705E−02 | 7.6080E−01 | −3.1289E+00 | 6.1753E+00 |
| S5 | −1.7696E−01 | 2.2162E−01 | −1.0172E+00 | 2.4454E+00 | −3.2881E+00 |
| S6 | −9.4618E−02 | −9.0425E−02 | 3.2244E−01 | −7.0499E−01 | 9.3907E−01 |
| S7 | −3.6820E−02 | 2.4506E−02 | 1.6100E−01 | −6.4564E−01 | 9.8553E−01 |
| S8 | 8.5147E−02 | −1.9485E−01 | 1.8111E−01 | −6.2322E−02 | −2.7097E−02 |
| S9 | 2.5600E−01 | −5.1945E−01 | 4.2111E−01 | −1.9176E−01 | 3.5492E−02 |
| S10 | 3.6853E−01 | −6.7597E−01 | 6.1676E−01 | −3.6902E−01 | 1.4844E−01 |
| S11 | −2.0785E−01 | −6.1412E−02 | 1.3786E−01 | −7.2909E−02 | 2.0189E−02 |
| S12 | −1.5925E−01 | 6.3226E−02 | −1.4808E−02 | 3.8052E−03 | −1.3948E−03 |

| surface number | A14 | A16 | A18 | A20 |
|---|---|---|---|---|
| S1 | 4.4462E−01 | −1.8391E−01 | 3.2097E−02 | 0.0000E+00 |
| S2 | 2.1894E−01 | −1.3231E−01 | 2.8562E−02 | 0.0000E+00 |
| S3 | −6.4795E−02 | 1.1032E−02 | 0.0000E+00 | 0.0000E+00 |
| S4 | −6.8181E+00 | 4.0362E+00 | −9.9160E−01 | 0.0000E+00 |
| S5 | 2.3079E+00 | −6.5615E−01 | 0.0000E+00 | 0.0000E+00 |
| S6 | −7.0587E−01 | 2.7959E−01 | −4.5476E−02 | 0.0000E+00 |
| S7 | −7.4647E−01 | 2.8456E−01 | −4.4105E−02 | 0.0000E+00 |
| S8 | 3.9542E−02 | −1.5566E−02 | 2.0788E−03 | 0.0000E+00 |
| S9 | 4.6303E−03 | −3.1112E−03 | 5.5075E−04 | −4.6143E−05 |
| S10 | −3.9357E−02 | 6.5476E−03 | −6.1525E−04 | 2.4762E−05 |
| S11 | −3.2631E−03 | 3.0626E−04 | −1.5194E−05 | 2.9665E−07 |
| S12 | 3.7395E−04 | −5.7186E−05 | 4.5587E−06 | −1.4793E−07 |

TABLE 12

| f1(mm) | 3.49 | f(mm) | 3.96 |
|---|---|---|---|
| f2(mm) | −12.04 | TTL(mm) | 4.99 |
| f3(mm) | 4.52 | ImgH(mm) | 3.40 |
| f4(mm) | −3.42 | | |

Figure 8A:
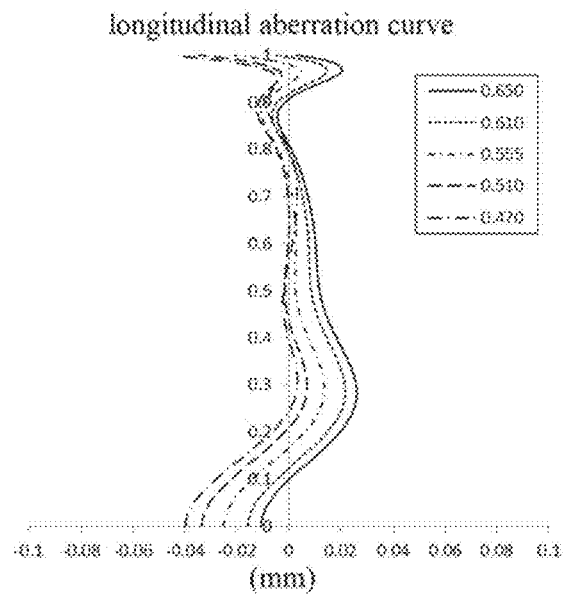
FIGS. 8A-8D respectively illustrate a longitudinal aberration curve, an astigmatic curve, a distortion curve, and a lateral color curve of the optical imaging lens assembly according to Embodiment 4.
Figure 8B:
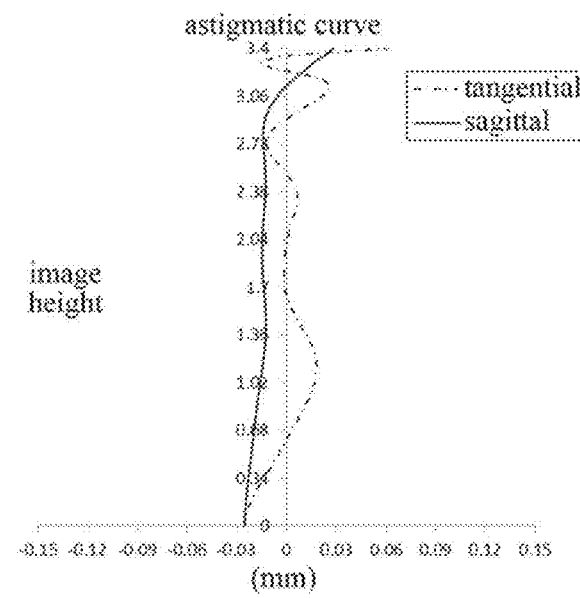
Figure 8C:
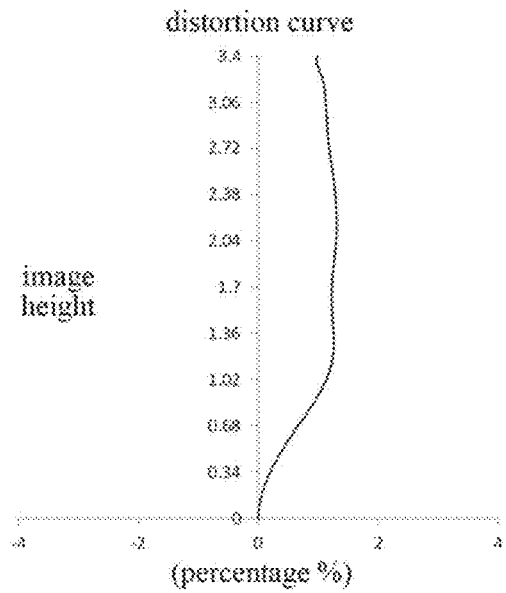
Figure 8D:
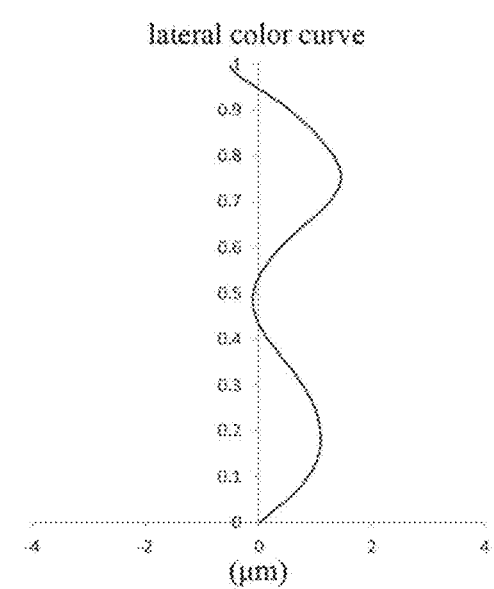

FIG. 8A illustrates the longitudinal aberration curve of the optical imaging lens assembly according to Embodiment 4, representing deviations of focal points of light of different wavelengths converged after passing through the optical imaging lens assembly. FIG. 8B illustrates the astigmatic curve of the optical imaging lens assembly according to Embodiment 4, representing a curvature of the tangential image plane and a curvature of the sagittal image plane. FIG. 8C illustrates the distortion curve of the optical imaging lens assembly according to Embodiment 4, representing amounts of distortion at different viewing angles. FIG. 8D illustrates the lateral color curve of the optical imaging lens assembly according to Embodiment 4, representing deviations of different image heights on an image plane after light passes through the optical imaging lens assembly. It can be seen from FIGS. 8A-8D that the optical imaging lens assembly according to Embodiment 4 can achieve a good imaging quality.

Embodiment 5

An optical imaging lens assembly according to Embodiment 5 of the present disclosure is described below with reference to FIGS. 9-10D.

Figure 9:
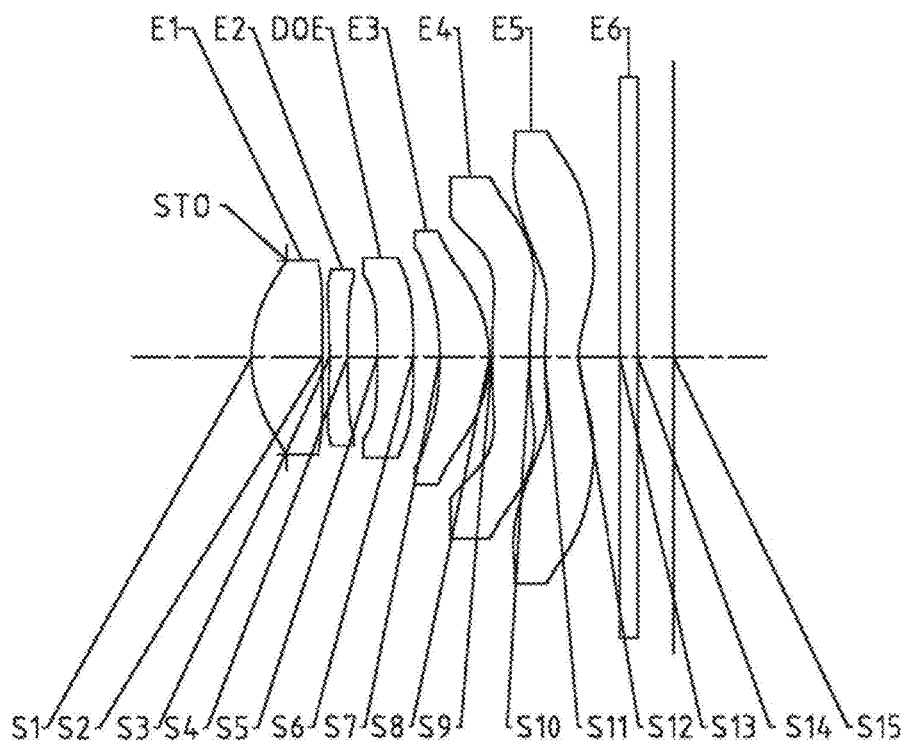
FIG. 9 is a schematic structural diagram illustrating an optical imaging lens assembly according to Embodiment 5 of the present disclosure.

FIG. 9 is a schematic structural diagram illustrating the optical imaging lens assembly according to Embodiment 5 of the present disclosure. As shown in FIG. 9, the optical imaging lens assembly according to Embodiment 5 includes two lens groups arranged in sequence from the object side to the image side. The first lens group includes a first lens E1 and a second lens E2. The second lens group includes an optical element DOE, a third lens E3, a fourth lens E4, and a fifth lens E5 closest to an image plane. The first lens E1 has an object-side surface S1 and an image-side surface S2. The second lens E2 has an object-side surface S3 and an image-side surface S4. The optical element DOE has an object-side surface S5 and an image-side surface S6. The third lens E3 has object-side surface S7 and an image-side surface S8. The fourth lens E4 has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The object-side surface and the image-side surface of the optical element DOE are aspheric surfaces, and the optical element DOE does not have a refractive power. The third lens E3 has a positive refractive power. The fourth lens E4 has a negative refractive power. The fifth lens E5 closest to the image plane has a negative refractive power.

Table 13 below shows the surface type, the radius of curvature, the thickness, the material and the conic coefficient of each lens of the optical imaging lens assembly in Embodiment 5. Table 14 shows the high-order coefficients of the aspheric surfaces in Embodiment 5. Table 15 shows the effective focal lengths f1-f5 of the lenses in Embodiment 5, the effective focal length f of the imaging lens assembly the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 13

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4049 | | | |
| S1 | aspheric | 1.7003 | 0.8397 | 1.546 | 54.11 | −0.9011 |
| S2 | aspheric | 13.0660 | 0.0883 | | | −0.6000 |
| S3 | aspheric | −26.8384 | 0.2120 | 1.666 | 20.37 | −0.6000 |
| S4 | aspheric | 11.4830 | 0.3509 | | | −90.5221 |
| S5 | aspheric | infinite | 0.4247 | 1.666 | 20.37 | 21.8743 |
| S6 | aspheric | infinite | 0.3137 | | | −14.7928 |
| S7 | aspheric | −3.6917 | 0.5841 | 1.546 | 54.11 | 0.4618 |
| S8 | aspheric | −1.5626 | 0.0301 | | | −0.9694 |
| S9 | aspheric | 2384.6432 | 0.4413 | 1.666 | 20.37 | −6.0000 |
| S10 | aspheric | 708.7463 | 0.1762 | | | −6.0000 |
| S11 | aspheric | 3.0576 | 0.4000 | 1.546 | 54.11 | −1.2105 |
| S12 | aspheric | 1.1107 | 0.4946 | | | −5.6365 |
| S13 | spherical | infinite | 0.2100 | 1.517 | 64.17 | |
| S14 | spherical | infinite | 0.4244 | | | |
| S15 | spherical | infinite | 0.0000 | | | |

TABLE 14

| surface number | A4 | A6 | A8 | A10 | A12 |
|---|---|---|---|---|---|
| S1 | 6.8496E−03 | 8.0169E−02 | −2.7497E−01 | 5.6108E−01 | −7.0649E−01 |
| S2 | −9.3996E−02 | 7.9219E−02 | −3.2237E−01 | −6.3500E−03 | −8.4550E−02 |
| S3 | −1.2414E−01 | 2.8243E−01 | −1.9590E−01 | −3.8608E−02 | 1.8038E−01 |
| S4 | −5.8344E−02 | 9.8743E−02 | 6.4220E−01 | −2.7613E+00 | 5.4970E+00 |
| S5 | −1.7714E−01 | 2.1254E−01 | −9.5199E−01 | 2.2604E+00 | −3.0290E+00 |
| S6 | −9.7907E−02 | −7.1259E−02 | 2.6374E−01 | −5.9105E−01 | 7.9911E−01 |
| S7 | −3.4700E−02 | 6.4760E−03 | 2.1686E−01 | −7.3334E−01 | 1.0639E+00 |
| S8 | 8.4981E−02 | −2.0134E−01 | 1.9992E−01 | −8.1448E−02 | −1.9298E−02 |
| S10 | 3.6606E−01 | −6.6720E−01 | 6.0577E−01 | −3.6180E−01 | 1.4566E−01 |
| S11 | −2.0594E−01 | −5.8531E−02 | 1.3239E−01 | −6.9355E−02 | 1.8954E−02 |
| S12 | −1.5818E−01 | 6.1912E−02 | −1.3961E−02 | 3.5149E−03 | −1.3444E−03 |

| surface number | A14 | A16 | A18 | A20 |
|---|---|---|---|---|
| S1 | 5.2906E−01 | −2.1978E−01 | 3.8375E−02 | 0.0000E+00 |
| S2 | 1.5962E−01 | −1.0159E−01 | 2.2396E−02 | 0.0000E+00 |
| S3 | −1.0756E−01 | 2.2317E−02 | 0.0000E+00 | 0.0000E+00 |
| S4 | −6.0803E+00 | 3.5998E+00 | −8.8339E−01 | 0.0000E+00 |
| S5 | 2.1294E+00 | −6.0792E−01 | 0.0000E+00 | 0.0000E+00 |
| S6 | −6.0262E−01 | 2.3838E−01 | −3.8693E−02 | 0.0000E+00 |
| S7 | −7.8781E−01 | 2.9684E−01 | −4.5707E−02 | 0.0000E+00 |
| S8 | 3.9092E−02 | −1.6071E−02 | 2.1773E−03 | 0.0000E+00 |
| S10 | −3.8698E−02 | 6.4527E−03 | −6.0763E−04 | 2.4502E−05 |
| S11 | −3.0109E−03 | 2.7597E−04 | −1.3211E−05 | 2.4218E−07 |
| S12 | 3.7083E−04 | −5.7423E−05 | 4.6010E−06 | −1.4951E−07 |

TABLE 15

| f1(mm) | 3.49 | f(mm) | 3.96 |
|---|---|---|---|
| f2(mm) | −12.04 | TTL(mm) | 4.99 |
| f3(mm) | 4.52 | ImgH(mm) | 3.39 |
| f4(mm) | −1513.39 | | |
| f5(mm) | −3.45 | | |

Figures 10A, 10B:
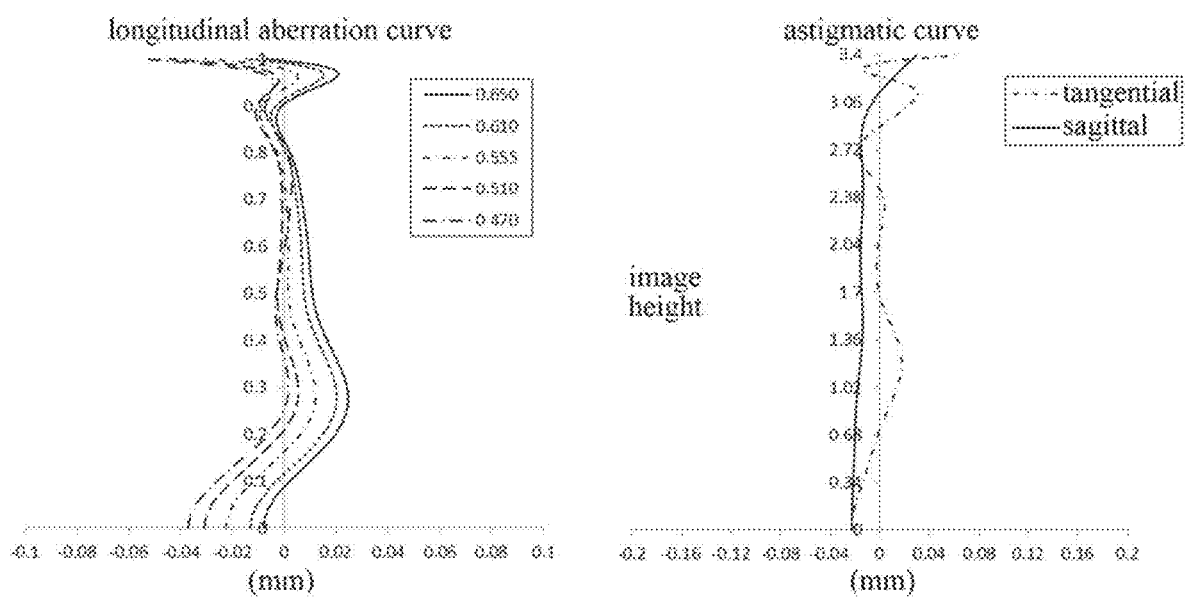
FIGS. 10A-10D respectively illustrate a longitudinal aberration curve, an astigmatic curve, a distortion curve, and a lateral color curve of the optical imaging lens assembly according to Embodiment 5.
Figure 10C:
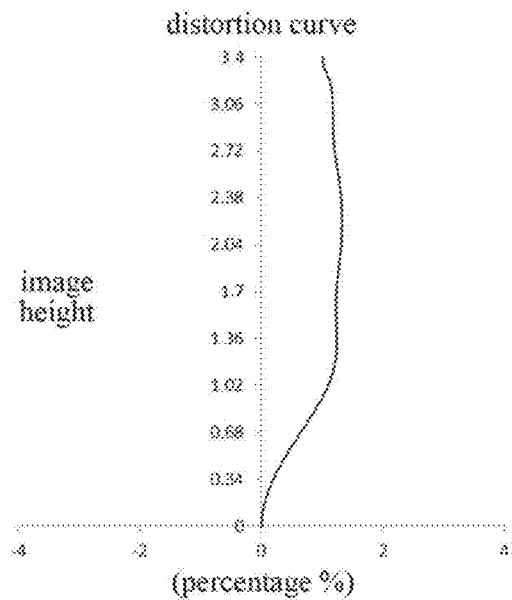
Figure 10D:
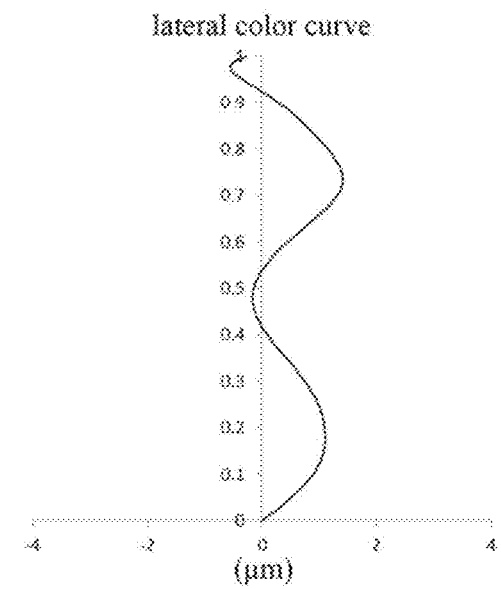

FIG. 10A illustrates the longitudinal aberration curve of the optical imaging lens assembly according to Embodiment 5, representing deviations of focal points of light of different wavelengths converged after passing through the optical imaging lens assembly. FIG. 10B illustrates the astigmatic curve of the optical imaging lens assembly according to Embodiment 5, representing a curvature of the tangential image plane and a curvature of the sagittal image plane. FIG. 10C illustrates the distortion curve of the optical imaging lens assembly according to Embodiment 5, representing amounts of distortion at different viewing angles. FIG. 10D illustrates the lateral color curve of the optical imaging lens assembly according to Embodiment 5, representing deviations of different image heights on an image plane after light passes through the optical imaging lens assembly. It can be seen from FIGS. 10A-10D that the optical imaging lens assembly according to Embodiment 5 can achieve a good imaging quality.

Embodiment 6

An optical imaging lens assembly according to Embodiment 6 of the present disclosure is described below with reference to FIGS. 11-12D.

Figure 11:
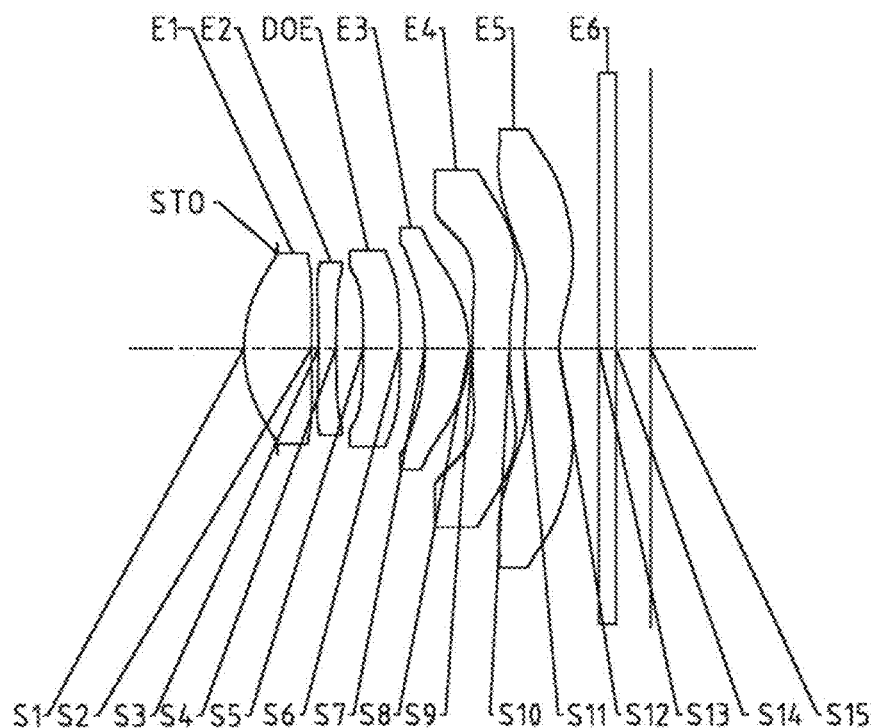
FIG. 11 is a schematic structural diagram illustrating an optical imaging lens assembly according to Embodiment 6 of the present disclosure.

FIG. 11 is a schematic structural diagram illustrating the optical imaging lens assembly according to Embodiment 6 of the present disclosure. As shown in FIG. 11, the optical imaging lens assembly according to Embodiment 6 includes two lens groups arranged in sequence from the object side to the image side. The first lens group includes a first lens E1 and a second lens E2. The second lens group includes an optical element DOE, a third lens E3, a fourth lens E4, and a fifth lens E5 closest to the image plane. The first lens E1 has an object-side surface S1 and an image-side surface S2. The second lens E2 has an object-side surface S3 and an image-side surface S4. The optical element DOE has an object-side surface S5 and an image-side surface S6. The third lens E3 has object-side surface S7 and an image-side surface S8. The fourth lens E4 has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The object-side surface and the image-side surface of the optical element DOE are aspheric surfaces, and the optical element DOE does not have a refractive power. The third lens E3 has a positive refractive power. The fourth lens E4 has a negative refractive power. The fifth lens E5 closest to the image plane has a negative refractive power.

Table 16 below shows the surface type, the radius of curvature, the thickness, the material and the conic coefficient of each lens of the optical imaging lens assembly in Embodiment 6. Table 17 shows the high-order coefficients of the aspheric surfaces in Embodiment 6. Table 18 shows the effective focal lengths f1-f5 of the lenses in Embodiment 6, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface types of each aspheric surface may be defined by the formula (1) given in Embodiment 1.

TABLE 16

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.4051 | | | |
| S1 | aspheric | 1.6983 | 0.8298 | 1.546 | 54.11 | −0.9419 |
| S2 | aspheric | 12.6966 | 0.0864 | | | −0.6000 |
| S3 | aspheric | −28.3210 | 0.2140 | 1.666 | 20.37 | −0.6000 |
| S4 | aspheric | 11.3489 | 0.3347 | | | −99.0000 |
| S5 | aspheric | infinite | 0.4495 | 1.666 | 20.37 | 21.8756 |
| S6 | aspheric | infinite | 0.3077 | | | −14.7928 |
| S7 | aspheric | −3.5822 | 0.5432 | 1.546 | 54.11 | 1.2755 |
| S8 | aspheric | −1.5324 | 0.0360 | | | −1.0125 |
| S9 | aspheric | 502.0653 | 0.4576 | 1.666 | 20.37 | −6.0000 |
| S10 | aspheric | 18.6734 | 0.1832 | | | −6.0000 |
| S11 | aspheric | 3.0615 | 0.4251 | 1.546 | 54.11 | −1.2395 |
| S12 | aspheric | 1.2061 | 0.4885 | | | −5.3961 |
| S13 | spherical | infinite | 0.2100 | 1.517 | 64.17 | |
| S14 | spherical | infinite | 0.4244 | | | |
| S15 | spherical | | 0.0000 | | | |

TABLE 17

| surface number | A4 | A6 | A8 | A10 | A12 |
|---|---|---|---|---|---|
| S1 | 6.7181E−03 | 8.6914E−02 | −2.9197E−01 | 5.8061E−01 | −7.1048E−01 |
| S2 | −9.3404E−02 | 6.9442E−02 | 1.5058E−02 | −1.1171E−01 | 3.9022E−02 |
| S3 | −1.1879E−01 | 2.5032E−01 | −9.6613E−02 | −2.2532E−01 | 3.8119E−01 |
| S4 | −5.9431E−02 | 1.2877E−01 | 4.2953E−01 | −2.0704E+00 | 4.1929E+00 |
| S5 | −1.7667E−01 | 2.5042E−01 | −1.0796E+00 | 2.4971E+00 | −3.3092E+00 |
| S6 | −1.1441E−01 | 4.4185E−02 | −7.5708E−02 | 2.0440E−02 | 9.3624E−02 |
| S7 | −7.8034E−02 | 1.5278E−01 | −2.0066E−02 | −5.1957E−01 | 9.5468E−01 |
| S8 | 8.2846E−02 | −1.5366E−01 | 8.1333E−02 | 6.3965E−02 | −1.2416E−01 |
| S9 | 2.6464E−01 | −5.2926E−01 | 4.2307E−01 | −1.7841E−01 | 5.7540E−03 |
| S10 | 3.3178E−01 | −5.9608E−01 | 5.2573E−01 | −3.0398E−01 | 1.1826E−01 |
| S11 | −1.7190E−01 | −7.1353E−02 | 1.2723E−01 | −6.4758E−02 | 1.7816E−02 |
| S12 | −1.5675E−01 | 6.9743E−02 | −2.8620E−02 | 1.2854E−02 | −4.4595E−03 |

| surface number | A14 | A16 | A18 | A20 |
|---|---|---|---|---|
| S1 | 5.1775E−01 | −2.1038E−01 | 3.6164E−02 | 0.0000E+00 |
| S2 | 8.4116E−02 | −7.9657E−02 | 2.0260E−02 | 0.0000E+00 |
| S3 | −2.1802E−01 | 4.6927E−02 | 0.0000E+00 | 0.0000E+00 |
| S4 | −4.6408E+00 | 2.7420E+00 | −6.7054E−01 | 0.0000E+00 |
| S5 | 2.3166E+00 | −6.6114E−01 | 0.0000E+00 | 0.0000E+00 |
| S6 | −1.0967E−01 | 5.1264E−02 | −9.2956E−03 | 0.0000E+00 |

TABLE 17-continued

| | | | | |
|---|---|---|---|---|
| S7 | −7.6327E−01 | 2.9966E−01 | −4.7615E−02 | 0.0000E+00 |
| S8 | 8.3984E−02 | −2.6580E−02 | 3.2150E−03 | 0.0000E+00 |
| S9 | 3.4520E−02 | −1.8740E−02 | 4.6451E−03 | −4.6955E−04 |
| S10 | −3.0365E−02 | 4.9023E−03 | −4.4819E−04 | 1.7595E−05 |
| S11 | −2.9300E−03 | 2.8775E−04 | −1.5561E−05 | 3.5562E−07 |
| S12 | 9.7786E−04 | −1.2724E−04 | 9.0060E−06 | −2.6726E−07 |

TABLE 18

| | | | |
|---|---|---|---|
| f1(mm) | 3.50 | f(mm) | 3.96 |
| f2(mm) | −12.13 | TTL(mm) | 4.99 |
| f3(mm) | 4.49 | ImgH(mm) | 3.40 |
| f4(mm) | −29.11 | | |
| f5(mm) | −3.97 | | |

Figure 12A:
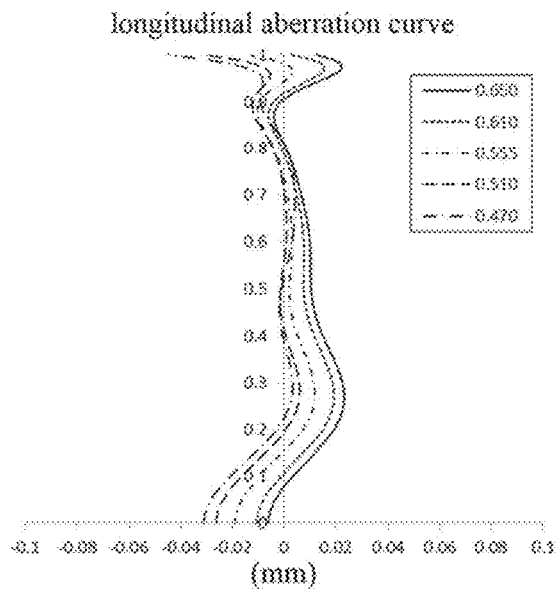
FIGS. 12A-12D respectively illustrate a longitudinal aberration curve, an astigmatic curve, a distortion curve, and a lateral color curve of the optical imaging lens assembly according to Embodiment 6.
Figure 12B:
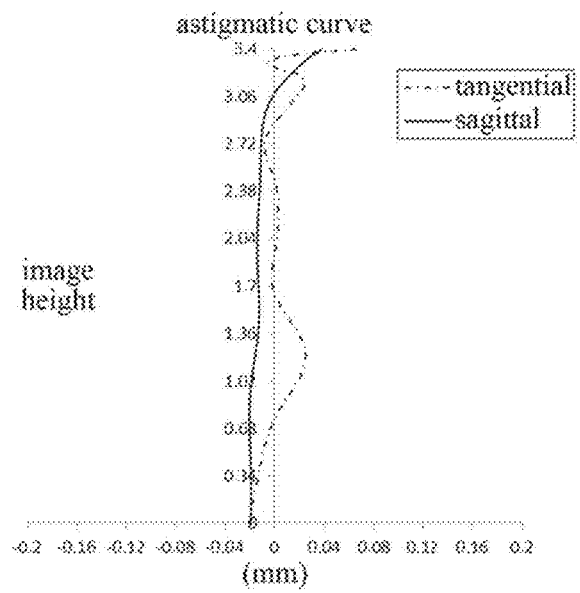
Figure 12C:
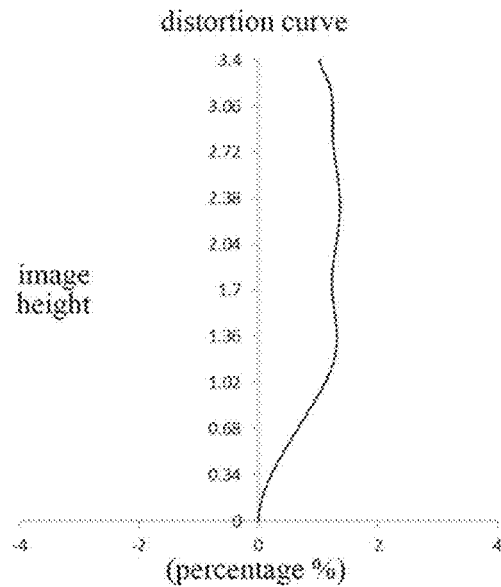
Figure 12D:
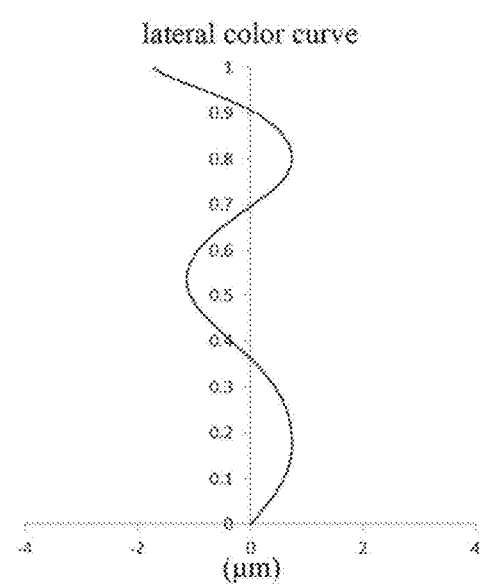

FIG. 12A illustrates the longitudinal aberration curve of the optical imaging lens assembly according to Embodiment 6, representing deviations of focal points of light of different wavelengths converged after passing through the optical imaging lens assembly. FIG. 12B illustrates the astigmatic curve of the optical imaging lens assembly according to Embodiment 6, representing a curvature of the tangential image plane and a curvature of the sagittal image plane. FIG. 12C illustrates the distortion curve of the optical imaging lens assembly according to Embodiment 6, representing amounts of distortion at different viewing angles. FIG. 12D illustrates the lateral color curve of the optical imaging lens assembly according to Embodiment 6, representing deviations of different image heights on an image plane after light passes through the optical imaging lens assembly. It can be seen from FIGS. 12A-12D that the optical imaging lens assembly according to Embodiment 6 can achieve a good imaging quality.

Embodiment 7

An optical imaging lens assembly according to Embodiment 7 of the present disclosure is described below with reference to FIGS. 13-14D.

Figure 13:
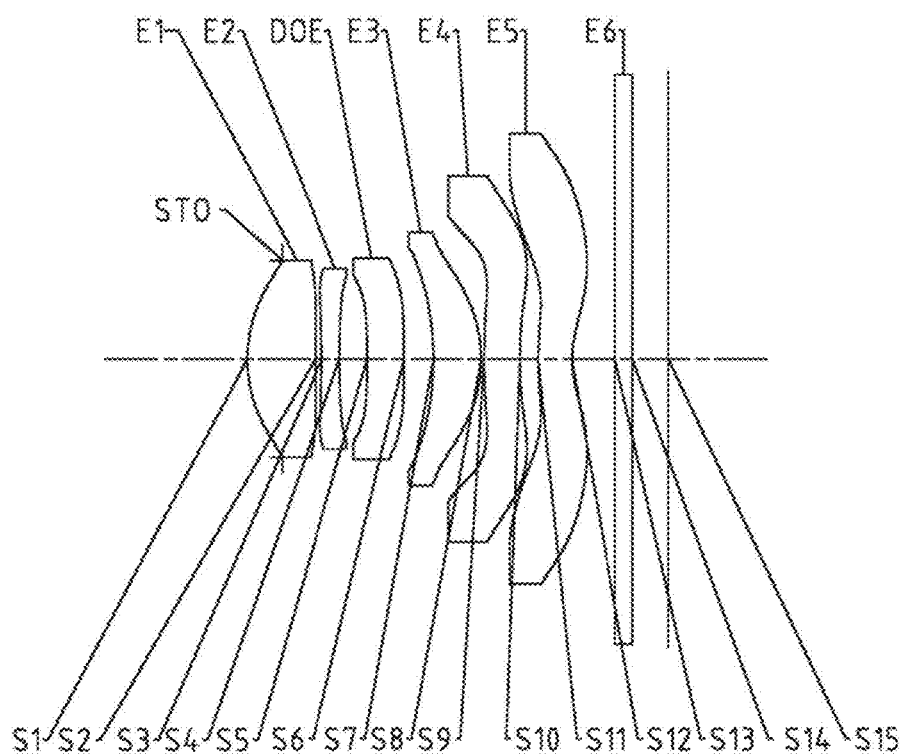
FIG. 13 is a schematic structural diagram illustrating an optical imaging lens assembly according to Embodiment 7 of the present disclosure.

FIG. 13 is a schematic structural diagram illustrating the optical imaging lens assembly according to Embodiment 7 of the present disclosure. As shown in FIG. 13, the optical imaging lens assembly according to Embodiment 7 includes two lens groups arranged in sequence from the object side to the image side. The first lens group includes a first lens E1 and a second lens E2. The second lens group includes an optical element DOE, a third lens E3, a fourth lens E4, and a fifth lens E5 closest to the image plane. The first lens E1 has an object-side surface S1 and an image-side surface S2. The second lens E2 has an object-side surface S3 and an image-side surface S4. The optical element DOE has an object-side surface S5 and an image-side surface S6. The third lens E3 has object-side surface S7 and an image-side surface S8. The fourth lens E4 has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The object-side surface and the image-side surface of the optical element DOE are aspheric surfaces, and the optical element DOE does not have a refractive power. The third lens E3 has a positive refractive power. The fourth lens E4 has a positive refractive power. The fifth lens E5 closest to the image plane has a negative refractive power.

Table 19 below shows the surface type, the radius of curvature, the thickness, the material and the conic coefficient of each lens of the optical imaging lens assembly in Embodiment 7. Table 20 shows the high-order coefficients of the aspheric surfaces in Embodiment 7. Table 21 shows the effective focal lengths f1-f5 of the lenses in Embodiment 7, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 19

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −4.4041 | | | |
| S1 | aspheric | 1.7074 | 0.8043 | 1.546 | 54.11 | −0.8602 |
| S2 | aspheric | 14.5065 | 0.0783 | | | −0.6000 |
| S3 | aspheric | −24.4158 | 0.2120 | 1.666 | 20.37 | −0.6000 |
| S4 | aspheric | 9.9810 | 0.3253 | | | −59.1494 |
| S5 | aspheric | infinite | 0.4375 | 1.666 | 20.37 | 21.8531 |
| S6 | aspheric | infinite | 0.3507 | | | −14.7928 |
| S7 | aspheric | −3.7782 | 0.5641 | 1.546 | 54.11 | 0.1078 |
| S8 | aspheric | −1.6268 | 0.0314 | | | −0.9119 |
| S9 | aspheric | 15.0653 | 0.4254 | 1.666 | 20.37 | −6.0000 |
| S10 | aspheric | 18.6734 | 0.2139 | | | −6.0000 |
| S11 | aspheric | 3.2417 | 0.4000 | 1.546 | 54.11 | −1.1565 |
| S12 | aspheric | 1.1748 | 0.5128 | | | −5.5341 |
| S13 | spherical | infinite | 0.2100 | 1.517 | 64.17 | |
| S14 | spherical | infinite | 0.4244 | | | |
| S15 | spherical | | 0.0000 | | | |

TABLE 20

| surface number | A4 | A6 | A8 | A10 | A12 |
|---|---|---|---|---|---|
| S1 | 1.1524E−02 | 4.5778E−02 | −1.3953E−01 | 2.6379E−01 | −3.2051E−01 |
| S2 | −9.9043E−02 | 8.6264E−02 | 6.2608E−02 | −3.3817E−01 | 4.1562E−01 |
| S3 | −1.3223E−01 | 3.2222E−01 | −2.5678E−01 | −3.7032E−02 | 2.6290E−01 |
| S4 | −6.9968E−02 | 1.7675E−01 | 3.3151E−01 | −2.0871E+00 | 4.5895E+00 |
| S5 | −1.7610E−01 | 2.3471E−01 | −1.0179E+00 | 2.3979E+00 | −3.2429E+00 |
| S6 | −1.0429E−01 | 1.2656E−02 | 3.1812E−02 | −1.6560E−01 | 2.6452E−01 |
| S7 | −4.7581E−02 | 3.8399E−02 | 2.5600E−01 | −8.6858E−01 | 1.1778E+00 |
| S8 | 4.6602E−03 | 4.1629E−02 | −1.8160E−01 | 3.2300E−01 | −3.1492E−01 |
| S9 | 1.82831E−01 | −3.1121E−01 | 8.2595E−02 | 1.8011E−01 | −2.4123E−01 |
| S10 | 3.5385E−01 | −6.3767E−01 | 5.7114E−01 | −3.3264E−01 | 1.2890E−01 |
| S11 | −1.6365E−01 | −6.6414E−02 | 1.0645E−01 | −4.6768E−02 | 1.0152E−02 |
| S12 | −1.4487E−01 | 5.6421E−02 | −1.7897E−02 | 6.9543E−03 | −2.4283E−03 |

| surface number | A14 | A16 | A18 | A20 |
|---|---|---|---|---|
| S1 | 2.3617E−01 | −1.0060E−01 | 1.8276E−02 | 0.0000E+00 |
| S2 | −2.3677E−01 | 6.0085E−02 | −4.4813E−03 | 0.0000E+00 |
| S3 | −1.8199E−01 | 4.2843E−02 | 0.0000E+00 | 0.0000E+00 |
| S4 | −5.3215E+00 | 3.2472E+00 | −8.1679E−01 | 0.0000E+00 |
| S5 | 2.3251E+00 | −6.8168E−01 | 0.0000E+00 | 0.0000E+00 |
| S6 | −1.9069E−01 | 6.6756E−02 | −9.3551E−03 | 0.0000E+00 |
| S7 | −8.3082E−01 | 3.0553E−01 | −4.6770E−02 | 0.0000E+00 |
| S8 | 1.7446E−01 | −4.9880E−02 | 5.6529E−03 | 0.0000E+00 |
| S9 | 1.4111E−01 | −4.5687E−02 | 8.1033E−03 | −6.2240E−04 |
| S10 | −3.2673E−02 | 5.1747E−03 | −4.6196E−04 | 1.7633E−05 |
| S11 | −1.0735E−03 | 2.6572E−05 | 4.3899E−06 | −2.8636E−07 |
| S12 | 5.5298E−04 | −7.4918E−05 | 5.5259E−06 | −1.7110E−07 |

TABLE 21

| f1(mm) | 3.47 | f(mm) | 3.96 |
|---|---|---|---|
| f2(mm) | −10.60 | TTL(mm) | 4.99 |
| f3(mm) | 4.79 | ImgH(mm) | 3.40 |
| f4(mm) | 111.73 | | |
| f5(mm) | −3.62 | | |

Figure 14A:
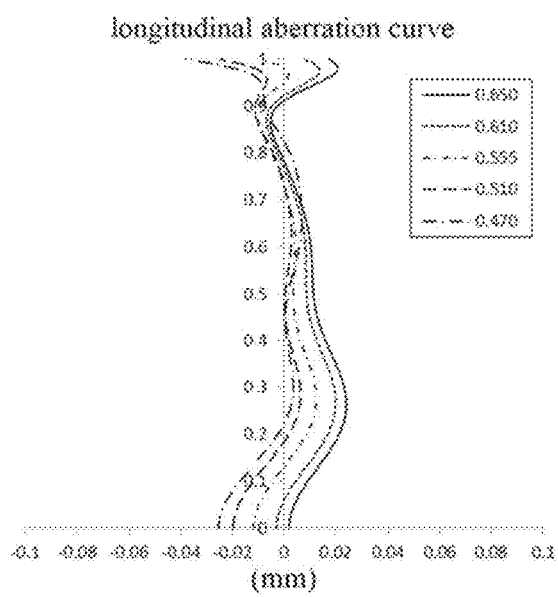
FIGS. 14A-14D respectively illustrate a longitudinal aberration curve, an astigmatic curve, a distortion curve, and a lateral color curve of the optical imaging lens assembly according to Embodiment 7.
Figure 14B:
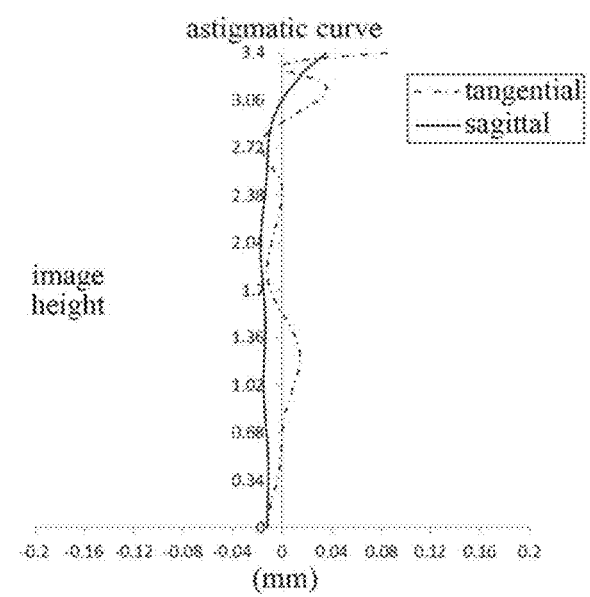
Figures 14C, 14D:
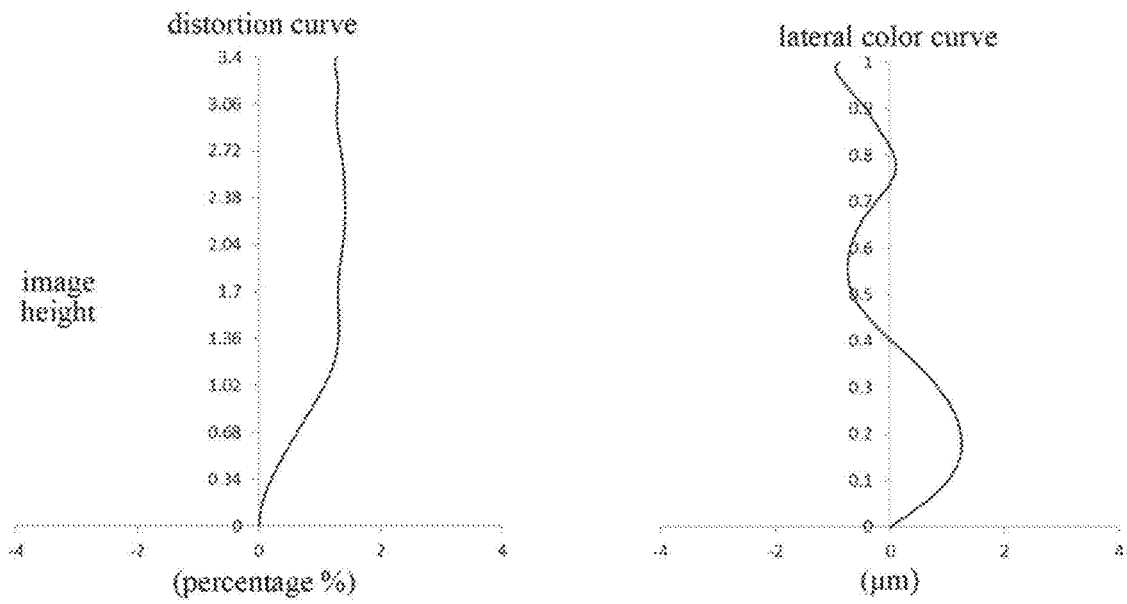

FIG. 14A illustrates the longitudinal aberration curve of the optical imaging lens assembly according to Embodiment 7, representing deviations of focal points of light of different wavelengths converged after passing through the optical imaging lens assembly. FIG. 14B illustrates the astigmatic curve of the optical imaging lens assembly according to Embodiment 7, representing a curvature of the tangential image plane and a curvature of the sagittal image plane. FIG. 14C illustrates the distortion curve of the optical imaging lens assembly according to Embodiment 7, representing amounts of distortion at different viewing angles. FIG. 14D illustrates the lateral color curve of the optical imaging lens assembly according to Embodiment 7, representing deviations of different image heights on the image plane after light passes through the optical imaging lens assembly. It can be seen from FIGS. 14A-14D that the optical imaging lens assembly according to Embodiment 7 can achieve a good imaging quality.

Embodiment 8

An optical imaging lens assembly according to Embodiment 8 of the present disclosure is described below with reference to FIGS. 15-16D.

Figure 15:
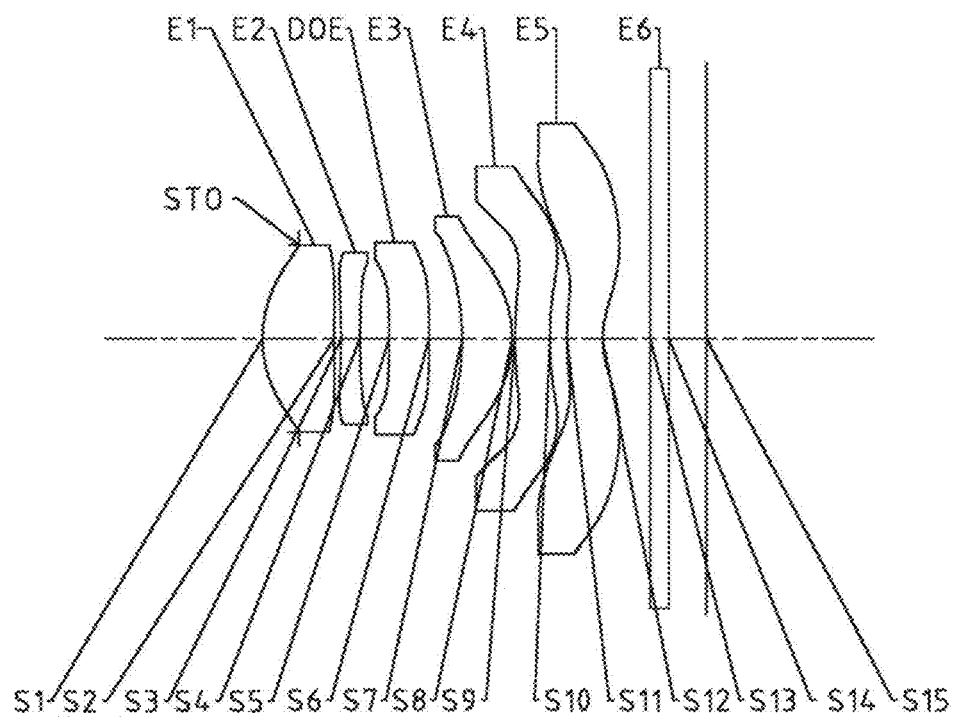
FIG. 15 is a schematic structural diagram illustrating an optical imaging lens assembly according to Embodiment 8 of the present disclosure.

FIG. 15 is a schematic structural diagram illustrating the optical imaging lens assembly according to Embodiment 8 of the present disclosure. As shown in FIG. 15, the optical imaging lens assembly according to Embodiment 8 includes two lens groups arranged in sequence from the object side to the image side. The first lens group includes a first lens E1 and a second lens E2. The second lens group includes an optical element DOE, a third lens E3, a fourth lens E4, and a fifth lens E5 closest to an image plane. The first lens E1 has an object-side surface S1 and an image-side surface S2. The second lens E2 has an object-side surface S3 and an image-side surface S4. The optical element DOE has an object-side surface S5 and an image-side surface S6. The third lens E3 has object-side surface S7 and an image-side surface S8. The fourth lens E4 has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The object-side surface and the image-side surface of the optical element DOE are aspheric surfaces, and the optical element DOE does not have a refractive power. The third lens E3 has a positive refractive power. The fourth lens E4 has a positive refractive power. The fifth lens E5 closest to the image plane has a negative refractive power.

Table 22 below shows the surface type, the radius of curvature, the thickness, the material and the conic coefficient of each lens of the optical imaging lens assembly in Embodiment 8. Table 23 shows the high-order coefficients of the aspheric surfaces in Embodiment 8. Table 24 shows the effective focal lengths f1-f5 of the lenses in Embodiment 8, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image diagonal of the optical imaging lens assembly. The surface type of each aspheric surface may be defined by the formula (1) given in Embodiment 1.

TABLE 22

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4039 | | | |
| S1 | aspheric | 1.7126 | 0.8051 | 1.546 | 54.11 | −0.7933 |
| S2 | aspheric | 15.3275 | 0.0786 | | | −0.6000 |
| S3 | aspheric | −22.1050 | 0.2120 | 1.666 | 20.37 | −0.6000 |
| S4 | aspheric | 9.7316 | 0.3277 | | | −65.1185 |
| S5 | aspheric | infinite | 0.4480 | 1.666 | 20.37 | 21.8465 |
| S6 | aspheric | infinite | 0.3732 | | | −14.7928 |
| S7 | aspheric | −3.7149 | 0.5632 | 1.546 | 54.11 | −0.2700 |
| S8 | aspheric | −1.6461 | 0.0300 | | | −0.8437 |
| S9 | aspheric | 10.0653 | 0.3918 | 1.666 | 20.37 | −6.0000 |
| S10 | aspheric | 28.6734 | 0.1891 | | | −6.0000 |
| S11 | aspheric | 3.2830 | 0.4000 | 1.546 | 54.11 | −1.0715 |
| S12 | aspheric | 1.1099 | 0.5368 | | | −5.6567 |
| S13 | spherical | infinite | 0.2100 | 1.517 | 64.17 | |
| S14 | spherical | infinite | 0.4244 | | | |
| S15 | spherical | infinite | 0.0000 | | | |

TABLE 23

| surface number | A4 | A6 | A8 | A10 | A12 |
|---|---|---|---|---|---|
| S1 | 1.8599E−02 | −1.2424E−02 | 6.5122E−02 | −1.5045E−01 | 1.7822E−01 |
| S2 | −9.1333E−02 | 2.3837E−02 | 2.9578E−01 | −8.2563E−01 | 1.0316E+00 |
| S3 | −1.2768E−01 | 2.7587E−01 | −9.1647E−02 | −3.2963E−01 | 5.4731E−01 |
| S4 | −6.7622E−02 | 1.5165E−01 | 4.1722E−01 | −2.2143E+00 | 4.6568E+00 |
| S5 | −1.7590E−01 | 2.4069E−01 | −1.1071E+00 | 2.6931E+00 | −3.6866E+00 |
| S6 | −9.6930E−02 | −2.5034E−02 | 1.3959E−01 | −3.6611E−01 | 4.9966E−01 |
| S7 | −2.3661E−02 | −3.7983E−02 | 4.3244E−01 | −1.1195E+00 | 1.3817E+00 |
| S8 | −4.4043E−02 | 1.6021E−01 | −2.9961E−01 | 3.7456E−01 | −3.1254E−01 |
| S9 | 1.4426E−01 | −1.9900E−01 | −1.1793E−01 | 3.9305E−01 | −3.7304E−01 |
| S10 | 4.2519E−01 | −7.8714E−01 | 7.2350E−01 | −4.2764E−01 | 1.6730E−01 |
| S11 | −1.4270E−01 | −1.0244E−01 | 1.3608E−01 | −6.0891E−02 | 1.4336E−02 |
| S12 | −1.4114E−01 | 5.0049E−02 | −7.0481E−03 | −3.1733E−04 | 1.1262E−04 |

| surface number | A14 | A16 | A18 | A20 |
|---|---|---|---|---|
| S1 | −1.1629E−01 | 3.4385E−02 | −3.3465E−03 | 0.0000E+00 |
| S2 | −7.0286E−01 | 2.5370E−01 | −3.8346E−02 | 0.0000E+00 |
| S3 | −3.2770E−01 | 7.3365E−02 | 0.0000E+00 | 0.0000E+00 |
| S4 | −5.2854E+00 | 3.1923E+00 | −8.0070E−01 | 0.0000E+00 |
| S5 | 2.6536E+00 | −7.7757E−01 | 0.0000E+00 | 0.0000E+00 |
| S6 | −3.5552E−01 | 1.2999E−01 | −1.9543E−02 | 0.0000E+00 |
| S7 | −9.2197E−01 | 3.2483E−01 | −4.7861E−02 | 0.0000E+00 |
| S8 | 1.6183E−01 | −4.4906E−02 | 5.0090E−03 | 0.0000E+00 |
| S9 | 1.8654E−01 | −5.3012E−02 | 8.2102E−03 | −5.4658E−04 |
| S10 | −4.2834E−02 | 6.8792E−03 | −6.2606E−04 | 2.4507E−05 |
| S11 | −1.8569E−03 | 1.1705E−04 | −1.5141E−06 | −1.1905E−07 |
| S12 | 3.7663E−05 | −1.3330E−05 | 1.4758E−06 | −5.7550E−08 |

TABLE 24

| | | | |
|---|---|---|---|
| f1(mm) | 3.46 | f(mm) | 3.96 |
| f2(mm) | −10.11 | TTL(mm) | 4.99 |
| f3(mm) | 4.94 | ImgH(mm) | 3.40 |
| f4(mm) | 23.08 | | |
| f5(mm) | −3.28 | | |

Figure 16A:
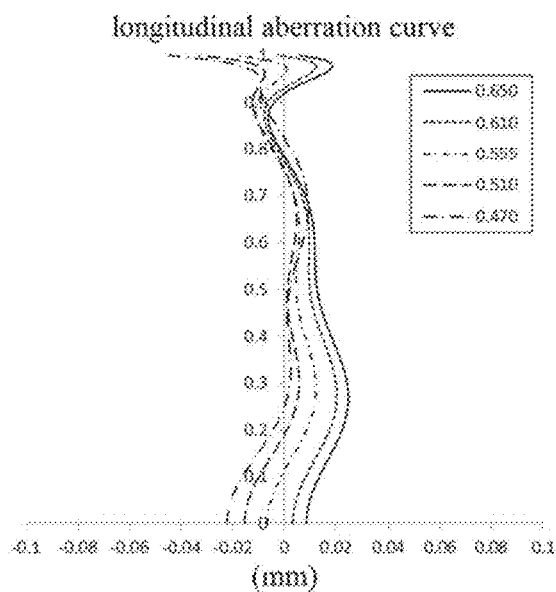
FIGS. 16A-16D respectively illustrate a longitudinal aberration curve, an astigmatic curve, a distortion curve, and a lateral color curve of the optical imaging lens assembly according to Embodiment 8.
Figure 16B:
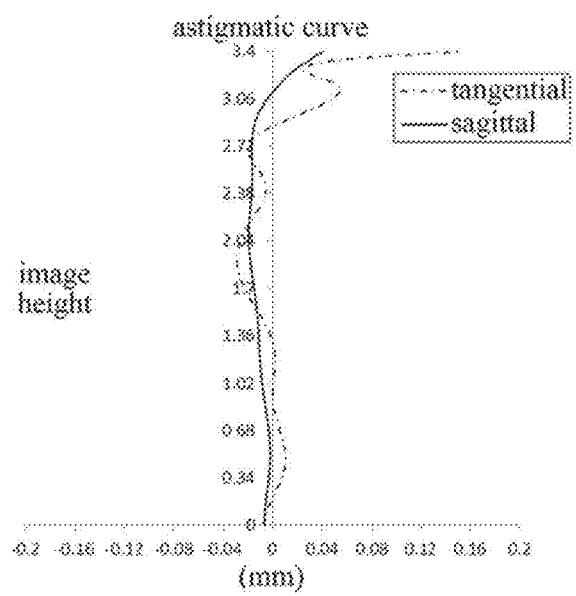
Figure 16C:
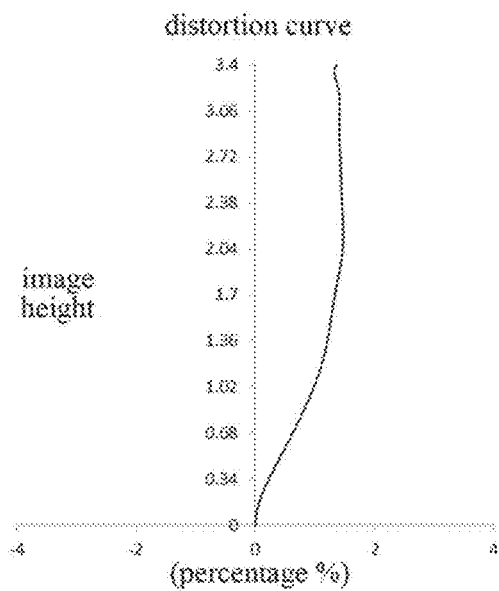
Figure 16D:
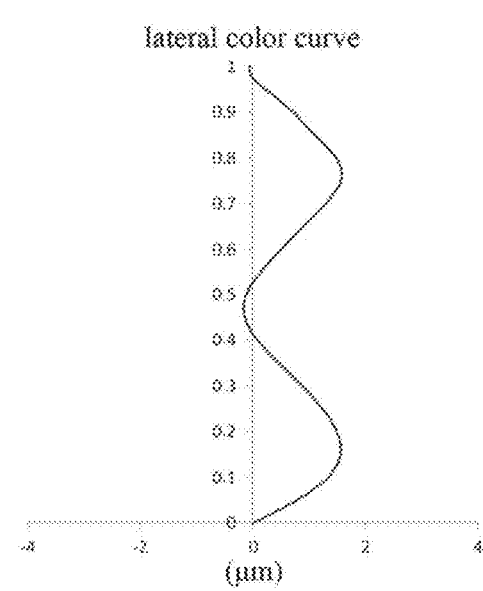

FIG. 16A illustrates the longitudinal aberration curve of the optical imaging lens assembly according to Embodiment 8, representing deviations of focal points of light of different wavelengths converged after passing through the optical imaging lens assembly. FIG. 16B illustrates the astigmatic curve of the optical imaging lens assembly according to Embodiment 8, representing a curvature of the tangential image plane and a curvature of the sagittal image plane. FIG. 16C illustrates a distortion curve of the optical imaging lens assembly according to Embodiment 8, representing amounts of distortion at different viewing angles. FIG. 16D illustrates the lateral color curve of the optical imaging lens assembly according to Embodiment 8, representing deviations of different image heights on an image plane after light passes through the optical imaging lens assembly. It can be seen from FIGS. 16A-16D that the optical imaging lens assembly according to Embodiment 8 can achieve a good imaging quality.

Embodiment 9

An optical imaging lens assembly according to Embodiment 9 of the present disclosure is described below with reference to FIGS. 17-18D.

Figure 17:
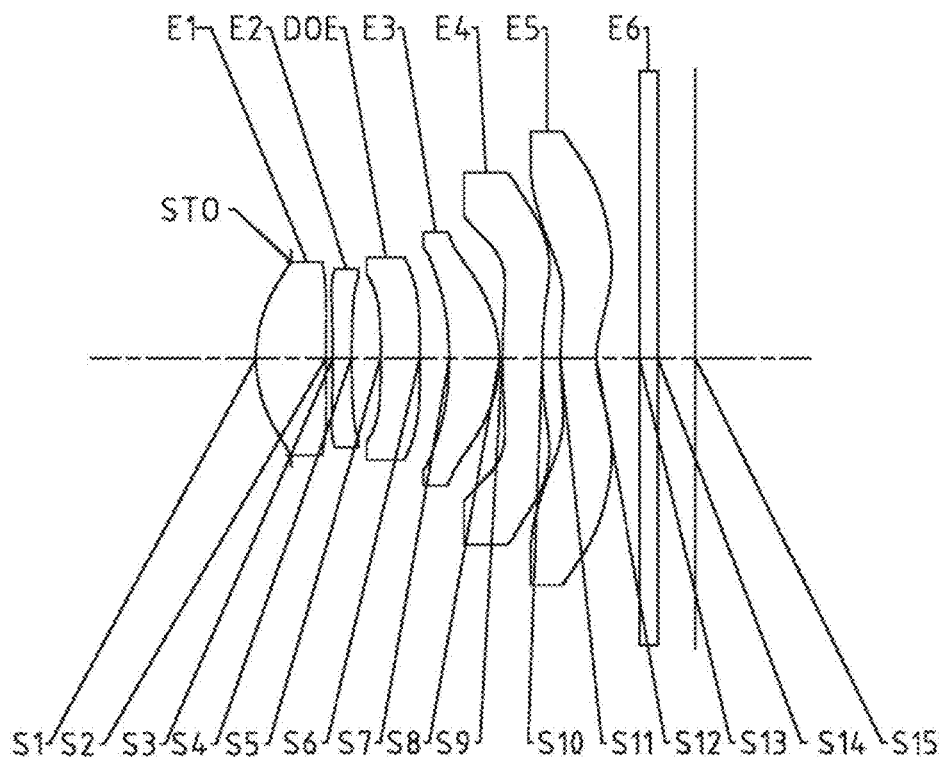
FIG. 17 is a schematic structural diagram illustrating an optical imaging lens assembly according to Embodiment 9 of the present disclosure.

FIG. 17 is a schematic structural diagram illustrating the optical imaging lens assembly according to Embodiment 9 of the present disclosure. As shown in FIG. 17, the optical imaging lens assembly according to Embodiment 9 includes two lens groups arranged in sequence from the object side to the image side. The first lens group includes a first lens E1 and a second lens E2. The second lens group includes an optical element DOE, a third lens E3, a fourth lens E4, and a fifth lens E5 closest to the image plane. The first lens E1 has an object-side surface S1 and an image-side surface S2. The second lens E2 has an object-side surface S3 and an image-side surface S4. The optical element DOE has an object-side surface S5 and an image-side surface S6. The third lens E3 has object-side surface S7 and an image-side surface S8. The fourth lens E4 has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The object-side surface and the image-side surface of the optical element DOE are aspheric surfaces, and the optical element DOE does not have a refractive power. The third lens E3 has a positive refractive power. The fourth lens E4 has a negative refractive power. The fifth lens E5 closest to the image plane has a negative refractive power.

Table 25 below shows the surface type, the radius of curvature, the thickness, the material and the conic coefficient of each lens of the optical imaging lens assembly in Embodiment 9. Table 26 shows the high-order coefficients of the aspheric surfaces in Embodiment 9. Table 27 shows the effective focal lengths f1-f5 of the lenses in Embodiment 9, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 25

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3901 | | | |
| S1 | aspheric | 1.6970 | 0.7939 | 1.546 | 54.11 | −0.8185 |
| S2 | aspheric | 13.8632 | 0.0781 | | | −0.6000 |
| S3 | aspheric | −28.1581 | 0.2175 | 1.666 | 20.37 | −0.6000 |
| S4 | aspheric | 9.7642 | 0.3299 | | | −47.4690 |
| S5 | aspheric | infinite | 0.4453 | 1.666 | 20.37 | 21.8508 |
| S6 | aspheric | infinite | 0.3356 | | | −14.7928 |
| S7 | aspheric | −3.6704 | 0.5685 | 1.546 | 54.11 | 0.2881 |
| S8 | aspheric | −1.5774 | 0.0318 | | | −0.9490 |
| S9 | aspheric | 23.7152 | 0.4492 | 1.666 | 20.37 | −6.0000 |
| S10 | aspheric | 17.7582 | 0.2055 | | | −6.0000 |
| S11 | aspheric | 3.2494 | 0.4073 | 1.546 | 54.11 | −1.1725 |
| S12 | aspheric | 1.2053 | 0.4931 | | | −5.4787 |
| S13 | spherical | infinite | 0.2100 | 1.517 | 64.17 | |
| S14 | spherical | infinite | 0.4244 | | | |
| S15 | spherical | infinite | 0.0000 | | | |

TABLE 26

| surface number | A4 | A6 | A8 | A10 | A12 |
|---|---|---|---|---|---|
| S1 | 1.6538E−02 | 1.2302E−02 | −3.4489E−02 | 7.4969E−02 | −1.2177E−01 |
| S2 | −9.9455E−02 | 9.4731E−02 | 1.6860E−02 | −2.2756E−01 | 2.5034E−01 |
| S3 | −1.2650E−01 | 2.9400E−01 | −1.8707E−01 | −1.5843E−01 | 4.0089E−01 |
| S4 | −6.8107E−02 | 1.9308E−01 | 1.3381E−01 | −1.2938E+00 | 2.9317E+00 |
| S5 | −1.7162E−01 | 2.1166E−01 | −9.1907E−01 | 2.1468E+00 | −2.9078E+00 |
| S6 | −1.1130E−01 | 7.1309E−02 | −1.8173E−01 | 2.7574E−01 | −2.7458E−01 |
| S7 | −6.9868E−02 | 1.4312E−01 | −3.7829E−01 | −3.8095E−01 | 6.9391E−01 |
| S8 | 2.8209E−02 | −6.7303E−03 | −1.3755E−01 | 2.9779E−01 | −3.0207E−01 |
| S9 | 1.9997E−01 | −3.6379E−01 | 1.9075E−01 | 4.0051E−02 | −1.3033E−01 |
| S10 | 3.2598E−01 | −5.7550E−01 | 5.0415E−01 | −2.9016E−01 | 1.1227E−01 |
| S11 | −1.6338E−01 | −5.8650E−02 | 9.6884E−02 | −4.1593E−02 | 8.6131E−03 |
| S12 | −1.4715E−01 | 6.3568E−02 | −2.7280E−02 | 1.2986E−02 | −4.6528E−03 |

| surface number | A14 | A16 | A18 | A20 |
|---|---|---|---|---|
| S1 | 1.1672E−01 | −6.4170E−02 | 1.4172E−02 | 0.0000E+00 |
| S2 | −8.1734E−02 | −2.1269E−02 | 1.3364E−02 | 0.0000E+00 |
| S3 | −2.6578E−01 | 6.3634E−02 | 0.0000E+00 | 0.0000E+00 |
| S4 | −3.3877E+00 | 2.0573E+00 | −5.1443E−01 | 0.0000E+00 |
| S5 | 2.0952E+00 | −6.1800E−01 | 0.0000E+00 | 0.0000E+00 |
| S6 | 1.9179E−01 | −7.8634E−02 | 1.3493E−02 | 0.0000E+00 |

TABLE 26-continued

| | | | | |
|---|---|---|---|---|
| S7 | −5.4651E−01 | 2.1431E−01 | −3.4511E−02 | 0.0000E+00 |
| S8 | 1.6832E−01 | −4.8023E−02 | 5.4252E−03 | 0.0000E+00 |
| S9 | 8.7905E−02 | −3.0791E−02 | 5.9086E−03 | −4.9510E−04 |
| S10 | −2.8619E−02 | 4.5773E−03 | −4.1363E−04 | 1.6011E−05 |
| S11 | −8.1068E−04 | 1.7741E−06 | 5.5012E−06 | −3.0024E−07 |
| S12 | 1.0473E−03 | −1.4022E−04 | 1.0242E−05 | −3.1430E−07 |

TABLE 27

| | | | |
|---|---|---|---|
| f1(mm) | 3.46 | f(mm) | 3.96 |
| f2(mm) | −10.85 | TTL(mm) | 4.99 |
| f3(mm) | 4.62 | ImgH(mm) | 3.40 |
| f4(mm) | −109.38 | | |
| f5(mm) | −3.78 | | |

Figures 18A, 18B:
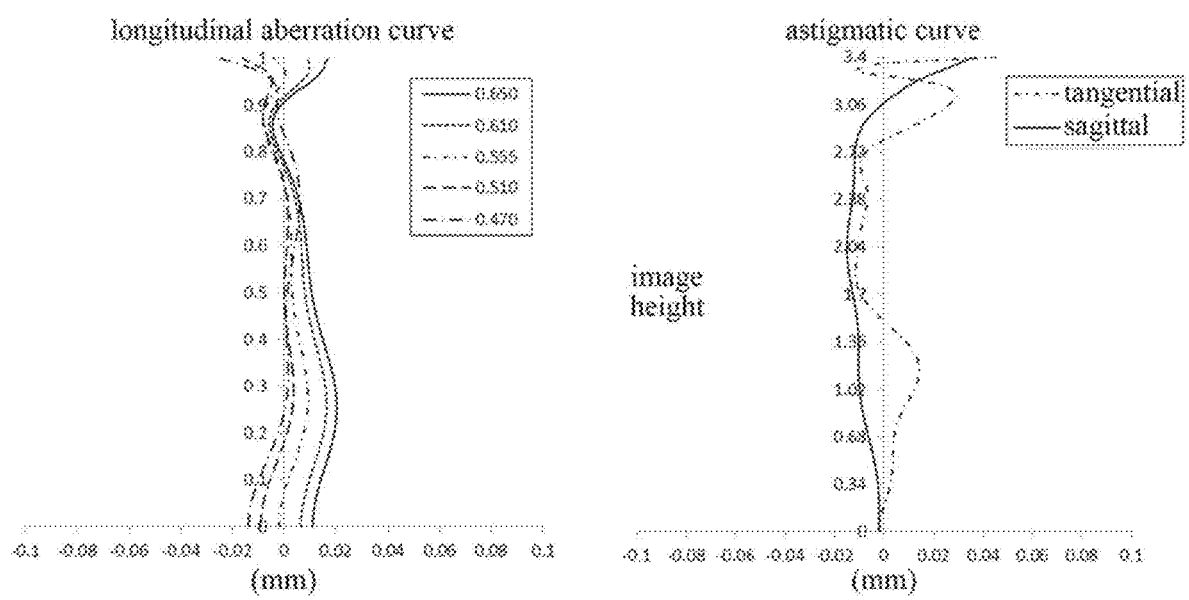
FIGS. 18A-18D respectively illustrate a longitudinal aberration curve, an astigmatic curve, a distortion curve, and a lateral color curve of the optical imaging lens assembly according to Embodiment 9.
Figures 18C, 18D:
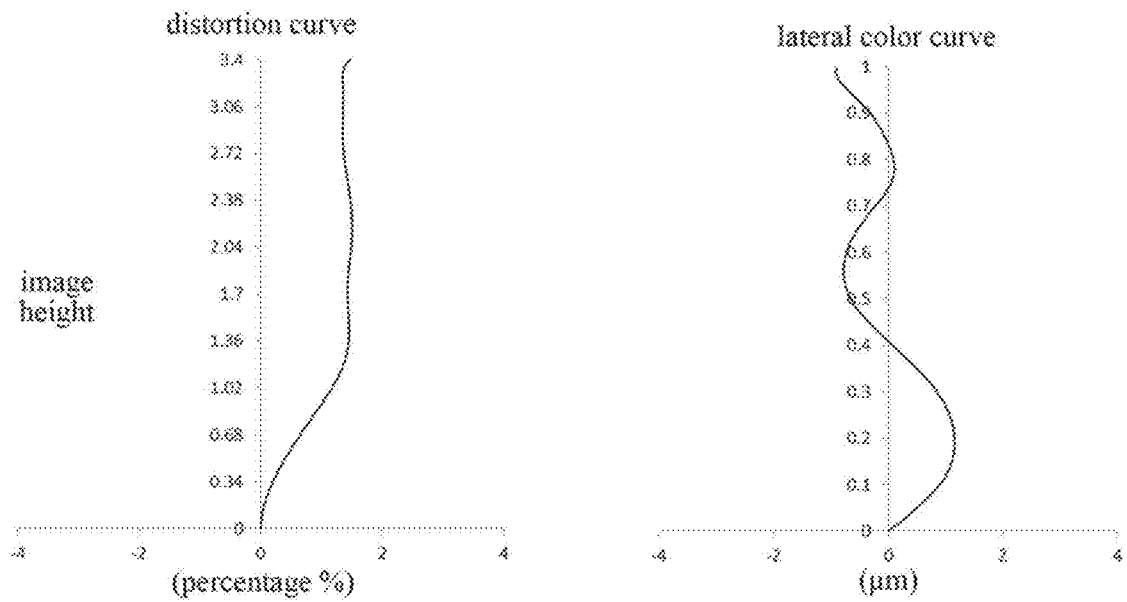

FIG. 18A illustrates the longitudinal aberration curve of the optical imaging lens assembly according to Embodiment 9, representing deviations of focal points of light of different wavelengths converged after passing through the optical imaging lens assembly. FIG. 18B illustrates the astigmatic curve of the optical imaging lens assembly according to Embodiment 9, representing a curvature of the tangential image plane and a curvature of the sagittal image plane. FIG. 18C illustrates the distortion curve of the optical imaging lens assembly according to Embodiment 9, representing amounts of distortion at different viewing angles. FIG. 18D illustrates the lateral color curve of the optical imaging lens assembly according to Embodiment 9, representing deviations of different image heights on the image plane after light passes through the optical imaging lens assembly. It can be seen from FIGS. 18A-18D that the optical imaging lens assembly according to Embodiment 9 can achieve a good imaging quality.

Embodiment 10

An optical imaging lens assembly according to Embodiment 10 of the present disclosure is described below with reference to FIGS. 19-20D.

Figure 19:
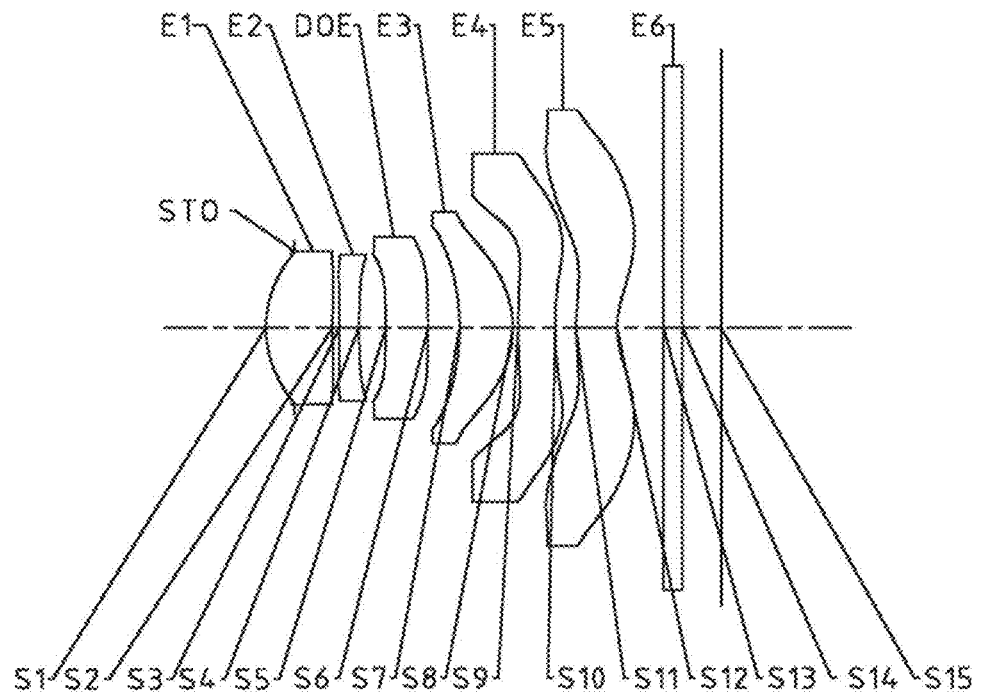
FIG. 19 is a schematic structural diagram illustrating an optical imaging lens assembly according to Embodiment 10 of the present disclosure.

FIG. 19 is a schematic structural diagram illustrating the optical imaging lens assembly according to Embodiment 10 of the present disclosure. As shown in FIG. 19, the optical imaging lens assembly according to Embodiment 10 includes two lens groups arranged in sequence from the object side to the image side. The first lens group includes a first lens E1 and a second lens E2. The second lens group includes an optical element DOE, a third lens E3, a fourth lens E4, and a fifth lens E5 closest to the image plane. The first lens E1 has an object-side surface S1 and an image-side surface S2. The second lens E2 has an object-side surface S3 and an image-side surface S4. The optical element DOE has an object-side surface S5 and an image-side surface S6. The third lens E3 has object-side surface S7 and an image-side surface S8. The fourth lens E4 has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The object-side surface and the image-side surface of the optical element DOE are aspheric surfaces, and the optical element DOE does not have a refractive power. The third lens E3 has a positive refractive power. The fourth lens E4 has a negative refractive power. The fifth lens E5 closest to the image plane has a negative refractive power.

Table 28 below shows the surface type, the radius of curvature, the thickness, the material and the conic coefficient of each lens of the optical imaging lens assembly in Embodiment 10. Table 29 shows the high-order coefficients of the aspheric surfaces in Embodiment 10. Table 30 shows the effective focal lengths f1-f5 of the lenses in Embodiment 10, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 28

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.3042 | | | |
| S1 | aspheric | 1.6750 | 0.7313 | 1.546 | 54.11 | −0.8288 |
| S2 | aspheric | 10.3223 | 0.0748 | | | −0.6000 |
| S3 | aspheric | −259.6474 | 0.2128 | 1.666 | 20.37 | −0.6000 |
| S4 | aspheric | 7.8636 | 0.2946 | | | −12.0457 |
| S5 | aspheric | infinite | 0.4645 | 1.666 | 20.37 | 21.8525 |
| S6 | aspheric | infinite | 0.3481 | | | −14.7928 |
| S7 | aspheric | −3.8105 | 0.5845 | 1.546 | 54.11 | 1.5922 |
| S8 | aspheric | −1.5277 | 0.0549 | | | −0.8950 |
| S9 | aspheric | 72.5897 | 0.4070 | 1.666 | 20.37 | −6.0000 |
| S10 | aspheric | 18.7775 | 0.2254 | | | −6.0000 |
| S11 | aspheric | 3.3845 | 0.4503 | 1.546 | 54.11 | −1.1826 |
| S12 | aspheric | 1.2331 | 0.5075 | | | −4.9961 |
| S13 | spherical | infinite | 0.2100 | 1.517 | 64.17 | |
| S14 | spherical | infinite | 0.4244 | | | |
| S15 | spherical | infinite | 0.0000 | | | |

TABLE 29

| surface number | A4 | A6 | A8 | A10 | A12 |
|---|---|---|---|---|---|
| S1 | 1.6407E−02 | 3.5855E−02 | −1.4225E−01 | 3.4768E−01 | −5.3370E−01 |
| S2 | −9.7698E−02 | 7.7495E−02 | 1.0394E−01 | −6.2887E−01 | 1.2692E+00 |
| S3 | −1.2503E−01 | 3.1669E−01 | −3.8697E−01 | 5.1489E−01 | −6.4824E−01 |
| S4 | −7.4221E−02 | 2.4764E−01 | −2.3407E−01 | 3.3461E−02 | 3.9285E−01 |
| S5 | −1.6251E−01 | 1.4818E−01 | −7.1481E−01 | 1.7663E+00 | −2.5369E+00 |
| S6 | −1.0478E−01 | 8.5806E−02 | −2.4789E−01 | 3.5302E−01 | −2.5333E−01 |
| S7 | −6.3175E−02 | 1.3160E−01 | −5.1386E−03 | −5.1557E−01 | 9.2588E−01 |
| S8 | 3.0078E−02 | −3.8959E−02 | 3.3254E−02 | −7.9953E−02 | 9.8971E−02 |
| S9 | 2.0364E−01 | −3.6848E−01 | 2.5420E−01 | −1.2809E−01 | 5.8101E−02 |
| S10 | 3.0668E−01 | −5.1497E−01 | 4.1416E−01 | −2.1612E−01 | 7.5867E−02 |
| S11 | −1.4756E−01 | −5.7416E−02 | 8.8251E−02 | −3.7903E−02 | 8.3787E−03 |
| S12 | −1.3968E−01 | 5.6752E−02 | −1.8169E−02 | 5.3171E−03 | −1.3214E−03 |

| surface number | A14 | A16 | A18 | A20 |
|---|---|---|---|---|
| S1 | 4.8796E−01 | −2.5409E−01 | 5.6131E−02 | 0.0000E+00 |
| S2 | −1.4628E+00 | 8.9633E−01 | −2.2003E−01 | 0.0000E+00 |
| S3 | 5.0646E−01 | −1.5305E−01 | 0.0000E+00 | 0.0000E+00 |
| S4 | −6.9133E−01 | 5.4605E−01 | −1.5697E−01 | 0.0000E+00 |
| S5 | 1.9020E+00 | −5.7139E−01 | 0.0000E+00 | 0.0000E+00 |
| S6 | 7.2099E−02 | 1.1103E−02 | −7.6366E−03 | 0.0000E+00 |
| S7 | −7.3300E−01 | 2.8492E−01 | −4.4675E−02 | 0.0000E+00 |
| S8 | −5.1989E−02 | 1.2604E−02 | −1.1919E−03 | 0.0000E+00 |
| S9 | −2.3806E−02 | 6.2015E−03 | −6.0907E−04 | −1.4975E−05 |
| S10 | −1.7633E−02 | 2.5848E−03 | −2.1474E−04 | 7.6389E−06 |
| S11 | −1.0141E−03 | 5.9943E−05 | −7.7309E−07 | −5.0299E−08 |
| S12 | 2.4049E−04 | −2.8745E−05 | 1.9858E−06 | −5.9353E−08 |

TABLE 30

| f1(mm) | 3.56 | f(mm) | 3.96 |
|---|---|---|---|
| f2(mm) | −11.45 | TTL(mm) | 4.99 |
| f3(mm) | 4.28 | ImgH(mm) | 3.60 |
| f4(mm) | −38.12 | | |
| f5(mm) | −3.84 | | |

Figure 20A:
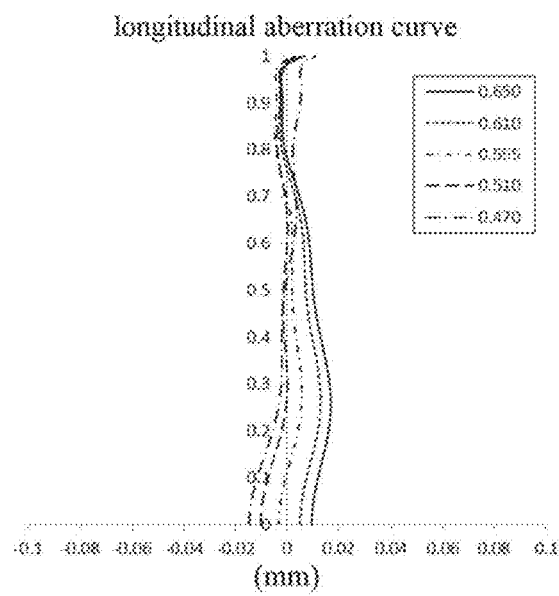
FIGS. 20A-20D respectively illustrate a longitudinal aberration curve, an astigmatic curve, a distortion curve, and a lateral color curve of the optical imaging lens assembly according to Embodiment 10.
Figure 20B:
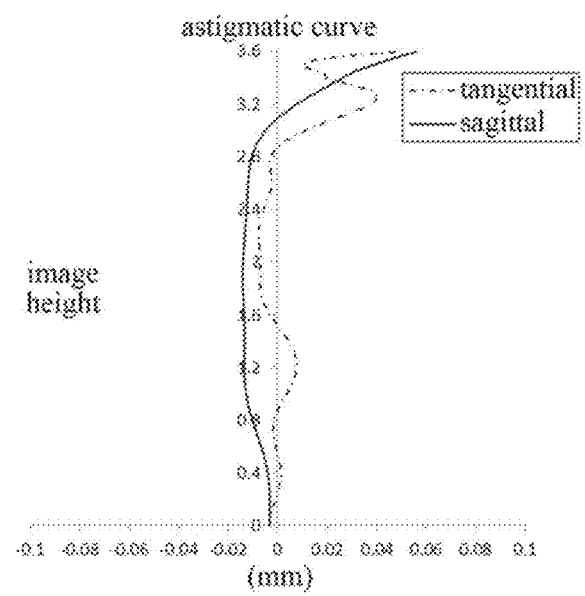
Figure 20C:
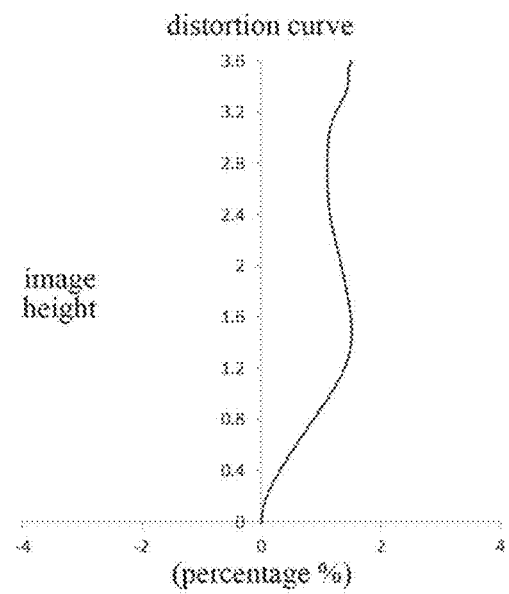
Figure 20D:
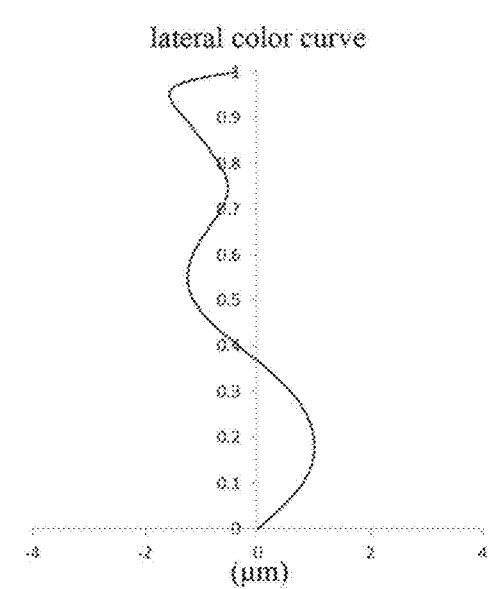

FIG. 20A illustrates the longitudinal aberration curve of the optical imaging lens assembly according to Embodiment 10, representing deviations of focal points of light of different wavelengths converged after passing through the optical imaging lens assembly. FIG. 20B illustrates the astigmatic curve of the optical imaging lens assembly according to Embodiment 10, representing a curvature of the tangential image plane and a curvature of the sagittal image plane. FIG. 20C illustrates the distortion curve of the optical imaging lens assembly according to Embodiment 10, representing amounts of distortion at different viewing angles. FIG. 20D illustrates the lateral color curve of the optical imaging lens assembly according to Embodiment 10, representing deviations of different image heights on the image plane after light passes through the optical imaging lens assembly. It can be seen from FIGS. 20A-20D that the optical imaging lens assembly according to Embodiment 10 can achieve a good imaging quality.

Embodiment 11

An optical imaging lens assembly according to Embodiment 11 of the present disclosure is described below with reference to FIGS. 21-22D.

Figure 21:
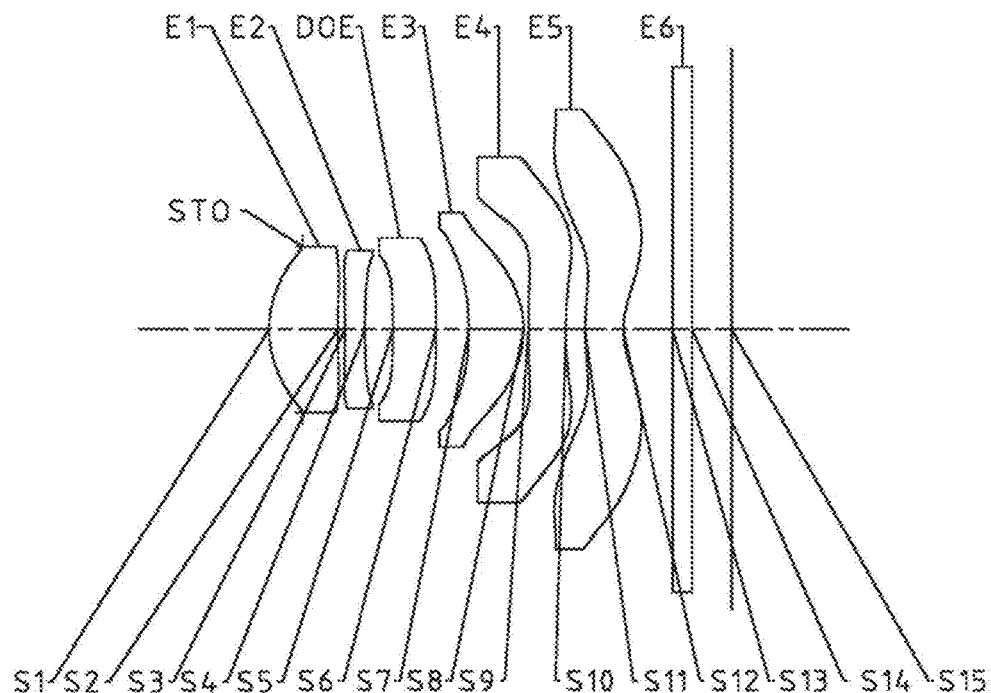
FIG. 21 is a schematic structural diagram illustrating an optical imaging lens assembly according to Embodiment 11 of the present disclosure.

FIG. 21 is a schematic structural diagram illustrating the optical imaging lens assembly according to Embodiment 11 of the present disclosure. As shown in FIG. 21, the optical imaging lens assembly according to Embodiment 11 includes two lens groups arranged in sequence from the object side to the image side. The first lens group includes a first lens E1 and a second lens E2. The second lens group includes an optical element DOE, a third lens E3, a fourth lens E4, and a fifth lens E5 closest to an image plane. The first lens E1 has an object-side surface S1 and an image-side surface S2. The second lens E2 has an object-side surface S3 and an image-side surface S4. The optical element DOE has an object-side surface S5 and an image-side surface S6. The third lens E3 has object-side surface S7 and an image-side surface S8. The fourth lens E4 has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The object-side surface and the image-side surface of the optical element DOE are aspheric surfaces, and the optical element DOE does not have a refractive power. The third lens E3 has a positive refractive power. The fourth lens E4 has a negative refractive power. The fifth lens E5 closest to the image plane has a negative refractive power.

Table 31 below shows the surface type, the radius of curvature, the thickness, the material and the conic coefficient of each lens of the optical imaging lens assembly in Embodiment 11. Table 32 shows the high-order coefficients of the aspheric surfaces in Embodiment 11. Table 33 shows the effective focal lengths f1-f5 of the lenses in Embodiment 11, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 31

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3521 | | | |
| S1 | aspheric | 1.6761 | 0.7403 | 1.546 | 54.11 | −0.7364 |
| S2 | aspheric | 10.3438 | 0.0783 | | | −0.6000 |
| S3 | aspheric | −67.5276 | 0.2170 | 1.666 | 20.37 | −0.6000 |
| S4 | aspheric | 8.6979 | 0.3049 | | | −27.2506 |
| S5 | aspheric | infinite | 0.4637 | 1.666 | 20.37 | 21.8544 |
| S6 | aspheric | infinite | 0.3553 | | | −14.7928 |
| S7 | aspheric | −3.6975 | 0.5883 | 1.546 | 54.11 | 1.8809 |
| S8 | aspheric | −1.4695 | 0.0492 | | | −0.9305 |
| S9 | aspheric | −129.8147 | 0.4048 | 1.666 | 20.37 | −6.0000 |
| S10 | aspheric | 70.2730 | 0.2034 | | | −6.0000 |
| S11 | aspheric | 3.3812 | 0.4112 | 1.546 | 54.11 | −1.2295 |
| S12 | aspheric | 1.1854 | 0.5392 | | | −5.2961 |
| S13 | spherical | infinite | 0.2100 | 1.517 | 64.17 | |
| S14 | spherical | infinite | 0.4244 | | | |
| S15 | spherical | infinite | 0.0000 | | | |

TABLE 32

| surface number | A4 | A6 | A8 | A10 | A12 |
|---|---|---|---|---|---|
| S1 | 1.1351E−02 | 6.6283E−02 | −2.9185E−01 | 7.7746E−01 | −1.2558E−00 |
| S2 | −9.4745E−02 | 9.3457E−02 | −9.4163E−02 | 2.4375E−01 | −7.8943E−01 |
| S3 | −1.1088E−01 | 1.8004E−01 | 1.9460E−01 | −9.4224E−01 | 1.3882E+00 |
| S4 | −6.1347E−02 | 1.1321E−01 | 4.9645E−01 | −2.3523E+00 | 5.0463E+00 |
| S5 | −1.7943E−01 | 3.4005E−01 | −1.6817E+00 | 4.3596E+00 | −6.3259E+00 |
| S6 | −1.0757E−01 | 8.6201E−02 | −2.2178E−01 | 2.7751E−01 | −1.5867E−01 |
| S7 | −6.1868E−02 | 1.0178E−01 | 1.2546E−01 | −7.8959E−01 | 1.2495E+00 |
| S8 | 2.9596E−02 | −3.3213E−03 | −8.3363E−02 | 1.1221E−01 | −7.4473E−02 |
| S9 | 1.9439E−01 | −3.2815E−01 | 1.5571E−01 | 3.2965E−03 | −4.1513E−02 |
| S10 | 3.1827E−01 | −5.3518E−01 | 4.2810E−01 | −2.1973E−01 | 7.5401E−02 |
| S11 | −1.4095E−01 | −7.4006E−02 | 1.0680E−01 | −4.9206E−02 | 1.2434E−02 |
| S12 | −1.3021E−01 | 4.2110E−02 | −4.4879E−03 | −1.5881E−03 | 7.1850E−04 |

| surface number | A14 | A16 | A18 | A20 |
|---|---|---|---|---|
| S1 | 1.1823E+00 | −6.0362E−01 | 1.2725E−01 | 0.0000E+00 |
| S2 | 1.2254E+00 | −8.8754E−01 | 2.4464E−01 | 0.0000E+00 |
| S3 | −9.2649E−01 | 2.4016E−01 | 0.0000E+00 | 0.0000E+00 |
| S4 | −6.0076E+00 | 3.8655E+00 | −1.0443E+00 | 0.0000E+00 |
| S5 | 4.7690E+00 | −1.4528E+00 | 0.0000E+00 | 0.0000E+00 |
| S6 | 1.6119E−02 | 2.4392E−02 | −8.0788E−03 | 0.0000E+00 |
| S7 | −9.5491E−01 | 3.6731E−01 | −5.7427E−02 | 0.0000E+00 |
| S8 | 3.4011E−02 | −9.4328E−03 | 1.0922E−03 | 0.0000E+00 |
| S9 | 2.1030E−02 | −5.7214E−03 | 1.1139E−03 | −1.1794E−04 |
| S10 | −1.7108E−02 | 2.4491E−03 | −1.9861E−04 | 6.8710E−06 |
| S11 | −1.8943E−03 | 1.7360E−04 | −8.8169E−06 | 1.9029E−07 |
| S12 | −1.2900E−04 | 1.2009E−05 | −5.3839E−07 | 8.0442E−09 |

TABLE 33

| f1(mm) | 3.56 | f(mm) | 3.96 |
|---|---|---|---|
| f2(mm) | −11.55 | TTL(mm) | 4.99 |
| f3(mm) | 4.09 | ImgH(mm) | 3.60 |
| f4(mm) | −68.36 | | |
| f5(mm) | −3.58 | | |

Figure 22A:
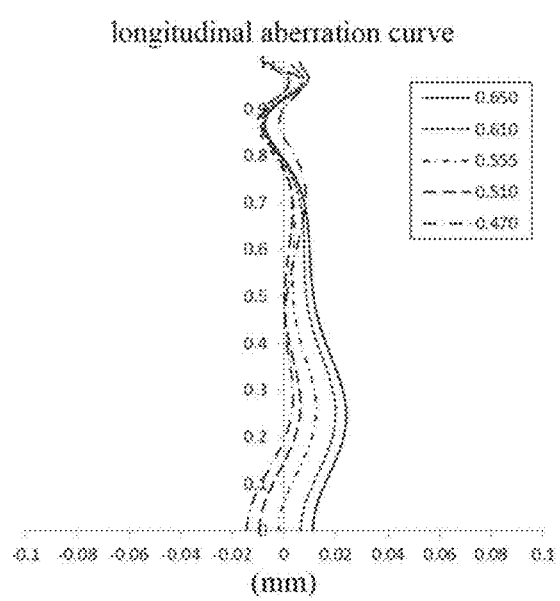
Figure 22B:
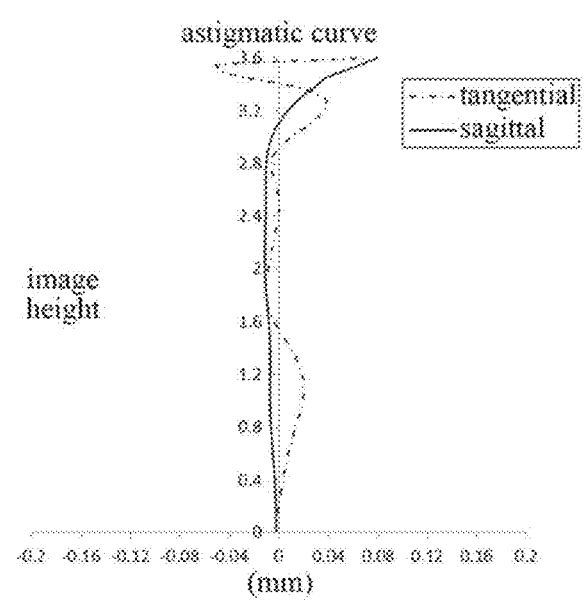

FIG. 22A illustrates the longitudinal aberration curve of the optical imaging lens assembly according to Embodiment 11, representing deviations of focal points of light of different wavelengths converged after passing through the optical imaging lens assembly. FIG. 22B illustrates the astigmatic curve of the optical imaging lens assembly according to Embodiment 11, representing a curvature of the tangential image plane and a curvature of the sagittal image plane. FIG. 22C illustrates the distortion curve of the optical imaging lens assembly according to Embodiment 11, representing amounts of distortion at different viewing angles. FIG. 22D illustrates the lateral color curve of the optical imaging lens assembly according to Embodiment 11, representing deviations of different image heights on the image plane after light passes through the optical imaging lens assembly. It can be seen from FIGS. 22A-22D that the optical imaging lens assembly according to Embodiment 11 can achieve a good imaging quality.

Embodiment 12

An optical imaging lens assembly according to Embodiment 12 of the present disclosure is described below with reference to FIGS. 23-24D.

FIG. 23 is a schematic structural diagram illustrating the optical imaging lens assembly according to Embodiment 12 of the present disclosure. As shown in FIG. 23, the optical imaging lens assembly according to Embodiment 12 includes two lens groups arranged in sequence from the object side to the image side. The first lens group includes a first lens E1 and a second lens E2. The second lens group includes a third lens E3, an optical element DOE, a fourth lens E4, and a fifth lens E5 closest to the image plane. The first lens E1 has an object-side surface S1 and an image-side surface S2. The second lens E2 has an object-side surface S3 and an image-side surface S4. The third lens E3 has an object-side surface S5 and an image-side surface S6. The optical element DOE has object-side surface S7 and an image-side surface S8. The fourth lens E4 has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The third lens E3 has a negative refractive power. The object-side surface and the image-side surface of the optical element DOE are aspheric surfaces, and the optical element DOE does not have a refractive power. The fourth lens E4 has a positive refractive power. The fifth lens E5 closest to the image plane has a negative refractive power.

Table 34 below shows the surface type, the radius of curvature, the thickness, the material and the conic coefficient of each lens of the optical imaging lens assembly in Embodiment 12. Table 35 shows the high-order coefficients of the aspheric surfaces in Embodiment 12. Table 36 shows the effective focal lengths f1-f5 of the lenses in Embodiment 12, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 34

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4001 | | | |
| S1 | aspheric | 1.4487 | 0.6521 | 1.546 | 54.11 | −2.2857 |
| S2 | aspheric | 7.7850 | 0.0713 | | | −4.1744 |
| S3 | aspheric | 7.0338 | 0.2323 | 1.666 | 20.37 | −6.0495 |
| S4 | aspheric | 2.8739 | 0.3033 | | | 0.4371 |
| S5 | aspheric | 15.7983 | 0.3212 | 1.546 | 54.11 | −94.5164 |
| S6 | aspheric | 12.0765 | 0.1080 | | | −99.0000 |
| S7 | aspheric | infinite | 0.3149 | 1.645 | 23.53 | −2.4111 |
| S8 | aspheric | infinite | 0.3690 | | | 1.9498 |
| S9 | aspheric | 15.4856 | 0.5699 | 1.546 | 54.11 | −42.3597 |
| S10 | aspheric | −1.2299 | 0.1781 | | | −7.4806 |
| S11 | aspheric | −2.9158 | 0.4000 | 1.536 | 55.87 | −1.7909 |
| S12 | aspheric | 1.3866 | 0.5275 | | | −10.6207 |
| S13 | spherical | infinite | 0.2500 | 1.517 | 64.17 | |
| S14 | spherical | infinite | 0.2924 | | | |
| S15 | spherical | infinite | 0.0000 | | | |

TABLE 35

| surface number | A4 | A6 | A8 | A10 | A12 | A14 | A16 |
|---|---|---|---|---|---|---|---|
| S1 | 9.1199E−02 | −1.3433E−02 | 5.7278E−02 | −1.5869E−01 | 2.1103E−01 | −1.4755E−01 | 3.3740E−02 |
| S2 | −1.3572E−01 | 2.3288E−01 | −2.5033E−01 | 7.0492E−02 | 8.0011E−02 | −7.5693E−02 | 1.5822E−02 |
| S3 | −1.7574E−01 | 4.5132E−01 | −5.2126E−01 | 3.5975E−01 | −7.9770E−02 | 0.0000E+00 | 0.0000E+00 |
| S4 | −7.4586E−02 | 3.3940E−01 | −4.7318E−01 | 6.7963E−01 | −6.7250E−01 | 4.1565E−01 | 0.0000E+00 |
| S5 | −1.1547E−01 | −6.6846E−02 | 2.0301E−01 | −7.6406E−01 | 1.2172E+00 | −1.1329E+00 | 5.1203E−01 |
| S6 | −1.8617E−01 | 2.5376E−01 | −9.7420E−01 | 1.8911E+00 | −2.1466E+00 | 1.3487E+00 | −3.4388E−01 |
| S7 | −2.5968E−01 | 3.2906E−01 | −8.2417E−01 | 1.3576E+00 | −1.0613E+00 | 3.8464E−01 | −5.2262E−02 |
| S8 | −2.1125E−01 | 2.5201E−01 | −5.4641E−01 | 7.7782E−01 | −5.3579E−01 | 1.7565E−01 | −2.2271E−02 |
| S9 | −5.9096E−03 | 7.0711E−02 | −1.4738E−01 | 8.7074E−02 | −2.9990E−02 | 7.0310E−03 | −7.7523E−04 |
| S10 | −3.9257E−02 | 2.3025E−01 | −2.4717E−01 | 1.1115E−01 | −2.4727E−02 | 2.6647E−03 | −1.0881E−04 |
| S11 | −6.2928E−02 | 2.3043E−02 | 1.7791E−03 | −1.6015E−03 | 2.3086E−04 | −9.6478E−06 | −1.5011E−07 |
| S12 | −1.0357E−01 | 5.5949E−02 | −2.4943E−02 | 7.4420E−03 | −1.3638E−03 | 1.3441E−04 | −5.3449E−06 |

TABLE 36

| f1(mm) | 3.14 | f(mm) | 3.91 |
|---|---|---|---|
| f2(mm) | −7.44 | TTL(mm) | 4.59 |
| f3(mm) | −96.75 | ImgH(mm) | 3.40 |
| f4(mm) | 2.11 | | |
| f5(mm) | −1.69 | | |

Figure 24A:
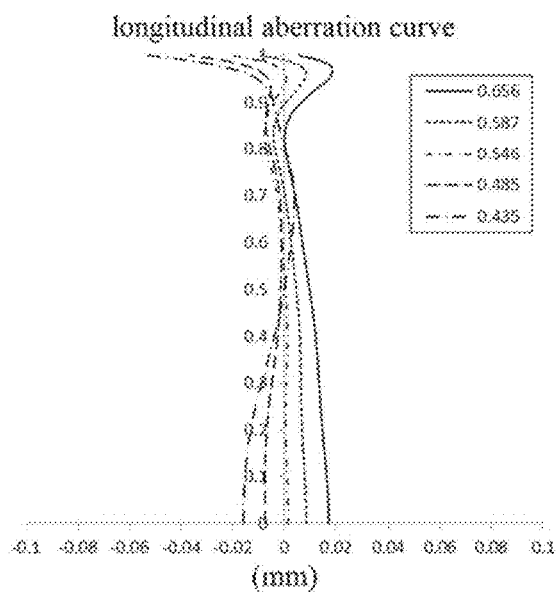
FIGS. 24A-24D respectively illustrate a longitudinal aberration curve, an astigmatic curve, a distortion curve, and a lateral color curve of the optical imaging lens assembly according to Embodiment 12.
Figure 24B:
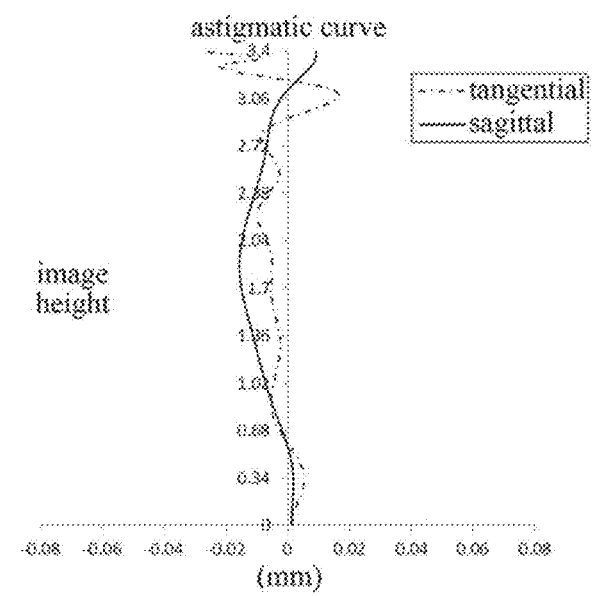
Figure 24C:
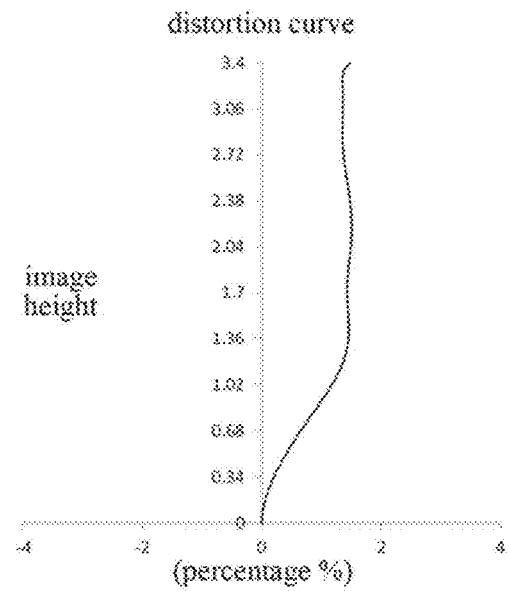
Figure 24D:
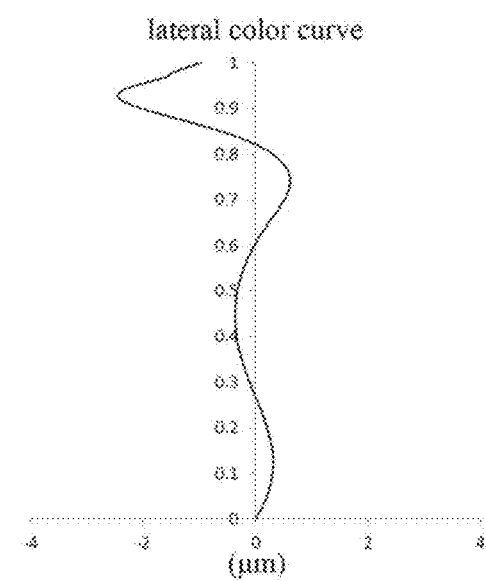

FIG. 24A illustrates the longitudinal aberration curve of the optical imaging lens assembly according to Embodiment 12, representing deviations of focal points of light of different wavelengths converged after passing through an optical imaging lens assembly. FIG. 24B illustrates the astigmatic curve of the optical imaging lens assembly according to Embodiment 12, representing a curvature of the tangential image plane and a curvature of the sagittal image plane. FIG. 24C illustrates the distortion curve of the optical imaging lens assembly according to Embodiment 12, representing amounts of distortion at different viewing angles. FIG. 24D illustrates the lateral color curve of the optical imaging lens assembly according to Embodiment 12, representing deviations of different image heights on the image plane after light passes through the optical imaging lens assembly. It can be seen from FIGS. 24A-24D that the optical imaging lens assembly according to Embodiment 12 can achieve a good imaging quality.

Embodiment 13

An optical imaging lens assembly according to Embodiment 13 of the present disclosure is described below with reference to FIGS. 25-26D.

Figure 25:
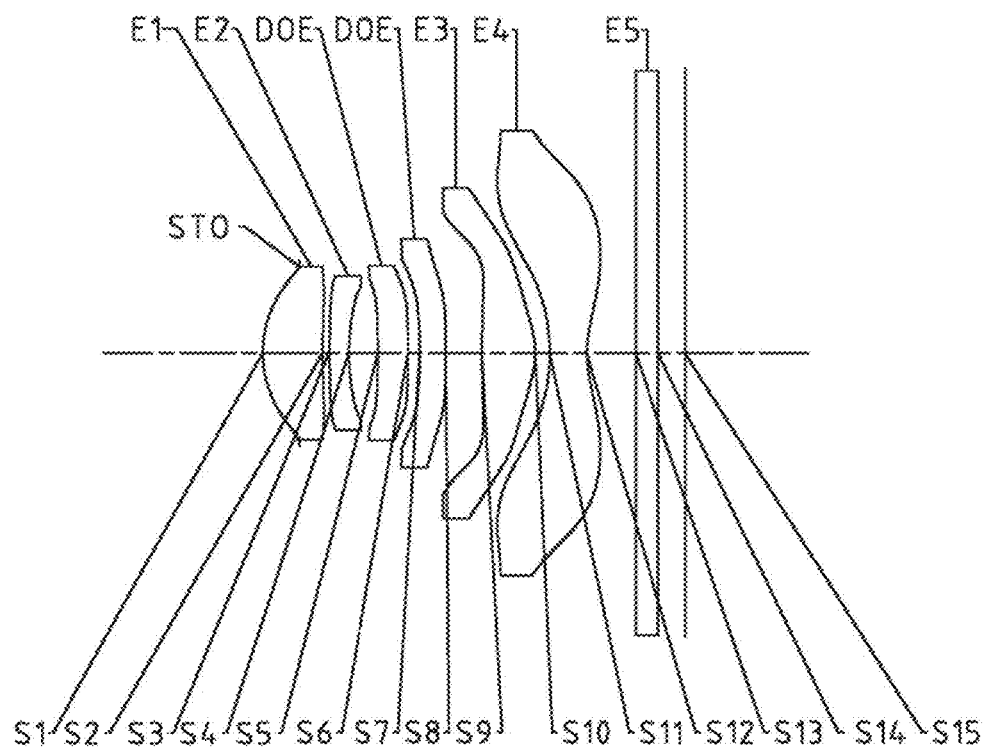
FIG. 25 is a schematic structural diagram illustrating an optical imaging lens assembly according to Embodiment 13 of the present disclosure.

FIG. 25 is a schematic structural diagram illustrating the optical imaging lens assembly according to Embodiment 13 of the present disclosure. As shown in FIG. 25, the optical imaging lens assembly according to Embodiment 13 includes two lens groups arranged in sequence from the object side to the image side. The first lens group includes a first lens E1 and a second lens E2. The second lens group includes a first optical element DOE, a second optical element DOE, a third lens E3, and a fourth lens E4 closest to the image plane. The first lens E1 has an object-side surface S1 and an image-side surface S2. The second lens E2 has an object-side surface S3 and an image-side surface S4. The first optical element DOE has an object-side surface S5 and an image-side surface S6. The second optical element DOE has object-side surface S7 and an image-side surface S8. The third lens E3 has an object-side surface S9 and an image-side surface S10. The fourth lens E4 closest to the image plane has an object-side surface S11 and an image-side surface S12.

In this embodiment, the first lens E1 has a positive refractive power. The second lens E2 has a negative refractive power. The object-side surface and the image-side surface of the first optical element DOE and the object-side surface and the image-side surface of the second optical element DOE are aspheric surfaces. The first optical element DOE and the second optical element DOE do not have a refractive power. The third lens E3 has a positive refractive power. The fourth lens E4 closest to the image plane has a negative refractive power.

Table 37 below shows the surface type, the radius of curvature, the thickness, the material and the conic coefficient of each lens of the optical imaging lens assembly in Embodiment 13. Table 38 shows the high-order coefficients of the aspheric mirror surfaces in Embodiment 13. Table 39 shows the effective focal lengths f1-f4 of the lenses in Embodiment 13, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 37

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3983 | | | |
| S1 | aspheric | 1.4579 | 0.6492 | 1.546 | 54.11 | −2.2221 |
| S2 | aspheric | 7.8196 | 0.0727 | | | 0.3549 |
| S3 | aspheric | 7.4558 | 0.2129 | 1.666 | 20.37 | −7.3202 |
| S4 | aspheric | 3.1015 | 0.3211 | | | −0.6531 |
| S5 | aspheric | infinite | 0.3268 | 1.546 | 54.11 | 2.0000 |
| S6 | aspheric | infinite | 0.1233 | | | 2.0000 |
| S7 | aspheric | infinite | 0.2853 | 1.645 | 23.53 | 2.0000 |
| S8 | aspheric | infinite | 0.3918 | | | 2.0000 |
| S9 | aspheric | 24.2817 | 0.5783 | 1.546 | 54.11 | 2.0000 |
| S10 | aspheric | −1.1881 | 0.1575 | | | −7.5159 |
| S11 | aspheric | −2.8250 | 0.4000 | 1.536 | 55.87 | −1.7446 |
| S12 | aspheric | 1.3163 | 0.5319 | | | −11.3355 |
| S13 | spherical | infinite | 0.2468 | 1.517 | 64.17 | |
| S14 | spherical | infinite | 0.2924 | | | |
| S15 | spherical | infinite | 0.0000 | | | |

TABLE 38

| surface number | A4 | A6 | A8 | A10 | A12 |
|---|---|---|---|---|---|
| S1 | 7.8280E−02 | 8.2392E−02 | −4.2541E−01 | 1.2404E+00 | −2.2229E+00 |
| S2 | −1.1991E−01 | 9.8303E−02 | 5.2123E−01 | −2.9958E+00 | 7.9504E+00 |
| S3 | −1.5807E−01 | 2.6737E−01 | 5.2586E−01 | −3.4744E+00 | 9.0087E+00 |
| S4 | −6.5881E−02 | 3.3093E−01 | −9.6048E−01 | 5.3784E+00 | −2.1587E+01 |
| S5 | −1.3798E−01 | 3.7229E−01 | −3.7152E+00 | 1.9470E+01 | −6.2281E+01 |
| S6 | −1.2364E−01 | −7.8160E−02 | −6.5061E−02 | 1.0826E+00 | −3.6236E−00 |
| S7 | −1.4882E−01 | −1.5025E−01 | 2.1269E−01 | 5.5027E−01 | −2.1416E+00 |
| S8 | −1.1261E−01 | −1.4367E−01 | 3.5206E−01 | −4.6466E−01 | 4.7900E−01 |
| S9 | 5.2186E−02 | −8.6873E−02 | 9.1662E−02 | −1.5009E−01 | 1.3240E−01 |
| S10 | −2.0294E−02 | 1.9178E−01 | −2.3012E−01 | 1.3202E−01 | −5.5544E−02 |
| S11 | −8.1329E−02 | 6.2898E−02 | −4.3230E−02 | 2.8019E−02 | −1.1265E−02 |
| S12 | −1.0480E−01 | 6.3470E−02 | −3.2377E−02 | 1.1177E−02 | −2.4894E−03 |

| surface number | A14 | A16 | A18 | A20 |
|---|---|---|---|---|
| S1 | 2.4232E+00 | −1.5609E+00 | 5.2486E−01 | −6.8429E−02 |
| S2 | −1.2706E+01 | 1.2206E+01 | −6.4495E+00 | 1.4338E+00 |
| S3 | −1.3795E+01 | 1.2892E+01 | −6.7145E+00 | 1.4784E+00 |
| S4 | 5.2484E+01 | −7.4546E+01 | 5.7474E+01 | −1.8525E+01 |
| S5 | 1.2246E+02 | −1.4492E+02 | 9.4749E+01 | −2.6193E+01 |
| S6 | 6.2338E+00 | −6.1285E+00 | 3.3435E+00 | −7.7985E−01 |
| S7 | 3.2558E+00 | −2.6176E+00 | 1.0965E+00 | −1.9047E−01 |
| S8 | −3.1463E−01 | 1.1650E−01 | −2.1839E−02 | 1.5643E−03 |
| S9 | −7.0934E−02 | 2.3891E−02 | −4.4793E−03 | 3.4649E−04 |
| S10 | 2.0089E−02 | −5.2436E−03 | 7.7584E−04 | −4.7396E−05 |
| S11 | 2.6703E−03 | −3.7069E−04 | 2.8093E−05 | −9.0218E−07 |
| S12 | 3.4305E−04 | −2.8452E−05 | 1.4009E−06 | −3.5976E−08 |

TABLE 39

| f1(mm) | 3.16 | f(mm) | 3.91 |
|---|---|---|---|
| f2(mm) | −8.11 | TTL(mm) | 4.59 |
| f3(mm) | 2.09 | ImgH(mm) | 3.40 |
| f4(mm) | −1.62 | | |

Figure 26A:
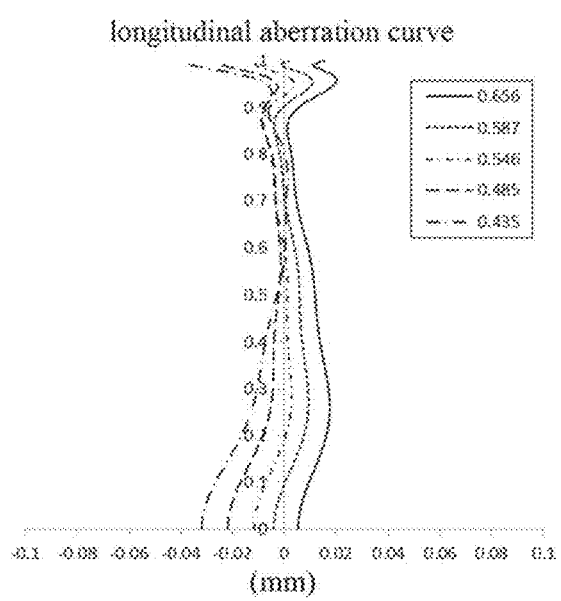
FIGS. 26A-26D respectively illustrate a longitudinal aberration curve, an astigmatic curve, a distortion curve, and a lateral color curve of the optical imaging lens assembly according to Embodiment 13.
Figure 26B:
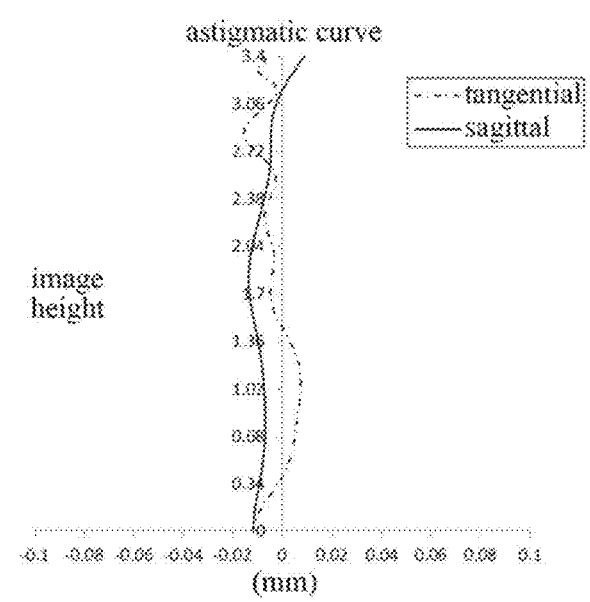
Figure 26C:
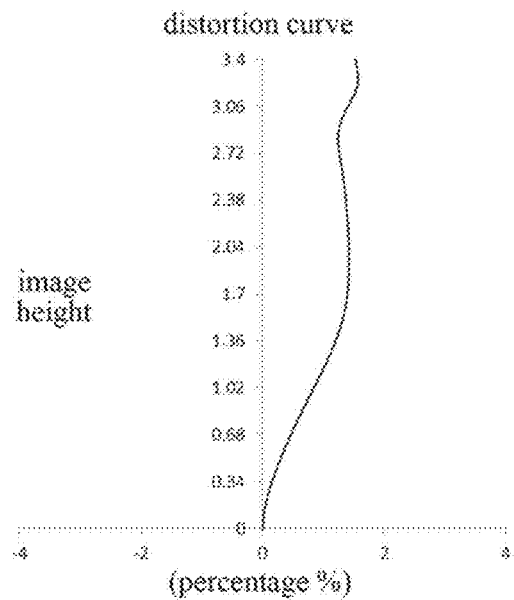
Figure 26D:
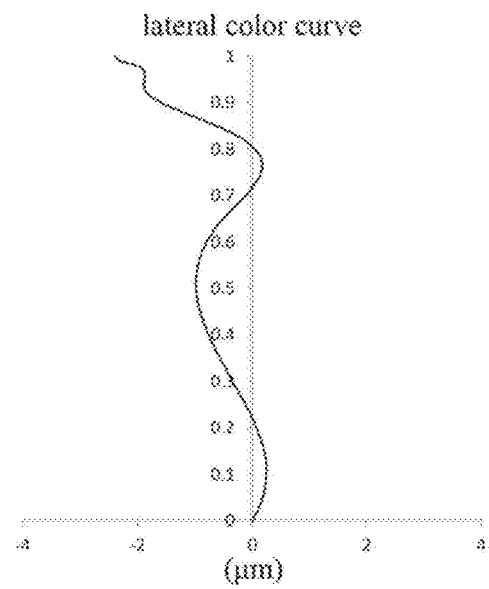

FIG. 26A illustrates the longitudinal aberration curve of the optical imaging lens assembly according to Embodiment 13, representing deviations of focal points of light of different wavelengths converged after passing through the optical imaging lens assembly. FIG. 26B illustrates the astigmatic curve of the optical imaging lens assembly according to Embodiment 13, representing a curvature of the tangential image plane and a curvature of the sagittal image plane. FIG. 26C illustrates the distortion curve of the optical imaging lens assembly according to Embodiment 13, representing amounts of distortion at different viewing angles. FIG. 26D illustrates the lateral color curve of the optical imaging lens assembly according to Embodiment 13, representing deviations of different image heights on the image plane after light passes through the optical imaging lens assembly. It can be seen from FIGS. 26A-26D that the optical imaging lens assembly according to Embodiment 13 can achieve a good imaging quality.

Embodiment 14

An optical imaging lens assembly according to Embodiment 14 of the present disclosure is described below with reference to FIGS. 27-28D.

Figure 27:
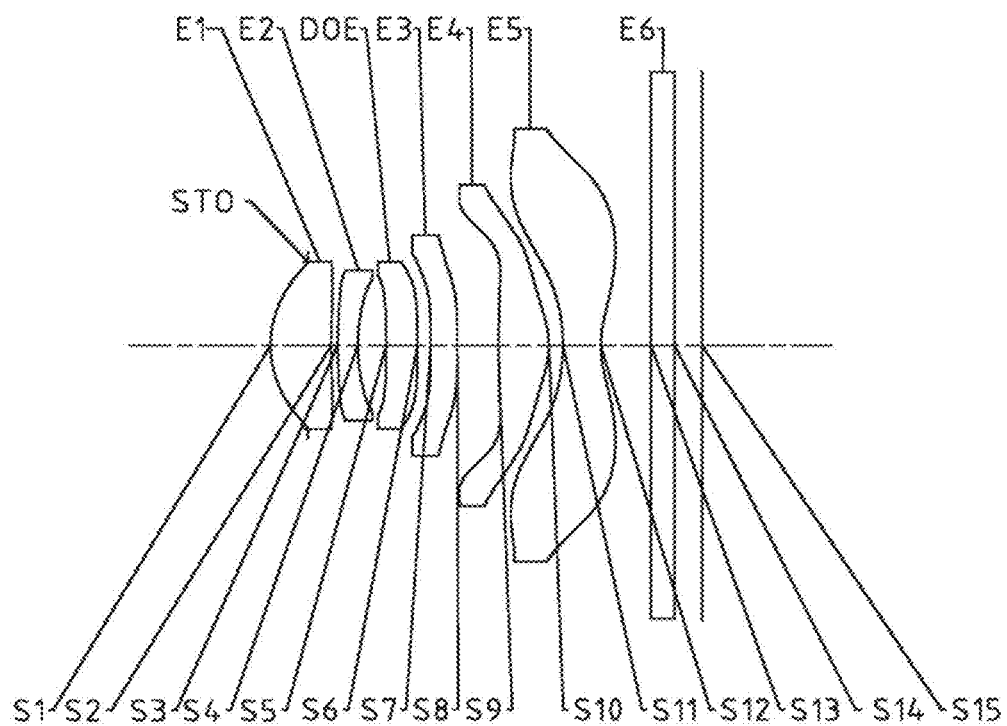
FIG. 27 is a schematic structural diagram illustrating an optical imaging lens assembly according to Embodiment 14 of the present disclosure.
Figure 28A:
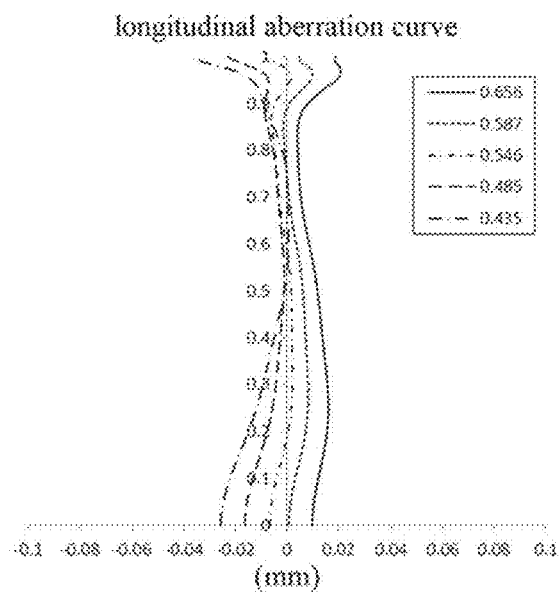
FIGS. 28A-28D respectively illustrate a longitudinal aberration curve, an astigmatic curve, a distortion curve, and a lateral color curve of the optical imaging lens assembly according to Embodiment 14.
Figure 28B:
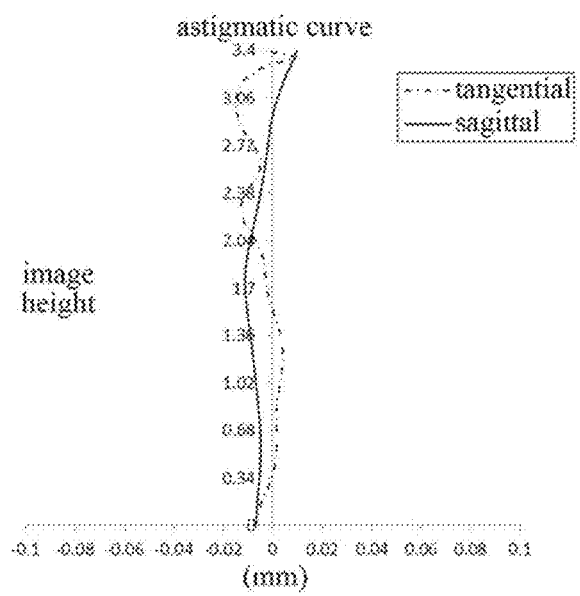
Figure 28C:
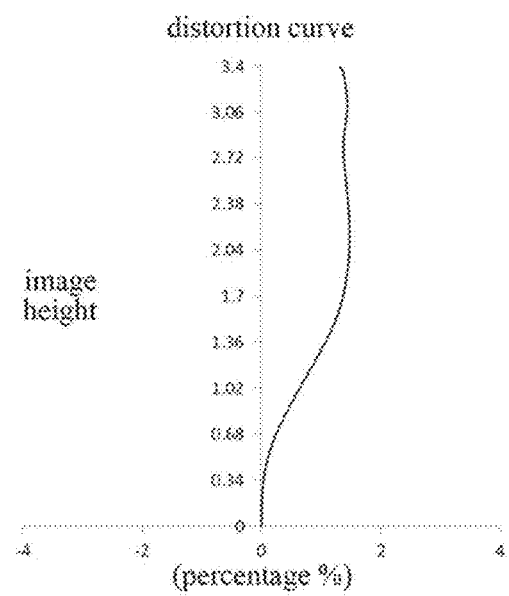
Figure 28D:
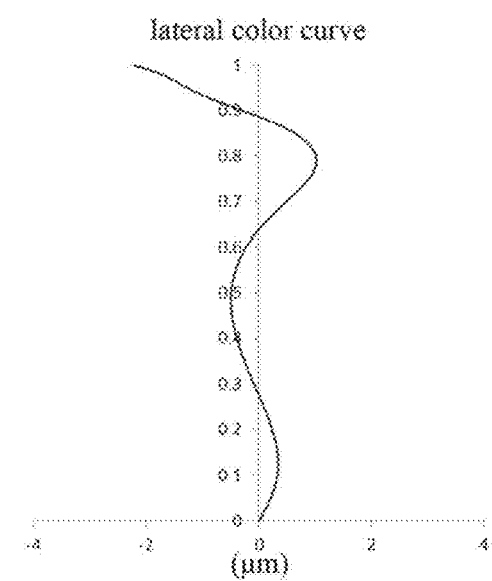

FIG. 27 is a schematic structural diagram illustrating the optical imaging lens assembly according to Embodiment 14 of the present disclosure. As shown in FIG. 27, the optical imaging lens assembly according to Embodiment 14 includes two lens groups arranged in sequence from the object side to the image side. The first lens group includes a first lens E1 and a second lens E2. The second lens group includes an optical element DOE, a third lens E3, a fourth lens E4, and a fifth lens E5 closest to the image plane. The first lens E1 has an object-side surface S1 and an image-side surface S2. The second lens E2 has an object-side surface S3 and an image-side surface S4. The optical element DOE has an object-side surface S5 and an image-side surface S6. The third lens E3 has object-side surface S7 and an image-side surface S8. The fourth lens E4 has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The object-side surface and the image-side surface of the optical element DOE are aspheric surfaces, and the optical element DOE does not have a refractive power. The third lens E3 has a positive refractive power. The fourth lens E4 has a positive refractive power. The fifth lens E5 closest to the image plane has a negative refractive power.

Table 40 below shows the surface type, the radius of curvature, the thickness, the material and the conic coefficient of each lens of the optical imaging lens assembly in Embodiment 14. Table 41 shows the high-order coefficients of the aspheric surfaces in Embodiment 14. Table 42 shows the effective focal lengths f1-f5 of the lenses in Embodiment 14, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 40

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.3951 | | | |
| S1 | aspheric | 1.4759 | 0.6456 | 1.546 | 54.11 | −2.2406 |
| S2 | aspheric | 8.3223 | 0.0692 | | | 1.8913 |
| S3 | aspheric | 5.6223 | 0.2135 | 1.666 | 20.37 | −15.6333 |
| S4 | aspheric | 2.6054 | 0.3015 | | | −1.7692 |
| S5 | aspheric | infinite | 0.3329 | 1.546 | 54.11 | 0.0000 |
| S6 | aspheric | infinite | 0.1413 | | | 0.0000 |
| S7 | aspheric | 28.9298 | 0.2823 | 1.645 | 23.53 | −68.5847 |
| S8 | aspheric | 48.1068 | 0.4352 | | | −69.0000 |
| S9 | aspheric | 15.9314 | 0.5397 | 1.546 | 54.11 | −48.3658 |
| S10 | aspheric | −1.1825 | 0.1486 | | | −7.8253 |
| S11 | aspheric | −2.9080 | 0.4000 | 1.536 | 55.87 | −1.7105 |
| S12 | aspheric | 1.2580 | 0.5353 | | | −11.0724 |
| S13 | spherical | infinite | 0.2523 | 1.517 | 64.17 | |
| S14 | spherical | infinite | 0.2924 | | | |
| S15 | spherical | infinite | 0.0000 | | | |

TABLE 41

| surface number | A4 | A6 | A8 | A10 | A12 |
|---|---|---|---|---|---|
| S1 | 7.4050E−02 | 1.0673E−01 | −5.7964E−01 | 1.8141E+00 | −3.5411E+00 |
| S2 | −1.2932E−01 | 2.0195E−01 | 6.1590E−02 | −1.4774E−00 | 4.3853E+00 |
| S3 | −1.6935E−01 | 3.2064E−01 | 4.4482E−01 | −3.7959E+00 | 1.0913E+01 |
| S4 | −7.2997E−02 | 3.4027E−01 | −8.8363E−01 | 4.3068E+00 | −1.6412E+01 |
| S5 | −9.7836E−02 | −8.7388E−02 | 3.7722E−01 | −1.6843E+00 | 4.0110E+00 |
| S6 | −1.3534E−01 | −1.8754E−02 | 1.0912E−01 | −4.0827E−01 | 6.6412E−01 |
| S7 | −2.0320E−01 | −3.2223E−02 | 1.5615E−01 | 2.5444E−01 | −1.5128E+00 |
| S8 | −1.6262E−01 | −5.9824E−02 | 2.5003E−01 | −3.4841E−01 | 2.9920E−01 |
| S9 | 4.2056E−02 | −6.0303E−02 | 4.5974E−02 | −7.3181E−02 | 5.1452E−02 |
| S10 | −1.3592E−02 | 1.8399E−01 | −2.2632E−01 | 1.3726E−01 | −6.4219E−02 |
| S11 | −7.9256E−02 | 5.2929E−02 | −3.1011E−02 | 2.0735E−02 | −8.7151E−03 |
| S12 | −1.0127E−01 | 5.8590E−02 | −2.8492E−02 | 9.4929E−03 | −2.0759E−03 |

| surface number | A14 | A16 | A18 | A20 |
|---|---|---|---|---|
| S1 | 4.3075E+00 | −3.1857E+00 | 1.3000E+00 | −2.2517E−01 |
| S2 | −7.1657E+00 | 6.8984E+00 | −3.6392E+00 | 8.0780E−01 |
| S3 | −1.8230E+01 | 1.8455E+01 | −1.0409E+01 | 2.5002E+00 |
| S4 | 3.8750E+01 | −5.3521E+01 | 4.0022E+01 | −1.2460E+01 |
| S5 | −6.0161E+00 | 5.4090E+00 | −2.5975E+00 | 5.5809E−01 |
| S6 | −7.8058E−01 | 6.9192E−01 | −3.1895E−01 | 4.8311E−02 |
| S7 | 2.7024E+00 | −2.3602E+00 | 1.0329E+00 | −1.8528E−01 |
| S8 | −8.6640E−02 | −4.2712E−02 | 3.2791E−02 | −5.7335E−03 |
| S9 | −2.0750E−02 | 5.8968E−03 | −1.0588E−03 | 8.2069E−05 |
| S10 | 2.5182E−02 | −6.7320E−03 | 9.9243E−04 | −5.9858E−05 |
| S11 | 2.1139E−03 | −2.9583E−04 | 2.2400E−05 | −7.1479E−07 |
| S12 | 2.8519E−04 | −2.4051E−05 | 1.2404E−06 | −3.3890E−08 |

TABLE 42

| | | | |
|---|---|---|---|
| f1(mm) | 3.18 | f(mm) | 3.91 |
| f2(mm) | −7.48 | TTL(mm) | 4.59 |
| f3(mm) | 111.68 | ImgH(mm) | 3.40 |
| f4(mm) | 2.04 | | |
| f5(mm) | −1.58 | | |

Embodiment 15

An optical imaging lens assembly according to Embodiment 15 of the present disclosure is described below with reference to FIGS. 29-30D.

Figure 29:
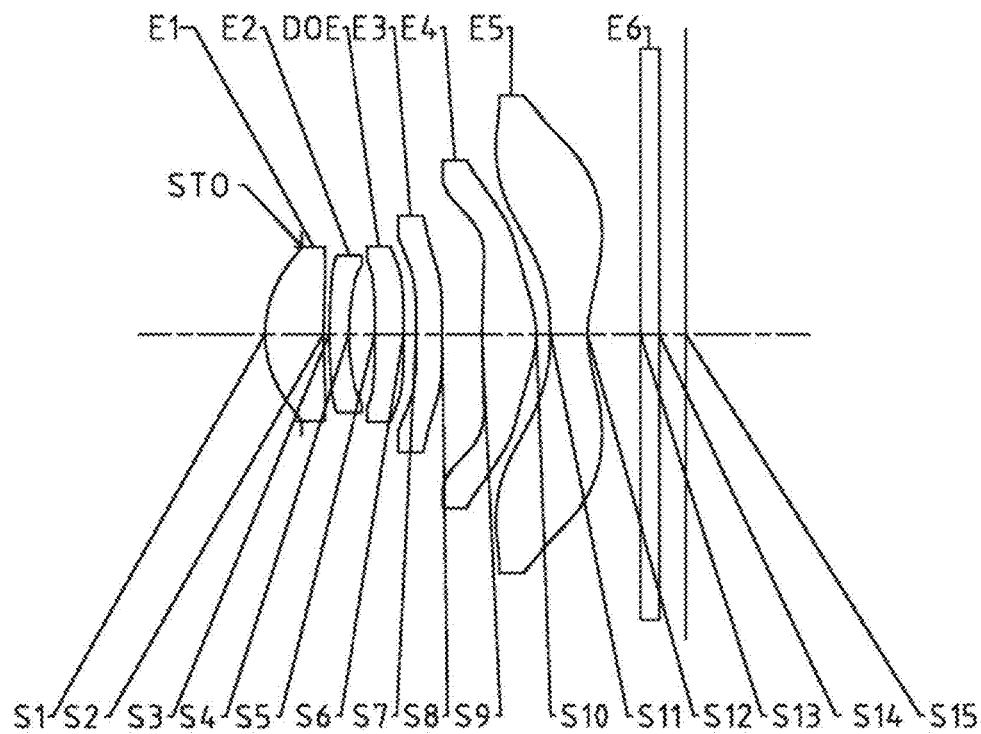
FIG. 29 is a schematic structural diagram illustrating an optical imaging lens assembly according to Embodiment 15 of the present disclosure.
Figure 30A:
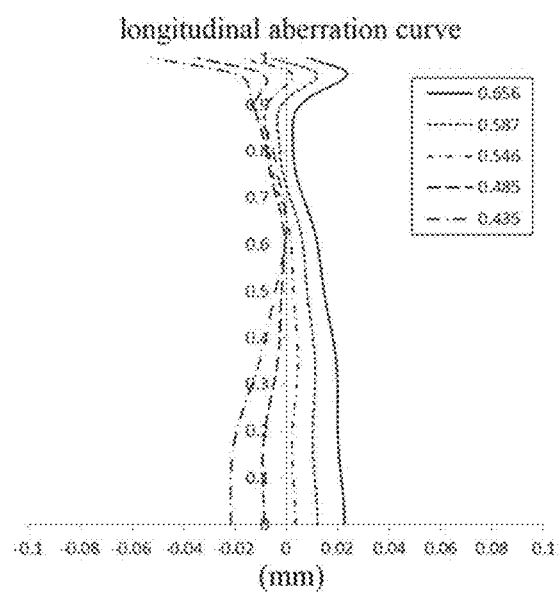
FIGS. 30A-30D respectively illustrate a longitudinal aberration curve, an astigmatic curve, a distortion curve, and a lateral color curve of the optical imaging lens assembly according to Embodiment 15.
Figure 30B:
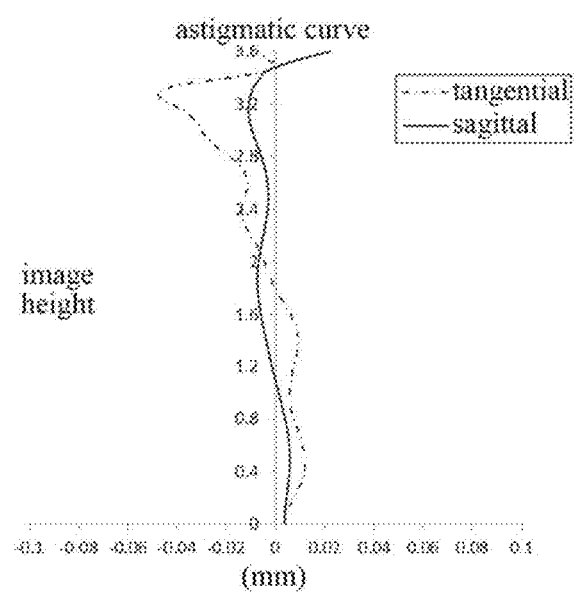
Figure 30C:
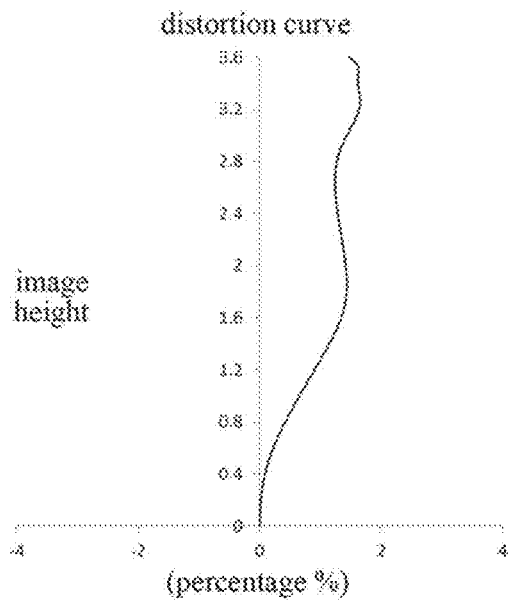
Figure 30D:
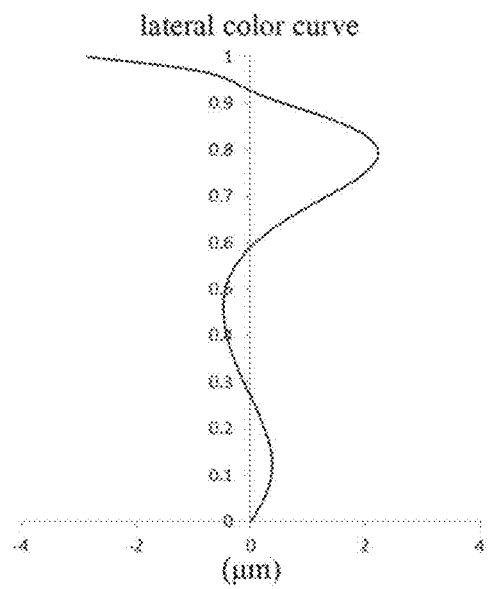

FIG. 29 is a schematic structural diagram illustrating the optical imaging lens assembly according to Embodiment 15 of the present disclosure. As shown in FIG. 29, the optical imaging lens assembly according to Embodiment 15 includes two lens groups arranged in sequence from the object side to the image side. The first lens group includes a first lens E1 and a second lens E2. The second lens group includes an optical element DOE, a third lens E3, a fourth lens E4, and a fifth lens E5 closest to the image plane. The first lens E1 has an object-side surface S1 and an image-side surface S2. The second lens E2 has an object-side surface S3 and an image-side surface S4. The optical element DOE has an object-side surface S5 and an image-side surface S6. The third lens E3 has object-side surface S7 and an image-side surface S8. The fourth lens E4 has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The object-side surface and the image-side surface of the optical element DOE are aspheric surfaces, and the optical element DOE does not have a refractive power. The third lens E3 has a positive refractive power. The fourth lens E4 has a positive refractive power. The fifth lens E5 closest to the image plane has a negative refractive power.

Table 43 below shows the surface type, the radius of curvature, the thickness, the material and the conic coefficient of each lens of the optical imaging lens assembly in Embodiment 15. Table 44 shows the high-order coefficients of the aspheric surfaces in Embodiment 15. Table 45 shows the effective focal lengths f1-f5 of the lenses in Embodiment 15, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 43

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3953 | | | |
| S1 | aspheric | 1.4759 | 0.6342 | 1.546 | 54.11 | −2.2284 |
| S2 | aspheric | 6.4045 | 0.0644 | | | −7.6956 |
| S3 | aspheric | 5.8662 | 0.2120 | 1.666 | 20.37 | −12.5300 |
| S4 | aspheric | 2.9508 | 0.2886 | | | −0.9192 |
| S5 | aspheric | infinite | 0.3140 | 1.546 | 54.11 | 0.0000 |
| S6 | aspheric | infinite | 0.1368 | | | 0.0000 |
| S7 | aspheric | 36.4280 | 0.2800 | 1.645 | 23.53 | 2.0000 |
| S8 | aspheric | 36.6477 | 0.4331 | | | −69.0000 |
| S9 | aspheric | 14.9061 | 0.5917 | 1.546 | 54.11 | −32.7874 |
| S10 | aspheric | −1.1768 | 0.1553 | | | −7.7447 |
| S11 | aspheric | −2.9005 | 0.4000 | 1.536 | 55.87 | −1.7190 |
| S12 | aspheric | 1.2730 | 0.5775 | | | −11.1814 |
| S13 | spherical | infinite | 0.2100 | 1.517 | 64.17 | |
| S14 | spherical | infinite | 0.2924 | | | |
| S15 | spherical | infinite | 0.0000 | | | |

TABLE 44

| surface number | A4 | A6 | A8 | A10 | A12 |
|---|---|---|---|---|---|
| S1 | 7.5952E−02 | 6.9306E−02 | −3.0355E−01 | 8.0225E−01 | −1.3930E+00 |
| S2 | −1.1638E−01 | 2.3619E−02 | 1.0056E+00 | −4.7343E+00 | 1.1795E+01 |
| S3 | −1.4149E−01 | 8.5179E−02 | 1.6535E+00 | −8.0574E+00 | 2.0948E+01 |
| S4 | −7.2823E−02 | 6.2090E−01 | −4.0387E+00 | 2.2435E+01 | −7.7904E+01 |
| S5 | −9.7944E−02 | 2.0575E−01 | −2.5485E+00 | 1.4684E+01 | −5.1040E+01 |
| S6 | −1.4939E−01 | 2.5429E−01 | −1.5714E+00 | 5.9576E+00 | −1.4443E+01 |
| S7 | −2.1030E−01 | −7.2488E−02 | 4.5391E−01 | −7.3037E−01 | 4.6767E−01 |
| S8 | −1.6021E−01 | −1.3169E−01 | 5.6441E−01 | −1.0919E+00 | 1.3513E+00 |
| S9 | 3.6434E−02 | −3.7066E−02 | −1.6787E−02 | 2.4193E−02 | −3.2363E−02 |
| S10 | −2.3175E−02 | 1.9991E−01 | −2.4691E−01 | 1.5988E−01 | −7.6050E−02 |
| S11 | −6.7735E−02 | 3.6102E−02 | −1.3450E−02 | 7.7114E−03 | −3.0216E−03 |
| S12 | −9.4995E−02 | 4.8569E−02 | −1.9083E−02 | 4.1282E−03 | −2.1009E−04 |

| surface number | A14 | A16 | A18 | A20 |
|---|---|---|---|---|
| S1 | 1.5551E+00 | −1.0835E+00 | 4.1586E−01 | −6.7191E−02 |
| S2 | −1.8021E+01 | 1.6680E+01 | −8.5454E+00 | 1.8518E+00 |
| S3 | −3.3502E+01 | 3.2773E+01 | −1.7880E+01 | 4.1500E+00 |
| S4 | 1.6594E+02 | −2.1111E+02 | 1.4749E+02 | −4.3466E+01 |
| S5 | 1.0733E+02 | −1.3412E+02 | 9.1418E+01 | −2.6025E+01 |
| S6 | 2.1782E+01 | −1.9904E+01 | 1.0131E+01 | −2.1900E+00 |
| S7 | 2.9440E−01 | −6.7360E−01 | 4.1240E−01 | −9.1568E−02 |
| S8 | −9.9060E−01 | 4.1738E−01 | −9.4267E−02 | 8.8861E−03 |
| S9 | 2.1313E−02 | −6.3759E−03 | 8.6027E−04 | −4.1521E−05 |
| S10 | 2.7222E−02 | −6.3874E−03 | 8.3285E−04 | −4.5081E−05 |
| S11 | 6.6108E−04 | −8.0913E−05 | 5.2318E−06 | −1.3977E−07 |
| S12 | −1.1245E−04 | 2.7046E−05 | −2.4245E−06 | 7.9347E−08 |

TABLE 45

| f1(mm) | 3.36 | f(mm) | 3.91 |
|---|---|---|---|
| f2(mm) | −9.15 | TTL(mm) | 4.59 |
| f3(mm) | 6267.18 | ImgH(mm) | 3.60 |
| f4(mm) | 2.02 | | |
| f5(mm) | −1.59 | | |

Embodiment 16

An optical imaging lens assembly according to Embodiment 16 of the present disclosure is described below with reference to FIGS. 31-32D.

Figure 31:
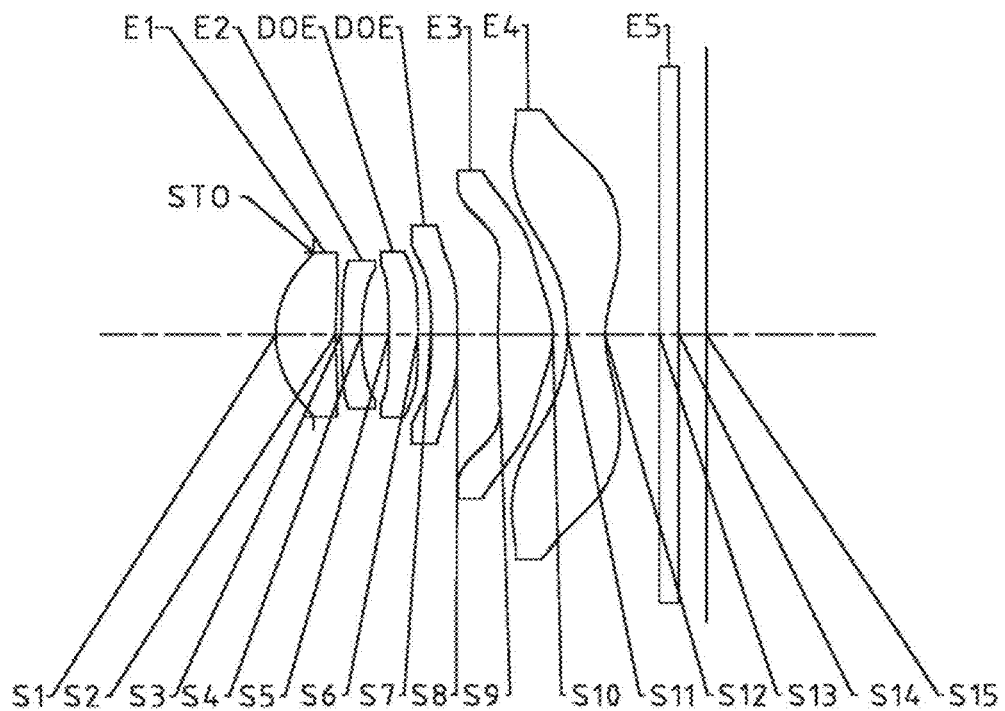
FIG. 31 is a schematic structural diagram illustrating an optical imaging lens assembly according to Embodiment 16 of the present disclosure.
Figure 32A:
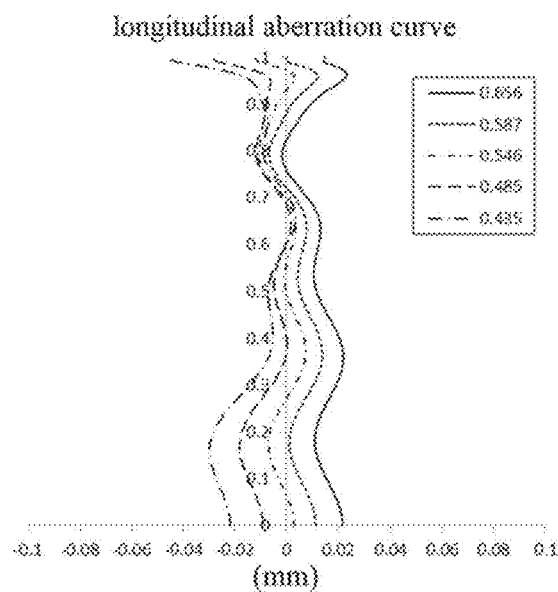
FIGS. 32A-32D respectively illustrate a longitudinal aberration curve, an astigmatic curve, a distortion curve, and a lateral color curve of the optical imaging lens assembly according to Embodiment 16.
Figure 32B:
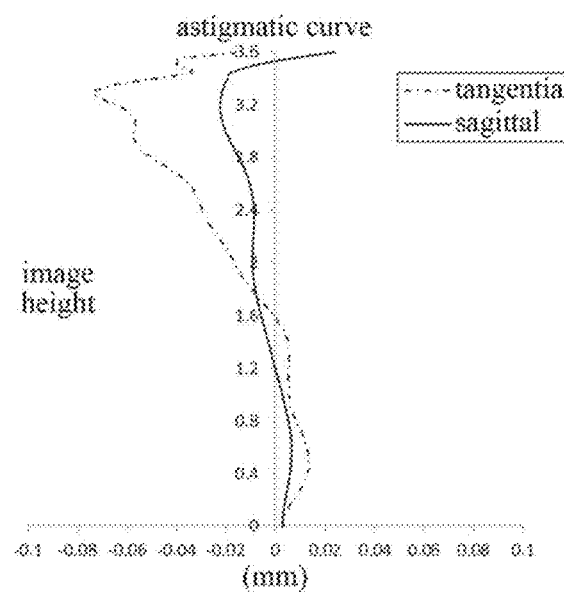
Figure 32C:
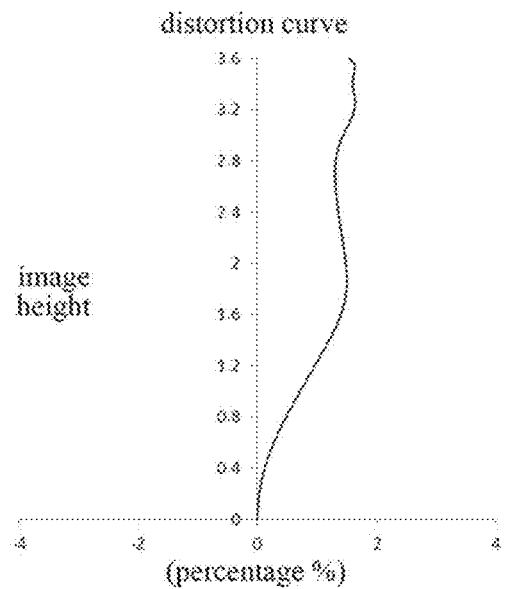
Figure 32D:
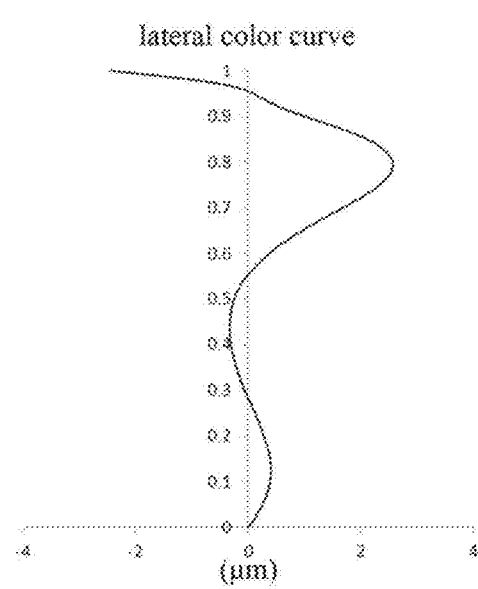

FIG. 31 is a schematic structural diagram illustrating the optical imaging lens assembly according to Embodiment 16 of the present disclosure. As shown in FIG. 31, the optical imaging lens assembly according to Embodiment 16 includes two lens groups arranged in sequence from the object side to the image side. The first lens group includes a first lens E1 and a second lens E2. The second lens group includes a first optical element DOE, a second optical element DOE, a third lens E3, and a fourth lens E4 closest to the image plane. The first lens E1 has an object-side surface S1 and an image-side surface S2. The second lens E2 has an object-side surface S3 and an image-side surface S4. The first optical element DOE has an object-side surface S5 and an image-side surface S6. The second optical element DOE has object-side surface S7 and an image-side surface S8. The third lens E3 has an object-side surface S9 and an image-side surface S10. The fourth lens E4 closest to the image plane has an object-side surface S11 and an image-side surface S12.

In this embodiment, the first lens E1 has a positive refractive power. The second lens E2 has a negative refractive power. The object-side surface and the image-side surface of the first optical element DOE and the object-side surface and the image-side surface of the second optical element DOE are aspheric surfaces. The first optical element DOE and the second optical element DOE do not have a refractive power. The third lens E3 has a positive refractive power. The fourth lens E4 closest to the image plane has a negative refractive power.

Table 46 below shows the surface type, the radius of curvature, the thickness, the material and the conic coefficient of each lens of the optical imaging lens assembly in Embodiment 16. Table 47 shows the high-order coefficients of the aspheric mirror surfaces in Embodiment 16. Table 48 shows the effective focal lengths f1-f4 of the lenses in Embodiment 16, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 46

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.3942 | | | |
| S1 | aspheric | 1.4713 | 0.6371 | 1.546 | 54.11 | −2.2247 |
| S2 | aspheric | 6.4597 | 0.0625 | | | −8.6511 |
| S3 | aspheric | 6.1469 | 0.2137 | 1.666 | 20.37 | −11.8106 |
| S4 | aspheric | 3.0117 | 0.2924 | | | −0.7786 |
| S5 | aspheric | infinite | 0.3111 | 1.546 | 54.11 | 0.0000 |
| S6 | aspheric | infinite | 0.1379 | | | 0.0000 |
| S7 | aspheric | infinite | 0.2813 | 1.645 | 23.53 | −69.0000 |
| S8 | aspheric | infinite | 0.4317 | | | −68.9935 |
| S9 | aspheric | 15.1200 | 0.5862 | 1.5461 | 54.1 | −33.3518 |
| S10 | aspheric | −1.1756 | 0.1553 | | | −7.8233 |
| S11 | aspheric | −2.8917 | 0.4001 | 1.536 | 55.87 | −1.7391 |
| S12 | aspheric | 1.2697 | 0.5784 | | | −11.1588 |
| S13 | spherical | infinite | 0.2100 | 1.517 | 64.17 | |
| S14 | spherical | infinite | 0.2924 | | | |
| S15 | spherical | infinite | 0.0000 | | | |

TABLE 47

| surface number | A4 | A6 | A8 | A10 | A12 |
|---|---|---|---|---|---|
| S1 | 7.6382E−02 | 6.0378E−02 | −2.1027E−01 | 4.0446E−01 | −4.7464E−01 |
| S2 | −9.3177E−02 | −2.6436E−01 | 2.6416E+00 | −1.0197E+01 | 2.3242E+01 |
| S3 | −1.2344E−01 | −1.4220E−01 | 2.9827E+00 | −1.2669E+01 | 3.1232E+01 |
| S4 | −1.2121E−01 | 1.6794E+00 | −1.4563E+01 | 8.0081E+01 | −2.6543E+02 |
| S5 | −1.0801E−01 | 2.2802E−01 | −2.4786E+00 | 1.3865E+01 | −4.7677E+01 |
| S6 | −1.5321E−01 | 2.2740E−01 | −1.2344E+00 | 4.4701E+00 | −1.0759E+01 |
| S7 | −2.1535E−01 | −6.1833E−02 | 5.1090E−01 | −1.1481E+00 | 1.6472E+00 |
| S8 | −1.6297E−01 | −1.1574E−01 | 5.0518E−01 | −9.6785E−01 | 1.1985E+00 |
| S9 | 3.4982E−02 | −3.1529E−02 | −2.8951E−02 | 4.0236E−02 | −4.4371E−02 |
| S10 | −2.3469E−02 | 2.0199E−01 | −2.4924E−01 | 1.6071E−01 | −7.5835E−02 |
| S11 | −6.7375E−02 | 3.5584E−02 | −1.3022E−02 | 7.4751E−03 | −2.9358E−03 |

TABLE 47-continued

| | | | | | |
|---|---|---|---|---|---|
| S12 | −9.4765E−02 | 4.7889E−02 | −1.8416E−02 | 3.7660E−03 | −8.5696E−05 |

| surface number | A14 | A16 | A18 | A20 |
|---|---|---|---|---|
| S1 | 3.1247E−01 | −9.5144E−02 | −1.4107E−02 | 1.1842E−02 |
| S2 | −3.3244E+01 | 2.9155E+01 | −1.4293E+01 | 2.9915E+00 |
| S3 | −4.8433E+01 | 4.6427E+01 | −2.5020E+01 | 5.7773E+00 |
| S4 | 5.3768E+02 | −6.5178E+02 | 4.3451E+02 | −1.2247E+02 |
| S5 | 9.9797E+01 | −1.2451E+02 | 8.4885E+01 | −2.4183E+01 |
| S6 | 1.6349E+01 | −1.5212E+01 | 7.9468E+00 | −1.7667E+00 |
| S7 | −1.4755E+00 | 7.9323E−01 | −2.1751E−01 | 1.7227E−02 |
| S8 | −8.7640E−01 | 3.6709E−01 | −8.2416E−02 | 7.7432E−03 |
| S9 | 2.6684E−02 | −7.8301E−03 | 1.0816E−03 | −5.6021E−05 |
| S10 | 2.6937E−02 | −6.2873E−03 | 8.1690E−04 | −4.4100E−05 |
| S11 | 6.4159E−04 | −7.8281E−05 | 5.0392E−06 | −1.3391E−07 |
| S12 | −1.3901E−04 | 3.0383E−05 | −2.6474E−06 | 8.5420E−08 |

TABLE 48

| | | | |
|---|---|---|---|
| f1(mm) | 3.34 | f(mm) | 3.91 |
| f2(mm) | −9.08 | TTL(mm) | 4.59 |
| f3(mm) | 2.02 | ImgH(mm) | 3.60 |
| f4(mm) | −1.59 | | |

Embodiment 17

An optical imaging lens assembly according to Embodiment 17 of the present disclosure is described below with reference to FIGS. 33-34D.

Figure 33:
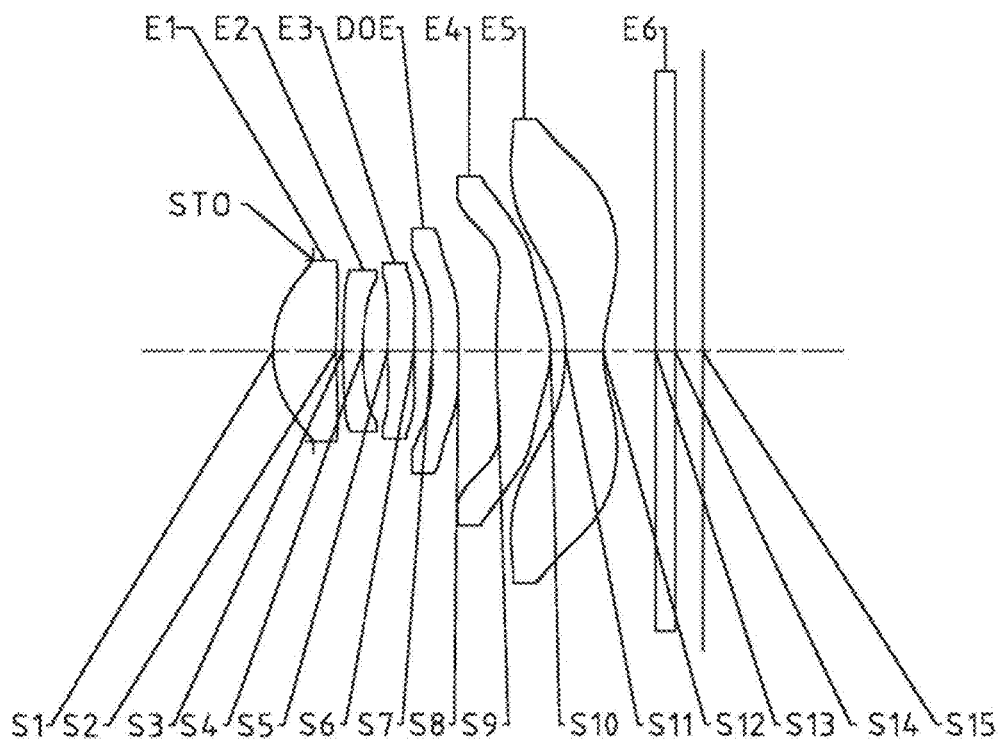
FIG. 33 is a schematic structural diagram illustrating an optical imaging lens assembly according to Embodiment 17 of the present disclosure.
Figure 34A:
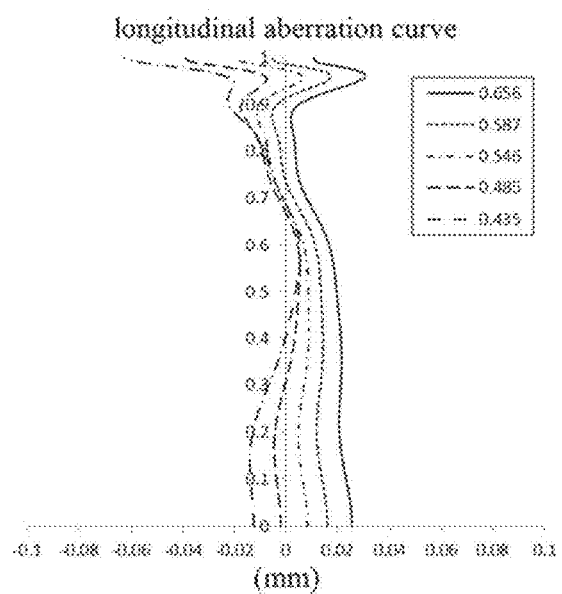
Figure 34B:
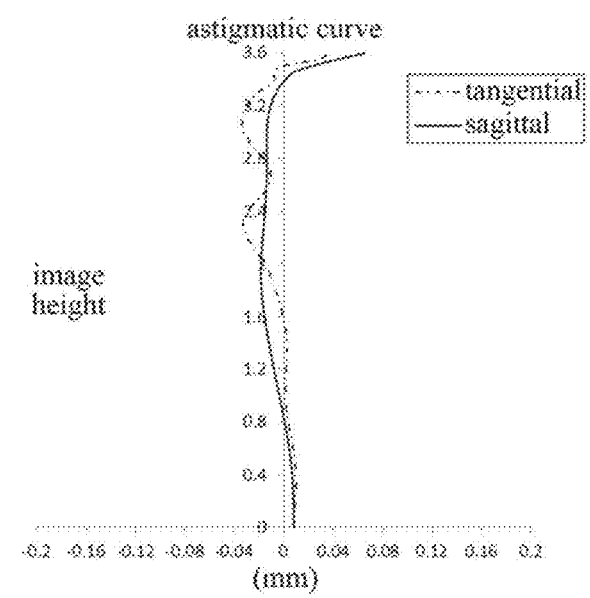

FIG. 33 is a schematic structural diagram illustrating the optical imaging lens assembly according to Embodiment 17 of the present disclosure. As shown in FIG. 33, the optical imaging lens assembly according to Embodiment 17 includes two lens groups arranged in sequence from the object side to the image side. The first lens group includes a first lens E1 and a second lens E2. The second lens group includes a third lens E3, an optical element DOE, a fourth lens E4, and a fifth lens E5 closest to the image plane. The first lens E1 has an object-side surface S1 and an image-side surface S2. The second lens E2 has an object-side surface S3 and an image-side surface S4. The third lens E3 has an object-side surface S5 and an image-side surface S6. The optical element DOE has object-side surface S7 and an image-side surface S8. The fourth lens E4 has an object-side surface S9 and an image-side surface S10. The fifth lens E5 closest to the image plane has an object-side surface S11 and an image-side surface S12.

In this embodiment, the first lens E1 has a positive refractive power. The second lens E2 has a negative refractive power. The third lens E3 has a positive refractive power. The object-side surface and the image-side surface of the optical element DOE are aspheric surfaces, and the optical element DOE does not have a refractive power. The fourth lens E4 has a positive refractive power. The fifth lens E5 closest to the image plane has a negative refractive power.

Table 49 below shows the surface type, the radius of curvature, the thickness, the material and the conic coefficient of each lens of the optical imaging lens assembly in Embodiment 17. Table 50 shows the high-order coefficients of the aspheric mirror surfaces in Embodiment 17. Table 51 shows the effective focal lengths f1-f5 of the lenses in Embodiment 17, the effective focal length f of the imaging lens assembly of the optical imaging lens assembly, the distance TTL on the optical axis from the object-side surface S1 of the first lens E1 to the image plane S15 of the optical imaging lens assembly, and the half of the diagonal length ImgH of the effective pixel area on the image plane of the optical imaging lens assembly. The surface type of each aspheric surface may be defined by the formula (1) given in Embodiment 1.

TABLE 49

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.4262 | | | |
| S1 | aspheric | 1.5128 | 0.6714 | 1.546 | 54.11 | −2.2888 |
| S2 | aspheric | 6.7773 | 0.0741 | | | −4.9000 |
| S3 | aspheric | 7.1844 | 0.2120 | 1.666 | 20.37 | −29.2579 |
| S4 | aspheric | 3.1118 | 0.2699 | | | −3.6533 |
| S5 | aspheric | 7.9770 | 0.2821 | 1.546 | 54.11 | 0.0000 |
| S6 | aspheric | 10.5176 | 0.1937 | | | 0.0000 |
| S7 | aspheric | infinite | 0.2800 | 1.645 | 23.53 | −6487104.4310 |
| S8 | aspheric | infinite | 0.4012 | | | −6487104.4310 |
| S9 | aspheric | 11.8552 | 0.5793 | 1.546 | 54.11 | 1.3395 |
| S10 | aspheric | −1.2673 | 0.1563 | | | −8.0114 |
| S11 | aspheric | −3.0408 | 0.4000 | 1.536 | 55.87 | −1.5394 |
| S12 | aspheric | 1.3471 | 0.5676 | | | −11.3239 |
| S13 | spherical | infinite | 0.2100 | 1.517 | 64.17 | |
| S14 | spherical | infinite | 0.2924 | | | |
| S15 | spherical | infinite | 0.0000 | | | |

TABLE 50

| surface number | A4 | A6 | A8 | A10 | A12 |
|---|---|---|---|---|---|
| S1 | 7.9224E−02 | −5.1345E−03 | 4.8938E−03 | 2.7895E−02 | −1.8432E−01 |
| S2 | −1.1971E−01 | −2.1795E−02 | 1.3933E+00 | −5.8666E+00 | 1.3150E+01 |
| S3 | −1.6815E−01 | 2.0003E−01 | 1.2095E+00 | −5.9832E+00 | 1.4022E+01 |
| S4 | −1.1098E−01 | 8.0044E−01 | −4.6194E+00 | 2.2892E+01 | −7.2450E+01 |
| S5 | −1.7182E−01 | 6.9647E−01 | −5.2064E+00 | 2.3749E+01 | −6.8734E+01 |
| S6 | −1.6233E−01 | 5.2476E−01 | −3.0825E+00 | 1.0872E+01 | −2.4231E+01 |
| S7 | −1.6634E−01 | −8.6669E−02 | 5.2933E−01 | −1.3867E+00 | 2.4706E+00 |
| S8 | −1.3735E−01 | −1.3949E−01 | 4.8030E−01 | −8.3930E−01 | 9.5513E−01 |
| S9 | 4.3252E−02 | −1.2947E−02 | −8.1014E−02 | 1.0375E−01 | −9.3529E−02 |
| S10 | 1.2358E−02 | 1.6073E−01 | −1.9362E−01 | 1.0017E−01 | −3.5452E−02 |
| S11 | −6.8016E−02 | 2.7484E−02 | −1.2685E−03 | 6.7230E−04 | −8.2096E−04 |
| S12 | −9.9525E−02 | 5.3793E−02 | −2.3813E−02 | 6.5679E−03 | −9.0941E−04 |

| surface number | A14 | A16 | A18 | A20 |
|---|---|---|---|---|
| S1 | 3.7757E−01 | −3.8239E−01 | 1.8621E−01 | −3.5702E−02 |
| S2 | −1.7814E+01 | 1.4473E+01 | −6.4742E+00 | 1.2228E+00 |
| S3 | −1.9648E+01 | 1.6661E+01 | −7.8346E+00 | 1.5597E+00 |
| S4 | 1.4126E+02 | −1.6466E+02 | 1.0537E+02 | −2.8439E+01 |
| S5 | 1.2462E+02 | −1.3719E+02 | 8.3621E+01 | −2.1529E+01 |
| S6 | 3.3925E+01 | −2.9055E+01 | 1.3927E+01 | −2.8428E+00 |
| S7 | −2.8596E+00 | 2.0256E+00 | −7.8323E−01 | 1.2508E−01 |
| S8 | −6.3560E−01 | 2.3805E−01 | −4.6726E−02 | 3.7365E−03 |
| S9 | 5.0835E−02 | −1.4954E−02 | 2.2184E−03 | −1.3098E−04 |
| S10 | 1.0767E−02 | −2.4753E−03 | 3.2983E−04 | −1.8137E−05 |
| S11 | 2.5600E−04 | −3.6883E−05 | 2.6123E−06 | −7.3945E−08 |
| S12 | 1.9856E−06 | 1.6465E−05 | −1.9162E−06 | 6.9711E−08 |

TABLE 51

| | | | |
|---|---|---|---|
| f1(mm) | 3.41 | f(mm) | 3.91 |
| f2(mm) | −8.39 | TTL(mm) | 4.59 |
| f3(mm) | 58.14 | ImgH(mm) | 3.60 |
| f4(mm) | 2.13 | | |
| f5(mm) | −1.68 | | |

To sum up, Embodiments 1-17 respectively satisfy the relationships shown in Table 52 below.

TABLE 52

| Conditional Expression | Embodiment | | | | | | | | |
|---|---|---|---|---|---|---|---|---|---|
| | 1 | 2 | 3 | 4 | 5 | 6 | 7 | 8 | 9 |
| ImgH/f | 0.87 | 0.86 | 0.86 | 0.86 | 0.86 | 0.86 | 0.86 | 0.86 | 0.86 |
| f1/f12 | 0.75 | 0.73 | 0.78 | 0.78 | 0.78 | 0.78 | 0.74 | 0.73 | 0.75 |
| TTL/ImgH | 1.35 | 1.28 | 1.28 | 1.47 | 1.47 | 1.47 | 1.47 | 1.47 | 1.47 |
| f12/fL | −2.67 | −1.34 | −1.17 | −1.31 | −1.31 | −1.14 | −1.29 | −1.44 | −1.22 |
| \|R3 − R4\|/\|R3 + R4\| | 0.37 | 0.88 | 2.64 | 2.46 | 2.50 | 2.34 | 2.38 | 2.57 | 2.06 |
| R1/R4 | 0.43 | 0.29 | 0.14 | 0.15 | 0.15 | 0.15 | 0.17 | 0.18 | 0.17 |
| f/EPD | 1.88 | 1.68 | 1.68 | 1.68 | 1.68 | 1.68 | 1.68 | 1.68 | 1.73 |
| ΣCT/ΣAT | 1.66 | 1.96 | 1.80 | 1.12 | 1.79 | 1.77 | 1.67 | 0.62 | 1.71 |
| \|RL1 + RL2\|/\|RL1 − RL2\| | 0.35 | 2.05 | 2.25 | 1.85 | 2.14 | 2.30 | 2.14 | 2.02 | 2.18 |
| ΣAT/f | 0.34 | 0.33 | 0.35 | 0.46 | 0.35 | 0.35 | 0.36 | 0.97 | 0.36 |
| \|Vne − V1\| | 30.6 | 33.7 | 33.7 | 33.7 | 33.7 | 33.7 | 33.7 | 33.7 | 33.7 |

| Conditional Expression | Embodiment | | | | | | | |
|---|---|---|---|---|---|---|---|---|
| | 10 | 11 | 12 | 13 | 14 | 15 | 16 | 17 |
| ImgH/f | 0.91 | 0.91 | 0.87 | 0.87 | 0.87 | 0.92 | 0.92 | 0.92 |
| f1/f12 | 0.75 | 0.76 | 0.69 | 0.71 | 0.68 | 0.72 | 0.72 | 0.69 |
| TTL/ImgH | 1.39 | 1.39 | 1.35 | 1.35 | 1.35 | 1.28 | 1.28 | 1.28 |
| f12/fL | −1.23 | −1.31 | −2.70 | −2.77 | −2.94 | −2.91 | −2.90 | −2.92 |
| \|R3 − R4\|/\|R3 + R4\| | 1.06 | 1.30 | 0.42 | 0.41 | 0.37 | 0.33 | 0.34 | 0.40 |
| R1/R4 | 0.21 | 0.19 | 0.50 | 0.47 | 0.57 | 0.50 | 0.49 | 0.49 |
| f/EPD | 1.99 | 1.85 | 1.88 | 1.88 | 1.88 | 1.88 | 1.88 | 1.78 |
| ΣCT/ΣAT | 0.57 | 1.62 | 2.85 | 1.10 | 1.46 | 1.52 | 1.10 | 1.56 |
| \|RL1 + RL2\|/\|RL1 − RL2\| | 2.15 | 2.08 | 0.36 | 0.36 | 0.40 | 0.39 | 0.39 | 0.39 |
| ΣAT/f | 1.05 | 0.37 | 0.20 | 0.43 | 0.37 | 0.36 | 0.43 | 0.35 |
| \|Vne − V1\| | 33.74 | 33.74 | 30.58 | 30.58 or 0 | 0 | 0 | 30.58 or 0 | 30.58 |

What is claimed is:

1. An optical imaging lens assembly sequentially comprising, from an object side to an image side along an optical axis, a first lens group and a second lens group,
wherein the first lens group comprises:
a first lens, having a positive refractive power; and
a second lens, having a negative refractive power;
the second lens group comprises:
at least one optical element, wherein an object-side surface and an image-side surface of the at least one optical element are aspheric surfaces; and
one optical element not having a refractive power; and
three lenses having refractive powers,
wherein one lens, in the three lenses having the refractive powers, closest to an image plane of the optical imaging lens assembly has a negative refractive power; and
an effective focal length f1 of the first lens and a combined focal length f12 of the first lens and the second lens satisfy: f1/f12>0.65.

2. The optical imaging lens assembly according to claim 1, wherein,
the second lens group comprises:
two optical elements not having a refractive power; and
two lenses having refractive powers,
wherein one lens, in the two lenses having the refractive powers, closest to an image plane of the optical imaging lens assembly has a negative refractive power.

3. The optical imaging lens assembly according to claim 1, half of a diagonal length ImgH of an effective pixel area on an image plane of the optical imaging lens assembly and an effective focal length f of the optical imaging lens assembly satisfy: ImgH/f≥0.85.

4. The optical imaging lens assembly according to claim 1, wherein a distance TTL from an object-side surface of the first lens to the image plane of the optical imaging lens assembly on the optical axis and the half of the diagonal length ImgH of the effective pixel area on the image plane of the optical imaging lens assembly satisfy: TTL/ImgH≤1.5.

5. The optical imaging lens assembly according to claim 1, wherein a radius of curvature R3 of an object-side surface of the second lens and a radius of curvature R4 of an image-side surface of the second lens satisfy: |R3−R4|/|R3+R4|≤3.

6. The optical imaging lens assembly according to claim 1, wherein a radius of curvature R1 of an object-side surface of the first lens and a radius of curvature R4 of an image-side surface of the second lens satisfy: 0≤R1/R4≤1.

7. The optical imaging lens assembly according to claim 1, wherein an effective focal length f of the optical imaging lens assembly and an entrance pupil diameter EPD of the optical imaging lens assembly satisfy: f/EPD≤2.0.

8. An optical imaging lens assembly sequentially comprising, from an object side to an image side along an optical axis, a first lens group and a second lens group,
wherein the first lens group comprises:
a first lens, having a positive refractive power; and
a second lens, having a negative refractive power,
the second lens group comprises:
at least one optical element, wherein an object-side surface and an image-side surface of the at least one optical element are aspheric surfaces; and
one optical element not having a refractive power; and
three lenses having refractive powers,
wherein one lens, in the three lenses having the refractive powers, closest to an image plane of the optical imaging lens assembly has a negative refractive power; and
the optical imaging lens assembly satisfies: 0≤ΣCT/ΣAT≤3,
wherein ΣCT is a sum of center thicknesses of the lenses having the refractive powers in the first lens group and the second lens group, and
ΣAT is a sum of air spacings on the optical axis between any two adjacent lenses having refractive powers in the first lens group and the second lens group.

9. The optical imaging lens assembly according to claim 8, wherein,
the second lens group comprises:
two optical elements not having a refractive power; and
two lenses having refractive powers,
wherein one lens, in the two lenses having the refractive powers, closest to an image plane of the optical imaging lens assembly has a negative refractive power.

10. The optical imaging lens assembly according to claim 8, wherein the ΣAT and an effective focal length f of the optical imaging lens assembly satisfy: 0≤ΣAT/f≤1.1.

11. The optical imaging lens assembly according to claim 8, wherein a distance TTL on the optical axis from an object-side surface of the first lens to the image plane of the optical imaging lens assembly and half of a diagonal length ImgH of an effective pixel area on the image plane of the optical imaging lens assembly satisfy: TTL/ImgH≤1.5.

12. The optical imaging lens assembly according to claim 8, wherein half of a diagonal length ImgH of an effective pixel area on an image plane of the optical imaging lens assembly and an effective focal length f of the optical imaging lens assembly satisfy: ImgH/f≥0.85.

13. The optical imaging lens assembly according to claim 8, wherein a radius of curvature R3 of an object-side surface of the second lens and a radius of curvature R4 of an image-side surface of the second lens satisfy: |R3−R4|/|R3+R4|≤3.

14. The optical imaging lens assembly according to claim 8, wherein a radius of curvature R1 of an object-side surface of the first lens and a radius of curvature R4 of an image-side surface of the second lens satisfy: 0≤R1/R4≤1.

15. An optical imaging lens assembly sequentially comprising, from an object side to an image side along an optical axis, a first lens group and a second lens group,
wherein the first lens group comprises:
a first lens, having a positive refractive power; and
a second lens, having a negative refractive power,
wherein a combined refractive power of the first lens and the second lens is a positive refractive power;

the second lens group comprises:
- at least one optical element, wherein an object-side surface and an image-side surface of the at least one optical element are aspheric surfaces; and
- a plurality of lenses having refractive powers,
- wherein one lens, in the plurality of lenses, closest to an image plane of the optical imaging lens assembly has a negative refractive power; and the optical imaging lens assembly satisfies: $-3 \leq f12/fL \leq -1$, wherein f12 represents a combined focal length of the first lens and the second lens, and fL represents an effective refractive power of the one lens closest to the image plane in the second lens group; and a distance TTL on the optical axis from an object-side surface of the first lens to the image plane of the optical imaging lens assembly and half of a diagonal length ImgH of an effective pixel area on the image plane of the optical imaging lens assembly satisfy: $TTL/ImgH \leq 1.5$.

16. The optical imaging lens assembly according to claim 15, wherein the half of the diagonal length ImgH of the effective pixel area on the image plane of the optical imaging lens assembly and an effective focal length f of the optical imaging lens assembly satisfy: $ImgH/f \geq 0.85$.

17. The optical imaging lens assembly according to claim 16, wherein a radius of curvature R1 of an object-side surface of the first lens and a radius of curvature R4 of an image-side surface of the second lens satisfy: $0 \leq R1/R4 \leq 1$.

\* \* \* \* \*